United States Patent
Kim et al.

(10) Patent No.: US 12,432,814 B2
(45) Date of Patent: Sep. 30, 2025

(54) METHOD AND APPARATUS FOR HANDLING INTEGRITY VERIFICATION FAILURE IN SYSTEM SUPPORTING HIGH-RELIABILITY, LOW-LATENCY SERVICE

(71) Applicant: Samsung Electronics Co., Ltd., Suwon-si (KR)

(72) Inventors: Donggun Kim, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 560 days.

(21) Appl. No.: 17/630,699

(22) PCT Filed: Aug. 6, 2020

(86) PCT No.: PCT/KR2020/010436
§ 371 (c)(1),
(2) Date: Jan. 27, 2022

(87) PCT Pub. No.: WO2021/025504
PCT Pub. Date: Feb. 11, 2021

(65) Prior Publication Data
US 2022/0264387 A1    Aug. 18, 2022

(30) Foreign Application Priority Data

Aug. 6, 2019 (KR) .................. 10-2019-0095433

(51) Int. Cl.
*H04W 76/34* (2018.01)
*H04W 36/00* (2009.01)
(Continued)

(52) U.S. Cl.
CPC ..... *H04W 76/34* (2018.02); *H04W 36/00692* (2023.05); *H04W 36/085* (2023.05); *H04W 74/0833* (2013.01)

(58) Field of Classification Search
CPC ........... H04W 76/34; H04W 36/00692; H04W 36/085; H04W 74/0833
(Continued)

(56) References Cited

U.S. PATENT DOCUMENTS 9,986,462 B2    5/2018   He
10,362,615 B2   7/2019   Hong et al.
(Continued)

FOREIGN PATENT DOCUMENTS

CN    104105221 A    10/2014
CN    107277879 A    10/2017
(Continued)

OTHER PUBLICATIONS

Intel Corporation et al., Non-DC based solution for 0ms interruption time, 3GPP Draft, R2-1903447, 3GPP TSG RAN WG2 Meeting #105bis, XP051692715, Xi'an, China, Mar. 29, 2019.
(Continued)

*Primary Examiner* — Hermon Asres
(74) *Attorney, Agent, or Firm* — Jefferson IP Law, LLP

(57) ABSTRACT

The present disclosure relates to a communication technique and a system therefor, the communication technique for merging, with an IoT technology, a 5th generation (5G) or pre-5G communication system for supporting a higher data transmission rate since a 4th generation (4G) communication system such as long term evolution (LTE). The present disclosure can be applied to an intelligent service (for example, a smart home, a smart building, a smart city, a smart car or connected car, health care, digital education, a retail business, a security and safety-related service, and the
(Continued)

like) on the basis of a 5G communication technology and an IoT-related technology. According to various embodiments of the present invention, a method and apparatus for handling an integrity verification failure in a system for supporting high-reliability, low-latency service can be provided.

20 Claims, 33 Drawing Sheets

(51) Int. Cl.
 *H04W 36/08* (2009.01)
 *H04W 74/0833* (2024.01)
(58) Field of Classification Search
 USPC .......................................................... 370/331
 See application file for complete search history.

(56) References Cited

U.S. PATENT DOCUMENTS

| 10,805,852 | B2 | 10/2020 | Xu et al. | |
|---|---|---|---|---|
| 2008/0219222 | A1* | 9/2008 | Lo | H04W 72/535 370/337 |
| 2016/0316508 | A1* | 10/2016 | Hong | H04W 76/15 |
| 2020/0029260 | A1* | 1/2020 | Kadiri | H04W 36/026 |
| 2020/0288371 | A1* | 9/2020 | Zhou | H04B 7/0617 |

FOREIGN PATENT DOCUMENTS

| CN | 109983817 A | 7/2019 |
|---|---|---|
| EP | 3 527 021 B1 | 3/2024 |
| KR | 10-2014-0145527 A | 12/2014 |
| KR | 10-2019-0032167 A | 3/2019 |

OTHER PUBLICATIONS

Qualcomm Incorporated, LTE mobility enhancements for MBB handover, 3GPP Draft, R2-1900791, Revision of R2-1817813, 3GPP TSG-RAN WG2 Meeting #105, XP051602166, Athens, Greece, Feb. 15, 2019.
Extended European Search Report dated Jul. 15, 2022, issued in European Patent Application No. 20849324.7.
Ericsson, 'User plane aspects of Make-Before-Break', 3GPP TSGRAN, WG2#106, R2-1907318, Reno, Nevada, USA, May 2, 2019.
Qualcomm Incorporated, 'Control Plane handling, and procedures to support, Make-Before-Break (MBB) HO', 3GPP TSG-RAN WG2 Meeting #106, R2-1905782, Reno, Nevada, May 3, 2019.
Huawei etc., 'Handover scheme comparison, under DC Scenarios', 3GPP TSG-RAN WG2 #106, R2-1907426, Reno, USA, May 3, 2019.
Nokia etc., 'Split bearer solution for reducing, the service interruption time, during HO in NR', 3GPP, TSG-RAN WG2 Meeting #105-bis, R2-1904292, Xian, China, Mar. 28, 2019.
Indian Office Action dated Jan. 11, 2024, issued in Indian Patent Application No. 202217006112.
Chinese Office Action dated Oct. 15, 2024, issued in Chinese Patent Application No. 202080068810.4.
Korean Office Action dated Dec. 26, 2024, issued in Korean Patent Application No. 10-2019-0095433.
Chinese Office Action dated Apr. 22, 2025, issued in Chinese Patent Application No. 202080068810.4.
Chinese Notice of Allowance dated Jul. 3, 2025, issued in Chinese Patent Application No. 202080068810.4.

* cited by examiner

METHOD AND APPARATUS FOR HANDLING INTEGRITY VERIFICATION FAILURE IN SYSTEM SUPPORTING HIGH-RELIABILITY, LOW-LATENCY SERVICE

TECHNICAL FIELD

One embodiment of the disclosure relates to a method and apparatus for efficiently handling an integrity verification failure that may occur when a terminal or base station receives data from a bearer for which an integrity protection or verification procedure is configured and performs integrity verification on the received data in a next generation mobile communication system. Another embodiment of the disclosure relates to a method and apparatus for performing a data compression processing procedure in consideration of a loss in a next-generation mobile communication system. Another embodiment of the disclosure relates to a packet duplicate processing method and apparatus supporting enhanced handover in a next-generation mobile communication system.

BACKGROUND ART

To meet the ever increasing demand for wireless data traffic since the commercialization of 4th generation (4G) communication systems, efforts have been made to develop improved 5th generation (5G) or pre-5G communication systems. As such, 5G or pre-5G communication systems are also called "beyond 4G network system" or "post Long Term Evolution (LTE) system".

To achieve high data rates, 5G communication systems are being considered for implementation in the extremely high frequency (mmWave) band (e.g., 60 GHz band). To decrease path loss of radio waves and increase the transmission distance in the mmWave band, various technologies including beamforming, massive multiple-input multiple-output (massive MIMO), full dimensional MIMO (FD-MIMO), array antennas, analog beamforming, and large scale antennas are considered for 5G communication systems.

Additionally, to improve system networks in 5G communication systems, technology development is under way regarding evolved small cells, advanced small cells, cloud radio access networks (cloud RANs), ultra-dense networks, device-to-device (D2D) communication, wireless backhaul, moving networks, cooperative communication, coordinated multi-points (CoMP), interference cancellation, and the like.

Besides, advanced coding and modulation (ACM) schemes such as hybrid frequency shift keying and quadrature amplitude modulation (FQAM) and sliding window superposition coding (SWSC), and advanced access technologies such as filter bank multi carrier (FBMC), non-orthogonal multiple access (NOMA), and sparse code multiple access (SCMA) are also under development for 5G systems.

5G systems are expected to support for more various services compared to existing 4G systems. For example, the most representative services may include enhanced mobile broadband (eMBB), ultra-reliable and low-latency communication (URLLC), massive machine type communication (mMTC), and evolved multimedia broadcast/multicast service (eMBMS). Also, a system providing a URLLC service may be referred to as a URLLC system, and a system providing an eMBB service may be referred to as an eMBB system. In addition, the terms service and system may be used interchangeably.

Among them, the URLLC service is a service newly considered in the 5G system, unlike the existing 4G system, and requires satisfaction of ultra-high reliability (e.g., packet error rate of about 10-5) and very low latency (e.g., about 0.5 msec) conditions compared to other services. To satisfy such strict requirements, the URLLC service may need to utilize a shorter transmission time interval (TTI) than the eMBB service, and various operation methods using this are being considered.

Meanwhile, the Internet is evolving from a human centered network where humans create and consume information into the Internet of Things (IoT) where distributed elements such as things exchange and process information. There has also emerged the Internet of Everything (IoE) technology that combines IoT technology with big data processing technology through connection with cloud servers. To realize IoT, technology elements related to sensing, wired/wireless communication and network infrastructure, service interfacing, and security are needed, and technologies interconnecting things such as sensor networks, machine-to-machine (M2M) or machine type communication (MTC) are under research in recent years.

In IoT environments, it is possible to provide intelligent Internet technology services, which collect and analyze data created by interconnected things to add new values to human life. Through convergence and combination between existing information technologies and various industries, IoT technology may be applied to various areas such as smart homes, smart buildings, smart cities, smart or connected cars, smart grids, health-care, smart consumer electronics, and advanced medical services.

Accordingly, various attempts are being made to apply 5G communication systems to IoT networks. For example, technologies such as sensor networks and machine-to-machine (M2M) or machine type communication (MTC) are being realized by use of 5G communication technologies including beamforming, MIMO, and array antennas. Application of cloud RANs as a big data processing technique described above may be an instance of convergence of 5G technology and IoT technology.

DISCLOSURE OF INVENTION

Technical Problem

In a next-generation mobile communication system, it is required to support a data transmission method having high reliability, and there is a need to strengthen security to cope with data transmission errors or attacks from unidentified or unspecified users.

In a wireless communication system, the downlink can secure more transmission resources by using a high frequency band and a wide bandwidth. Also, since more antennas can be physically installed and used in the base station, beamforming gain and high signal strength can be obtained, so that more data can be loaded on the same frequency/time resource to transmit data to the terminal in the downlink. However, in the case of the uplink, the terminal physically has a small size and it is difficult for the uplink frequency to use a high frequency band and a wide bandwidth, so that the uplink transmission resource may become a bottleneck compared to the downlink transmission resource. Besides, since the maximum transmission power of the terminal is much smaller than that of the base station, there is also a problem that the coverage becomes small during uplink data transmission. Therefore, it is necessary to efficiently use transmission resources by compressing uplink data. In addition, it is also necessary to more efficiently use transmission resources by compressing downlink data.

A method for compressing downlink or uplink data considered in the disclosure is a scheme of successively performing data compression based on the previous data. In this case, if one piece of data is lost, discarded, or fails in decompression in the middle among a series of compressed data, data decompression may fail for all subsequent data after the lost, discarded or decompression-failed data.

Whenever data is received from a higher layer entity, the transmitting end of a packet data convergence protocol (PDCP) entity may run a PDCP discard timer for the data, perform an uplink compression procedure if the uplink compression procedure is configured, compose an uplink data compression (UDC) header, encrypt data on which uplink data compression has been performed, assign a PDCP sequence number, and compose a PDCP header to thereby generate a PDCP PDU (packet data unit). Here, when the PDCP discard timer expires, the data corresponding to the timer is assumed to be not valid and discarded.

Hence, if the transmitting PDCP entity discards previously generated data (e.g., PDCP PDU) due to expiration of the PDCP discard timer or data is lost during data transmission, as some data among a series of compressed data is lost, the receiving PDCP entity may successively fail to decompress subsequent data after the discarded or lost data due to discarding or loss of compressed data in the middle.

Additionally, in a next-generation mobile communication system, an efficient handover method is required to support a service without data interruption with a low transmission delay.

The technical objectives to be achieved in the disclosure are not limited to those described above, and other technical objectives not mentioned will be clearly understood by those of ordinary skill in the art to which the disclosure belongs from the following description.

Solution to Problem

A method performed by a terminal in a wireless communication system for solving the above problems according to an embodiment of the disclosure may include receiving, from a first base station, a first message that includes configuration information on a dual active protocol entity based handover and a handover command from the first base station to a second base station in case that dual connectivity is not configured in the terminal, configuring a protocol entity for the second base station according to the configuration information, performing a random access procedure with the second base station by using the protocol entity for the second base station, discontinuing uplink data transmission to the first base station and performing data transmission and reception with the second base station in case that a first condition is satisfied, and discontinuing downlink data reception from the first base station in case that a second condition is satisfied.

Further, in case that dual connectivity is configured in the terminal, the method may further include releasing the dual connectivity.

Further, the configuration information may be set for each bearer, and the dual active protocol entity based handover may configure the protocol entity for the second base station in the terminal in addition to a protocol entity for the first base station, and during handover, perform data transmission and reception with the first base station by using the protocol entity for the first base station and perform data transmission and reception with the second base station by using the protocol entity for the second base station.

The first condition may be completing a random access procedure to the second base station, and the second condition may be receiving a second message including information for releasing a connection to the first base station from the second base station.

Further, the protocol entity for the second base station may include a physical layer entity, a medium access control (MAC) entity, a radio link control (RLC) entity, and a packet data convergence protocol (PDCP) entity.

In addition, a method performed by a first base station in a wireless communication system according to an embodiment of the disclosure may include transmitting a terminal a first message that includes configuration information on a dual active protocol entity based handover and a handover command from the first base station to a second base station in case that dual connectivity is not configured in the terminal, discontinuing reception of uplink data from the terminal in case that a first condition is satisfied, and discontinuing transmission of downlink data to the terminal in case that a second condition is satisfied.

Advantageous Effects of Invention

According to an embodiment of the disclosure, there is proposed a method for efficiently handling an integrity verification failure that may occur when a terminal or base station receives data from a bearer for which an integrity protection or verification procedure is configured and performs integrity verification on the received data in a next generation mobile communication system, so that security can be strengthened.

According to an embodiment of the disclosure, there is proposed a procedure for a wireless communication system in which when the transmitting PDCP entity (terminal or base station) transmits data in the uplink or downlink, the data is compressed and transmitted, and the receiving PDCP entity (base station or terminal) receives and decompresses the data. Also, according to an embodiment of the disclosure, there is proposed a method for supporting the data transmission and reception procedure in which the transmitting end compresses and transmits data and the receiving end decompresses it, such as a specific header format, a solution for decompression failure, and data compression assuming loss. In addition, the above method may also be applied to a procedure in which the base station compresses and transmits downlink data when transmitting downlink data to the terminal, and the terminal receives and decompresses the compressed downlink data. As described above, according to an embodiment of the disclosure, when the transmitting end compresses data and transmits the compressed data, this can bring an effect of improving coverage while allowing more data to be transmitted.

According to an embodiment of the disclosure, there are proposed various efficient handover methods that prevent a data interruption time from occurring due to handover when handover is performed in a next-generation mobile communication system, in which case services without data interruption can be supported.

The effects that can be obtained in the disclosure are not limited to those mentioned above, and other effects not mentioned will be clearly understood by those of ordinary skill in the art to which the disclosure belongs from the following description.

MODE FOR THE INVENTION

Figure 1:
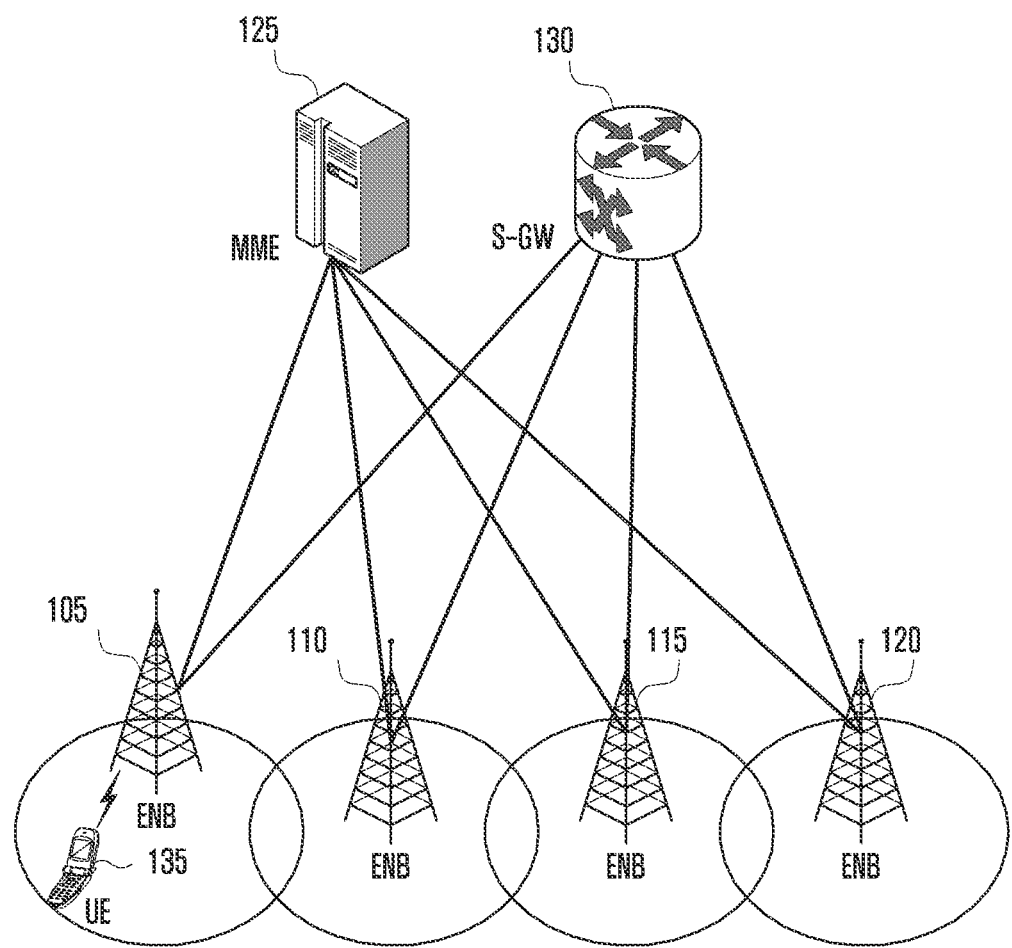
FIG. 1 is a diagram illustrating the architecture of an LTE system according to an embodiment of the disclosure.

Hereinafter, the operating principle of the disclosure will be described in detail with reference to the accompanying drawings. In the following description of the disclosure, descriptions of well-known functions and structures incorporated herein may be omitted to avoid obscuring the subject matter of the disclosure. The terms described below are defined in consideration of their functions in the disclosure, and these may vary depending on the intention of the user, the operator, or the custom. Hence, their meanings should be determined based on the overall contents of this specification.

In the following description of the disclosure, descriptions of well-known functions and structures incorporated herein may be omitted to avoid obscuring the subject matter of the disclosure. Next, embodiments of the disclosure will be described with reference to the accompanying drawings.

Those terms used in the following description for identifying an access node, indicating a network entity, indicating a message, indicating an interface between network entities, and indicating various identification information are taken as illustration for ease of description. Accordingly, the disclosure is not limited by the terms to be described later, and other terms referring to objects having an equivalent technical meaning may be used.

For convenience of description, the disclosure uses terms and names defined in the standards for 3GPP LTE (3rd Generation Partnership Project Long Term Evolution). However, the disclosure is not limited by the above terms and names, and can be equally applied to systems conforming to other standards. In the disclosure, "evolved node B (eNB)" may be used interchangeably with "gNB" for convenience of description. That is, a base station described as an eNB may indicate a gNB. Also, the term "terminal" may refer to a mobile phone, a NB-IoT device, a sensor, or another wireless communication device.

The disclosure considers an embodiment in which an integrity protection or verification function is configured in the transmitting or receiving PDCP entity, the transmitting PDCP entity of the transmitting end (UE or base station) performs data transmission by applying an integrity protection procedure to the data received from a higher layer entity, encrypting it, processing it, and delivering it to a lower layer entity, and the receiving PDCP entity of the receiving end (base station or UE) decrypts the data received from a lower layer entity and applies an integrity verification procedure.

In relation to the above embodiment, the disclosure proposes a method for processing data for each bearer and efficient UE operations when the receiving PDCP entity receives and decodes data, performs an integrity verification procedure, and fails in integrity verification of the data. Specifically, the disclosure proposes different operations for a signaling radio bearer (SRB) and a data radio bearer (DRB) as to handling an integrity verification failure operation.

In the disclosure, the bearer may have a meaning including an SRB and a DRB, and the SRB means a signaling radio bearer and indicates a bearer that transmits or receives a radio resource control (RRC) message. And, the DRB means a data radio bearer, and indicates a bearer that transmits or receives user data for each service. Additionally, the UM DRB means a DRB using a radio link control (RLC) entity operating in unacknowledged mode (UM) to support low transmission delay, and the AM DRB means a DRB using an RLC entity operating in acknowledged mode (AM) to guarantee lossless data transmission. In addition, the SRB is characterized in that it always uses an RLC entity operating in AM mode to guarantee lossless data transmission. The SRB may have a meaning including SRB1, SRB2, SRB3, or SRB4.

FIG. 1 is a diagram illustrating the architecture of an LTE system according to an embodiment of the disclosure.

With reference to FIG. 1, as illustrated, the radio access network of the LTE system is composed of a next-generation base station (evolved node B, ENB, Node B or base station) 105, 110, 115 or 120, a mobility management entity (MME) 125, and a serving-gateway (S-GW) 130. A user equipment (UE or terminal) 135 may connect to an external network through the ENBs 105 to 120 and the S-GW 130.

In FIG. 1, the ENBs 105 to 120 correspond to existing Node Bs of the universal mobile telecommunication system (UMTS). The ENB is connected to the UE 135 through a wireless channel, but performs more complex functions in comparison to the existing Node B. In the LTE system, since all user traffic including real-time services like VoIP (Voice over IP) services is served through shared channels, it is necessary to perform scheduling on the basis of collected status information regarding buffers, available transmit powers and channels of the UEs 135, and each of the ENBs 105 to 120 performs this scheduling function. One ENB 105, 110, 115 or 120 controls multiple cells in a typical situation. To achieve a data rate of, for example, 100 Mbps in a bandwidth of, for example, 20 MHz, the LTE system utilizes orthogonal frequency division multiplexing (OFDM) as radio access technology. Also, the LTE system employs adaptive modulation and coding (AMC) to determine the modulation scheme and channel coding rate according to channel states of the UE 135. The S-GW 130 is an entity providing data bearers, and creates and removes data bearers under the control of the MME 125. The MME 125 is an entity in charge of various control functions including a mobility management function for the UE 135, and is connected to a plurality of ENBs 105 to 120.

Figure 2:
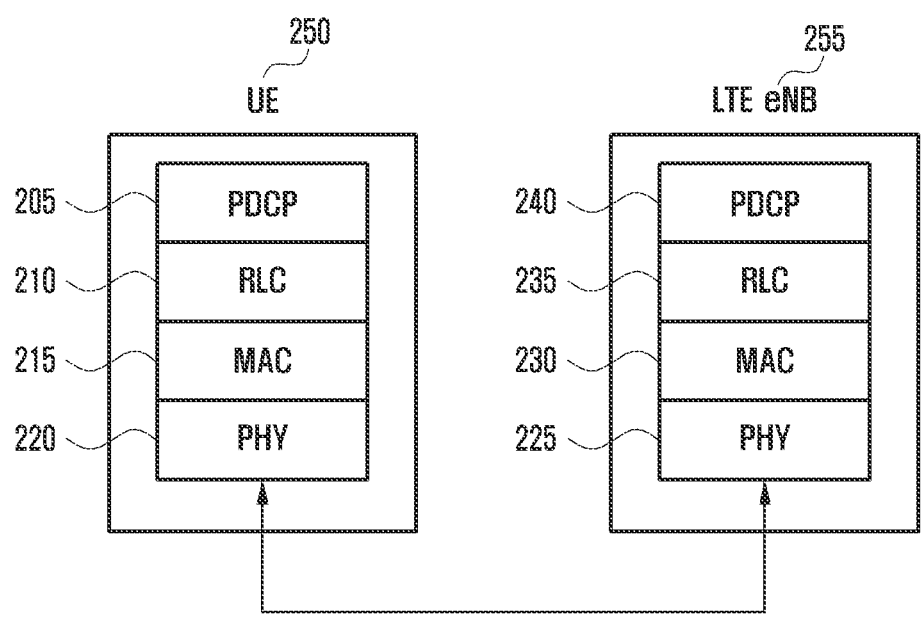
FIG. 2 is a diagram illustrating the structure of radio protocols in the LTE system according to an embodiment of the disclosure.

FIG. 2 is a diagram illustrating the structure of radio protocols in the LTE system according to an embodiment of the disclosure.

With reference to FIG. 2, in a UE or an ENB, the radio protocols of the LTE system is composed of packet data convergence protocol (PDCP) 205 or 240, radio link control (RLC) 210 or 235, and medium access control (MAC) 215 or 230. The PDCP (packet data convergence protocol) 205 or 240 performs compression and decompression of IP headers. The main functions of the PDCP 205 or 240 are summarized as follows.

Header compression and decompression function (header compression and decompression: ROHC only)
User data transfer function (transfer of user data)
In-sequence delivery function (in-sequence delivery of upper layer PDUs at PDCP re-establishment procedure for RLC AM)
Reordering function (for split bearers in DC (only support for RLC AM): PDCP PDU routing for transmission and PDCP PDU reordering for reception)
Duplicate detection function (duplicate detection of lower layer SDUs at PDCP re-establishment procedure for RLC AM)
Retransmission function (retransmission of PDCP SDUs at handover and, for split bearers in DC, of PDCP PDUs at PDCP data-recovery procedure, for RLC AM)
Cipher and decipher function (ciphering and deciphering)
Timer-based SDU discard function (timer-based SDU discard in uplink)

The radio link control (RLC) 210 or 235 reconfigures PDCP PDUs (packet data unit) to a suitable size and performs automatic repeat request (ARQ) operation. The main functions of the RLC 210 or 235 are summarized as follows.

Data transfer function (transfer of upper layer PDUs)
ARQ function (error correction through ARQ (only for AM data transfer))
Concatenation, segmentation and reassembly function (concatenation, segmentation and reassembly of RLC SDUs (only for UM and AM data transfer))
Re-segmentation function (re-segmentation of RLC data PDUs (only for AM data transfer))
Reordering function (reordering of RLC data PDUs (only for UM and AM data transfer))
Duplicate detection function (duplicate detection (only for UM and AM data transfer))
Error detection function (protocol error detection (only for AM data transfer))
RLC SDU discard function (RLC SDU discard (only for UM and AM data transfer))
RLC re-establishment function (RLC re-establishment)

The MAC 215 or 230 is connected with multiple RLC entities in a UE, and it multiplexes RLC PDUs into MAC PDUs and demultiplexes MAC PDUs into RLC PDUs. The main functions of the MAC 215 or 230 are summarized as follows.

> Mapping function (mapping between logical channels and transport channels)
>
> Multiplexing/demultiplexing function (multiplexing/demultiplexing of MAC SDUs belonging to one or different logical channels into/from transport blocks (TB) delivered to/from the physical layer on transport channels)
>
> Scheduling information reporting function (scheduling information reporting)
>
> HARQ function (error correction through HARQ)
>
> Priority handling function between logical channels (priority handling between logical channels of one UE)
>
> Priority handling function between UEs (priority handling between UEs by means of dynamic scheduling)
>
> MBMS service identification function (MBMS service identification)
>
> Transport format selection function (transport format selection)
>
> Padding function (padding)

The physical (PHY) layer 220 or 225 converts higher layer data into OFDM symbols by means of channel coding and modulation and transmits the OFDM symbols through a wireless channel, or it demodulates OFDM symbols received through a wireless channel, performs channel decoding, and forwards the result to a higher layer.

Figure 3:
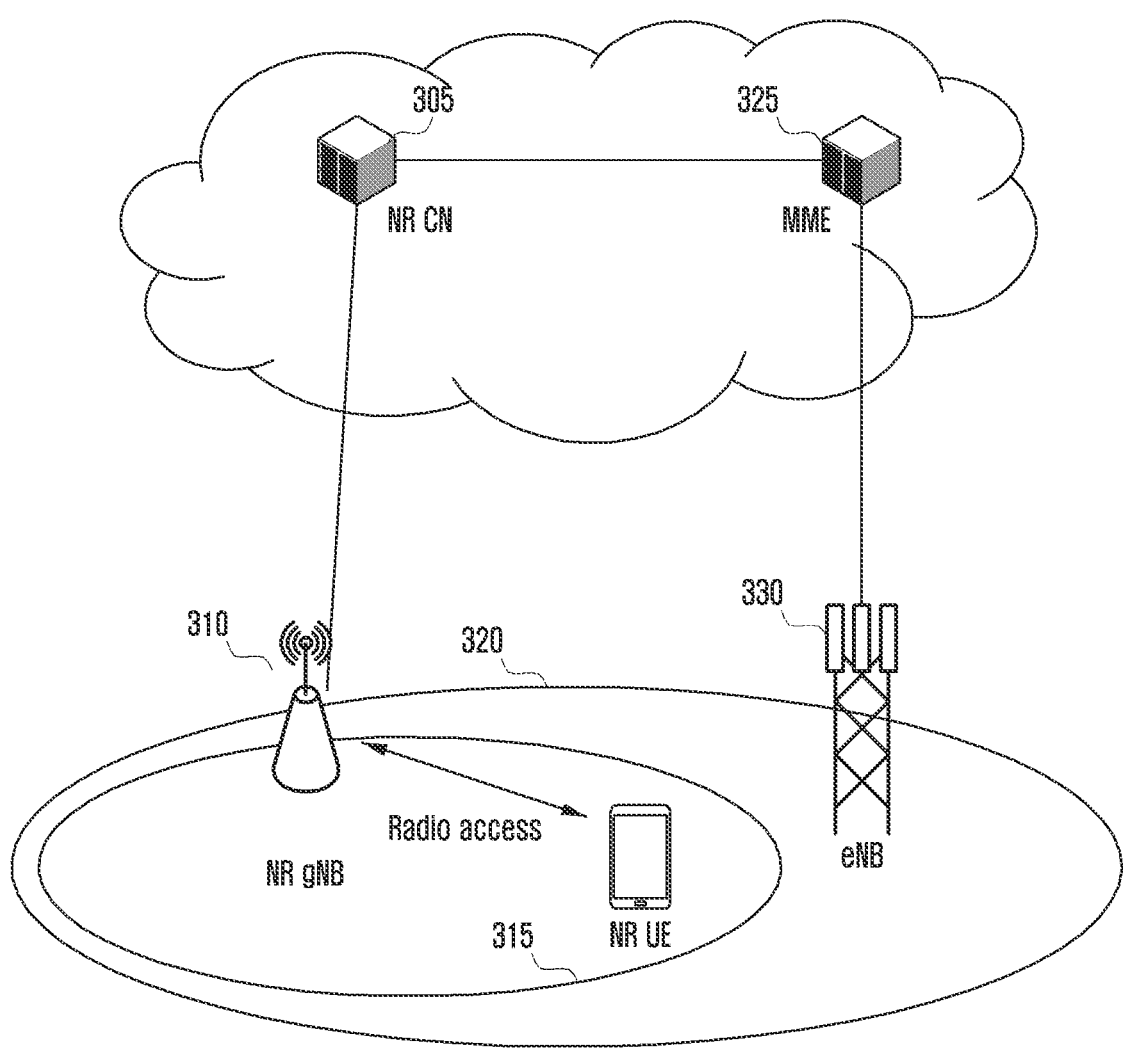
FIG. 3 is a diagram illustrating the architecture of a next-generation mobile communication system according to an embodiment of the disclosure.

FIG. 3 is a diagram illustrating the architecture of a next-generation mobile communication system according to an embodiment of the disclosure.

With reference to FIG. 3, as illustrated, the radio access network of a next-generation mobile communication system (hereinafter, NR or 17) is composed of a new radio node B (hereinafter, NR gNB or NR base station) 310 and a new radio core network (NR CN) 305. A new radio user equipment (hereinafter, NR UE or terminal) 315 connects to an external network through the NR gNB 310 and the NR CN 305.

In FIG. 3, the NR gNB 310 corresponds to an evolved node B (ENB) of the existing LTE system. The NR gNB 310 is connected to the NR UE 315 through a radio channel, and it can provide a more superior service than that of the existing node B. Since all user traffic are serviced through shared channels in the next-generation mobile communication system, there is a need for an entity that performs scheduling by collecting status information, such as buffer states, available transmission power states, and channel states of individual UEs 315, and the NR NB 310 takes charge of this. One NR gNB 310 normally controls a plurality of cells. To implement ultra-high-speed data transmission compared with current LTE, a bandwidth beyond the existing maximum bandwidth may be utilized, and a beamforming technology may be additionally combined with orthogonal frequency division multiplexing (OFDM) serving as a radio access technology. Further, an adaptive modulation and coding (AMC) scheme determining a modulation scheme and channel coding rate to match the channel state of the UE 315 is adopted. The NR CN 305 performs functions such as mobility support, bearer configuration, and quality of service (QoS) configuration. The NR CN 305 is an entity taking charge of not only mobility management but also various control functions for the UE 315, and is connected to a plurality of base stations 310. In addition, the next-generation mobile communication system may interwork with the existing LTE system, and the NR CN 305 is connected to the MME 325 through a network interface. The MME 325 is connected to an ENB 330 being an existing base station.

Figure 4:
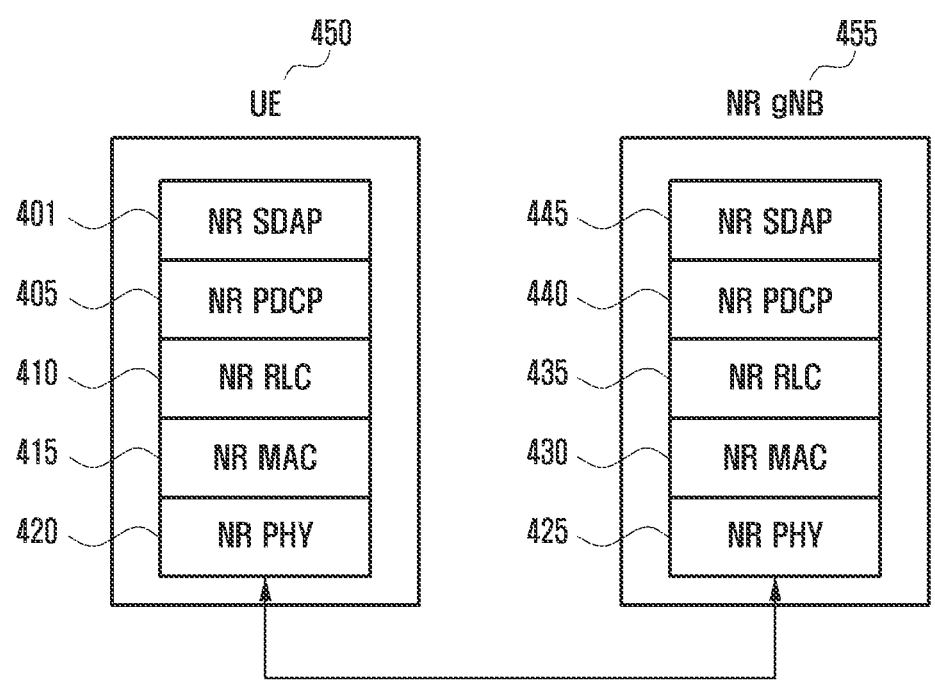
FIG. 4 is a diagram illustrating the structure of radio protocols in the next-generation mobile communication system according to an embodiment of the disclosure.

FIG. 4 is a diagram illustrating the structure of radio protocols in the next-generation mobile communication system according to an embodiment of the disclosure.

With reference to FIG. 4, in a UE or an NR gNB, the radio protocols of the next-generation mobile communication system are composed of NR SDAP 401 or 445, NR PDCP 405 or 440, NR RLC 410 or 435, and NR MAC 415 or 430.

The main functions of the NR SDAP 401 or 445 may include some of the following functions.

> User data transfer function (transfer of user plane data)
>
> Mapping function between QoS flow and data bearer for uplink and downlink (mapping between a QoS flow and a DRB for both DL and UL)
>
> QoS flow ID marking function for uplink and downlink (marking QoS flow ID in both DL packets and UL packets)
>
> Function of mapping reflective QoS flow to data bearer for uplink SDAP PDUs (reflective QoS flow to DRB mapping for the UL SDAP PDUs)

With respect to the SDAP entity 401 or 445, the UE may be configured with, through an RRC message, whether to use a header of the SDAP entity or whether to use a function of the SDAP entity for each PDCP entity, bearer, or logical channel. Also, if a SDAP header is configured, the SDAP entity may use a NAS reflective QoS 1-bit indication and AS reflective QoS 1-bit indication of the SDAP header to instruct the UE to update or reconfigure the mapping information between QoS flows and data bearers for the uplink and downlink. The SDAP header may include QoS flow ID information indicating the QoS. The QoS information may be used as data processing priority and scheduling information for supporting smooth services.

The main function of the NR PDCP 405 or 440 may include some of the following functions.

> Header compression and decompression function (header compression and decompression: ROHC only)
>
> User data transfer function (transfer of user data)
>
> In-sequence delivery function (in-sequence delivery of upper layer PDUs)
>
> Out-of-sequence delivery function (out-of-sequence delivery of upper layer PDUs)
>
> Reordering function (PDCP PDU reordering for reception)
>
> Duplicate detection function (duplicate detection of lower layer SDUs)
>
> Retransmission function (retransmission of PDCP SDUs)
>
> Cipher and decipher function (ciphering and deciphering)
>
> Timer-based SDU discard function (timer-based SDU discard in uplink)

In the above description, the reordering function of the NR PDCP entity 405 or 440 may mean reordering of PDCP PDUs received from a lower layer in order based on the PDCP sequence number (SN). In addition, the reordering function may include delivering data to an upper layer in reordered sequence, directly delivering data without considering the order, recording lost PDCP PDUs through reordering, reporting the status of lost PDCP PDUs to the transmitting side, or requesting retransmission of the lost PDCP PDUs.

The main function of the NR RLC 410 or 435 may include some of the following functions.

> Data transfer function (transfer of upper layer PDUs)
>
> In-sequence delivery function (in-sequence delivery of upper layer PDUs)

Out-of-sequence delivery function (out-of-sequence delivery of upper layer PDUs)

ARQ function (error correction through ARQ)

Concatenation, segmentation and reassembly function (concatenation, segmentation and reassembly of RLC SDUs)

Re-segmentation function (re-segmentation of RLC data PDUs)

Reordering function (reordering of RLC data PDUs)

Duplicate detection function (duplicate detection)

Error detection function (protocol error detection)

RLC SDU discard function (RLC SDU discard)

RLC re-establishment function (RLC re-establishment)

In the above description, in-sequence delivery of the NR RLC entity 410 or 435 may mean in-sequence delivery of RLC SDUs received from a lower layer to an upper layer. Also, in-sequence delivery may include reassembly and delivery of RLC SDUs when several RLC SDUs belonging to one original RLC SDU are received after segmentation, and reordering of received RLC PDUs based on the RLC sequence number (SN) or the PDCP SN. In addition, in-sequence delivery may include recording lost RLC PDUs through reordering, reporting the status of the lost RLC PDUs to the transmitting side, and requesting retransmission of the lost RLC PDUs. Further, if there is a lost RLC SDU, in-sequence delivery may include in-sequence delivery of only RLC SDUs before the lost RLC SDU to an upper layer. Further, although there is a lost RLC SDU, if a specified timer has expired, in-sequence delivery may include in-sequence delivery of all the RLC SDUs received before the starting of the timer to an upper layer, or may include in-sequence delivery of all the RLC SDUs received up to now to an upper layer. In addition, the NR RLC entity 410 or 435 may process RLC PDUs in the order of reception (in the order of their arrival regardless of the order of the sequence number), and transfer them to the PDCP entity in an out-of-sequence delivery manner, and in the case of a segment, the NR RLC entity 410 or 435 may concatenate segments stored in the buffer or received later into one whole RLC PDU, process it, and transfer it to the PDCP entity. The NR RLC layer 410 or 435 may not include a concatenation function, and this function may be performed by the NR MAC layer 415 or 430 or may be replaced with a multiplexing function of the NR MAC layer.

Out-of-sequence delivery of the NR RLC entity 410 or 435 described above means a function of transferring RLC SDUs received from a lower layer directly to a higher layer regardless of their order; if several RLC SDUs belonging to one original RLC SDU are received after segmentation, out-of-sequence delivery may include reassembly and delivery of the RLC SDUs; and out-of-sequence delivery may include storing the RLC SNs or PDCP SNs of received RLC PDUs and ordering them to record lost RLC PDUs.

The NR MAC 415 or 430 may be connected to several NR RLC entities configured in one UE, and the main function of the NR MAC 415 or 430 may include some of the following functions.

Mapping function (mapping between logical channels and transport channels)

Multiplexing and demultiplexing function (multiplexing/demultiplexing of MAC SDUs)

Scheduling information reporting function (scheduling information reporting)

HARQ function (error correction through HARQ)

Priority handling function between logical channels (priority handling between logical channels of one UE)

Priority handling function between UEs (priority handling between UEs by means of dynamic scheduling)

MBMS service identification function (MBMS service identification)

Transport format selection function (transport format selection)

Padding function (padding)

The NR PHY 420 or 425 may compose OFDM symbols from higher layer data through channel coding and modulation and transmit them through a radio channel, or may demodulate and channel-decode OFDM symbols received through a radio channel and forward the result to a higher layer.

Figure 5:
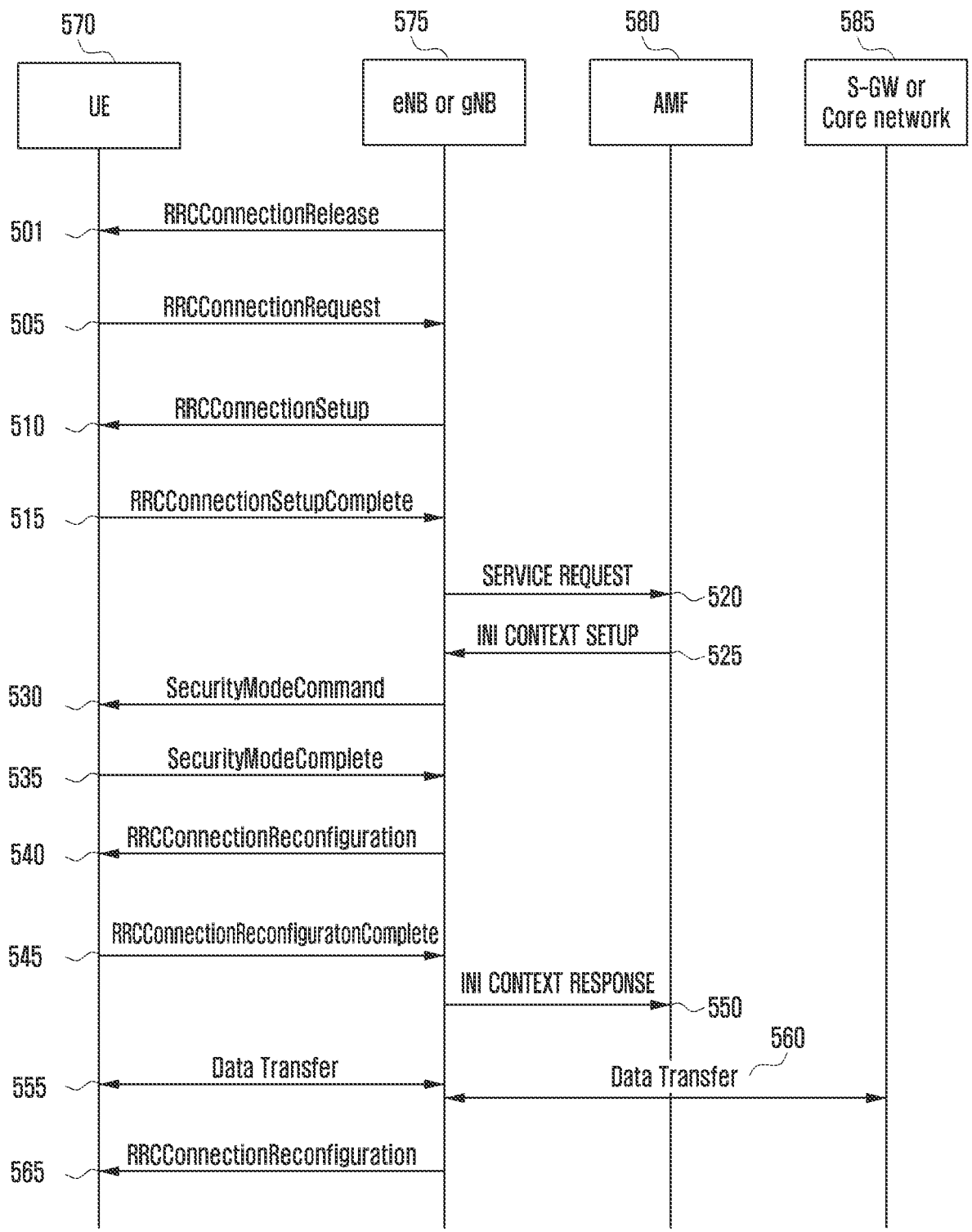
FIG. 5 is a diagram illustrating a procedure for establishing an RRC connection with the base station when a UE establishes a connection with the network in a next-generation mobile communication system according to an embodiment of the disclosure.

FIG. 5 is a diagram illustrating a procedure for establishing an RRC connection with the base station when a UE establishes a connection with the network in a next-generation mobile communication system according to an embodiment of the disclosure.

With reference to FIG. 5, if the UE 570 having transmitted and received data in RRC connected mode does not transmit or receive data for a specific reason or for a preset time, the base station 575 may transmit an RRCConnectionRelease message to the UE to allow the UE 570 to transition to RRC idle mode (501). Later, when data to be transmitted is generated, the UE without a currently established connection (hereinafter, idle mode UE 570) may perform an RRC connection establishment process with the base station 575.

The UE 570 may establish reverse transmission synchronization with the base station through a random access process and transmit an RRCConnectionRequest message to the base station (505). The RRCConnectionRequest message may include an identifier of the UE 570 and a reason for connection establishment (establishmentCause).

The base station 575 may transmit an RRCConnectionSetup message to the UE to allow the UE 570 to establish an RRC connection (510). The RRCConnectionSetup message may include at least one of configuration information for each logical channel, configuration information for each bearer, configuration information for a PDCP entity, configuration information for an RLC entity, or configuration information for a MAC entity.

Through the RRCConnectionSetup message, a bearer identifier (e.g., SRB identifier or DRB identifier) may be assigned to each bearer, and configurations of the PDCP entity, RLC entity, MAC entity, and PHY entity may be indicated for each bearer. In addition, through the RRCConnectionSetup message, it is possible to set the length (e.g., 12 bits or 18 bits) of the PDCP sequence number used in the PDCP entity for each bearer, and to set the length (e.g., 6 bits, 12 bits, or 18 bits) of the RLC sequence number used in the RLC entity for each bearer. Further, through the RRCConnectionSetup message, it is possible to indicate, for each bearer, whether to use the header compression and decompression protocol in the uplink or downlink for the PDCP entity, and to indicate whether to perform an integrity protection or verification procedure. Further, the RRCConnectionSetup message may indicate whether to perform out-of-order delivery in the PDCP entity. Further, the RRCConnectionSetup message may set the number of integrity verification failures for each bearer to allow the PDCP entity to trigger, when an integrity verification failure occurs, a procedure for reporting the integrity verification failure to the network or an RRC connection reestablishment procedure, or may include an indicator indicating whether to trigger a procedure for reporting an integrity verification failure to the network or an RRC connection reestablishment procedure when an integrity verification procedure failure occurs. If the number of integrity verification failures is set through the RRC message, when the received data fails the integrity verification procedure more than or equal to the number of integrity verification failures set above, the receiving PDCP entity may report an integrity verification failure to a higher layer entity (e.g., RRC entity), and the higher layer entity (e.g., RRC entity) may trigger an RRC connection reestablishment procedure or a procedure for reporting an integrity verification failure to the network (as another method, the PDCP entity may report an integrity verification failure through an indicator of the PDCP header or PDCP control data (e.g., PDCP status report or new PDCP control data)). Hence, it is possible to reduce the UE processing burden in which the receiving PDCP entity reports an integrity verification failure to a higher layer entity (e.g., RRC entity) whenever an integrity verification failure occurs. As another method, if the number of integrity verification failures is set through the RRC message, the receiving PDCP entity may report to the RRC entity whenever received data fails the integrity verification procedure, and the RRC entity may trigger an RRC connection reestablishment procedure or a procedure for reporting to the network when the number of integrity verification failures reported from the lower PDCP entity is greater than or equal to the number of integrity verification failures set above. Hence, since the receiving PDCP entity only reports an integrity verification failure to a higher layer entity (e.g., RRC entity), the burden of managing the number of integrity verification failures can be reduced.

The UE 570 having established an RRC connection may transmit an RRCConnectionSetupComplete message to the base station 575 (515). The RRCConnetionSetupComplete message may include a control message called Service Request by which the UE requests the AMF or the MME 580 to configure a bearer for a specific service. The base station may transmit the Service Request message contained in the RRCConnetionSetupComplete message to the AMF or the MME (520). The AMF or the MME may determine whether to provide the service requested by the UE.

Upon determining to provide the service requested by the UE, the AMF or the MME may transmit an Initial Context Setup Request message to the base station (525). The Initial Context Setup Request message may include quality of service (QoS) information to be applied when configuring a data radio bearer (DRB), and security-related information to be applied to the DRB (e.g., security key, security algorithm).

The base station and the UE may exchange a SecurityModeCommand message (530) and a SecurityModeComplete message (535) to configure security. When the security configuration is completed, the base station may transmit an RRCConnectionReconfiguration message to the UE (540).

Through the RRCConnectionReconfiguration message, a bearer identifier (e.g., SRB identifier or DRB identifier) may be assigned to each bearer, and configurations of the PDCP entity, RLC entity, MAC entity, and PHY entity may be indicated for each bearer. Also, through the RRCConnectionReconfiguration message, it is possible to set the length (e.g., 12 bits or 18 bits) of the PDCP sequence number used in the PDCP entity for each bearer, and to set the length (e.g., 6 bits, 12 bits, or 18 bits) of the RLC sequence number used in the RLC entity for each bearer. Further, through the RRCConnectionReconfiguration message, it is possible to indicate, for each bearer, whether to use the header compression and decompression protocol in the uplink or downlink for the PDCP entity, and to indicate whether to perform an integrity protection or verification procedure. Further, it is possible to indicate whether to perform out-of-order delivery in the PDCP entity.

In addition, the RRCConnectionReconfiguration message may include configuration information of a DRB through which user data is to be processed, and the UE may configure a DRB by applying the above information and transmit an RRCConnectionReconfigurationComplete message to the base station (545). The base station having completed DRB setup with the UE may transmit an Initial Context Setup Complete message to the AMF or MME and complete the connection (550).

When all the above processes are completed, the UE can transmit and receive data through the base station and the core network (555, 560). According to some embodiments, the data transmission process is largely composed of three steps: RRC connection establishment, security configuration, and DRB configuration. In addition, the base station may transmit an RRC Connection Reconfiguration message to newly configure, add, or change settings to the UE for a specific reason (565).

Through the RRCConnectionReconfiguration message, a bearer identifier (e.g., SRB identifier or DRB identifier) may be assigned to each bearer, and configurations of the PDCP entity, RLC entity, MAC entity, and PHY entity may be indicated for each bearer. Also, through the RRCConnectionReconfiguration message, it is possible to set the length (e.g., 12 bits or 18 bits) of the PDCP sequence number used in the PDCP entity for each bearer, and to set the length (e.g., 6 bits, 12 bits, or 18 bits) of the RLC sequence number used in the RLC entity for each bearer. Further, through the RRCConnectionReconfiguration message, it is possible to indicate, for each bearer, whether to use the header compression and decompression protocol in the uplink or downlink for the PDCP entity, and to indicate whether to perform an integrity protection or verification procedure. Further, the RRCConnectionReconfiguration message may indicate whether to perform out-of-order delivery in the PDCP entity. Further, the RRCConnectionReconfiguration message may set the number of integrity verification failures for each bearer to allow the PDCP entity to trigger, when an integrity verification failure occurs, a procedure for reporting the integrity verification failure to the network or an RRC connection reestablishment procedure, or may include an indicator indicating whether to trigger a procedure for reporting an integrity verification failure to the network or an RRC connection reestablishment procedure when an integrity verification procedure failure occurs. If the number of integrity verification failures is set through the RRC message, when the received data fails the integrity verification procedure more than or equal to the number of integrity verification failures set above, the receiving PDCP entity may report an integrity verification failure to a higher layer entity (e.g., RRC entity), and the higher layer entity (e.g., RRC entity) may trigger an RRC connection reestablishment procedure or a procedure for reporting an integrity verification failure to the network (as another method, the PDCP entity may report an integrity verification failure through an indicator of the PDCP header or PDCP control data (e.g., PDCP status report or new PDCP control data)). Hence, it is possible to reduce the UE processing burden in which the receiving PDCP entity reports an integrity verification failure to a higher layer entity (e.g., RRC entity) whenever an integrity verification failure occurs. As another method, if the number of integrity verification failures is set through the RRC message, the receiving PDCP entity may report to the RRC entity whenever received data fails the integrity verification procedure, and the RRC entity may trigger an RRC connection reestablishment procedure or a procedure for reporting to the network when the number of integrity verification failures reported from the lower PDCP entity is greater than or equal to the number of integrity verification failures set above. Hence, since the receiving PDCP entity only reports an integrity verification failure to a higher layer entity (e.g., RRC entity), the burden of managing the number of integrity verification failures can be reduced.

The procedure for establishing a connection between the UE and the base station proposed in the disclosure may be applied to connection establishment between a UE and an LTE base station, and may also be applied to connection establishment between a UE and a NR base station.

In the disclosure, the bearer may have a meaning including an SRB and a DRB, and the SRB means a signaling radio bearer and indicates a bearer that transmits or receives an RRC message. And, the DRB means a data radio bearer, and indicates a bearer that transmits or receives user data for each service. Additionally, the UM DRB means a DRB using an RLC entity operating in unacknowledged mode (UM) to support low transmission delay, and the AM DRB means a DRB using an RLC entity operating in acknowledged mode (AM) to guarantee lossless data transmission. In addition, the SRB is characterized in that it always uses an RLC entity operating in AM mode to guarantee lossless data transmission. The SRB may have a meaning including SRB 1, SRB2, SRB3, or SRB4.

The operation of the transmitting PDCP entity of a UE or base station proposed in the disclosure is as follows.

When the transmitting PDCP entity processes data, it uses a first COUNT variable to hold the COUNT value to be assigned to the data to be transmitted next, and the first COUNT variable may be referred to as TX_NEXT.

The operation of a transmitting PDCP entity proposed in the disclosure is as follows.

When the transmitting PDCP entity receives data (e.g., PDCP SDU) from a higher layer, it runs a PDCP data discard timer, and discards the data when the timer expires.

And, the transmitting PDCP entity assigns the COUNT value corresponding to TX_NEXT to the data received from the higher layer. TX_NEXT may be initially set to 0, and TX_NEXT maintains the COUNT value for data to be transmitted next (PDCP SDU).

If a header compression protocol is configured, the transmitting PDCP entity performs header compression on the data.

If integrity protection is configured, the transmitting PDCP entity generates a PDCP header and performs integrity protection on the PDCP header and the data by using a security key and a COUNT value of TX_NEXT assigned to the data.

And, the transmitting PDCP entity performs an encryption procedure on the data by using a security key and the COUNT value of TX_NEXT assigned to the data. Then, it sets the same number of lower LSBs as the PDCP sequence number length from the COUNT value of the TX_NEXT variable as the PDCP sequence number.

Then, the transmitting PDCP entity increases the COUNT value of the TX_NEXT variable by 1, and concatenates the data processed above and the PDCP header together and transmits it to a lower layer.

Figure 6:
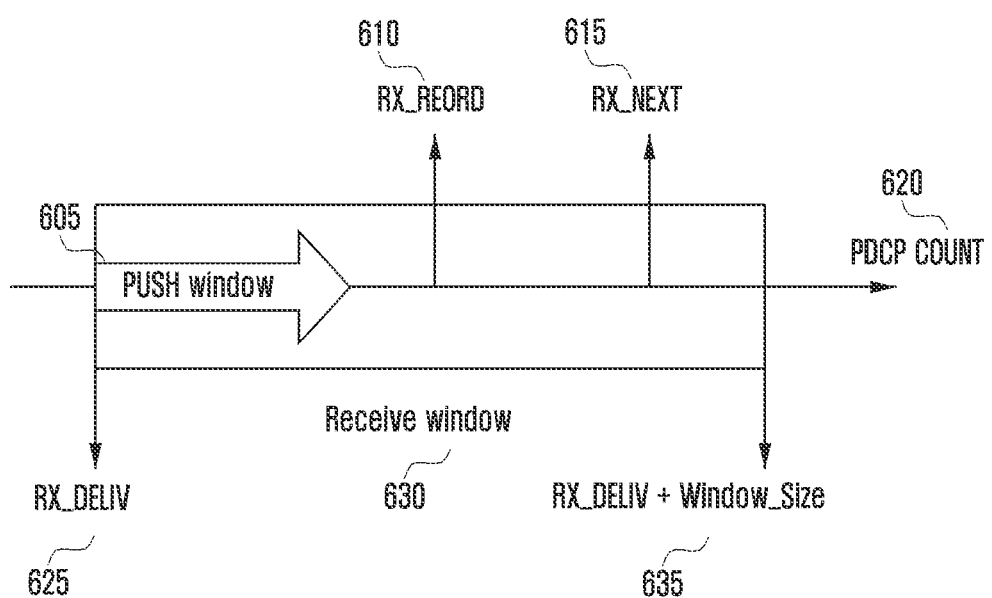
FIG. 6 is a diagram illustrating operations of a receiving PDCP entity according to an embodiment of the disclosure.

FIG. 6 is a diagram illustrating operations of a receiving PDCP entity according to an embodiment of the disclosure.

With reference to FIG. 6, the receiving PDCP entity may use the PDCP sequence number length (e.g., 12 bits or 18 bits) set by the base station through RRC, and may identify the PDCP sequence number of received data (e.g., PDCP PDU) and start the receive window 630. Here, the receive window 630 may be set to a size of half the PDCP sequence number space (e.g., 2^(PDCP SN length−1)), and is used to distinguish valid data. That is, the receiving PDCP entity determines that data received outside the receive window is invalid data and discards it. The reason why data arrives outside the receive window is that the data may arrive very late from a lower layer entity due to retransmission of the RLC entity or HARQ retransmission of the MAC entity. Also, the receiving PDCP entity may run a PDCP reordering timer (t-Reordering timer) together with the receive window.

In the above description, the PDCP reordering timer is triggered when a PDCP sequence number gap occurs with respect to the PDCP sequence number; if the data corresponding to the PDCP sequence number gap does not arrive until the PDCP reordering timer expires, the receiving PDCP entity transfers data to the higher layer entity in order of the PDCP sequence number or in ascending order of the COUNT value and moves the receive window. Hence, if the data corresponding to the PDCP sequence number gap arrives after the PDCP reordering timer expires, it is discarded because it is not data within the receive window.

The detailed procedure of the receiving PDCP entity briefly described above is as follows.

The operations of the receiving PDCP entity of a UE or base station proposed in the disclosure are as follows.

The receiving PDCP entity maintains and manages three COUNT variables when processing received data. When processing received data, the receiving PDCP entity uses a second COUNT variable to maintain the COUNT value of data expected to be received next (e.g., PDCP SDU), and the second COUNT variable may be referred to as RX_NEXT 615. Also, when processing received data, the receiving PDCP entity uses a third COUNT variable that maintains the COUNT value of the first data (e.g., PDCP SDU) that is not delivered to a higher layer, and the third COUNT variable may be referred to as RX_DELIV 625. Further, when processing received data, the receiving PDCP entity uses a fourth COUNT variable that maintains the COUNT value of the data (e.g., PDCP SDU) having triggered the PDCP reordering timer (t-Reordering timer), and the fourth COUNT variable may be referred to as RX_REORD 610. Further, when processing received data, the receiving PDCP entity uses a fifth COUNT variable that maintains the COUNT value of the currently received data (e.g., PDCP SDU), and the fifth COUNT variable may be referred to as RCVD_COUNT. Here, the PDCP reordering timer uses a timer value or interval configured by a higher layer (RRC layer) through an RRC message as in FIG. 5, and this timer is used to detect a lost PDCP PDU, and only one timer is running at a time.

In addition, the UE may define and use the following variables for the operation of the receiving PDCP entity.
  HFN: indicates the HFN (hyper frame number) part of the window state variables
  SN: indicates the sequence number (SN) part of the window state variables
  RCVD_SN: PDCP sequence number included in the header of a received PDCP PDU
  RCVD_HFN: HFN value calculated by the receiving PDCP entity from the received PDCP PDU Detailed operations of the receiving PDCP entity proposed in the disclosure are as follows.

When a PDCP PDU is received from a lower layer, the receiving PDCP entity may determine the COUNT value of the received PDCP PDU as follows.
- 1> If received RCVD_SN<=SN(RX_DELIV)−Window_Size
- ■2> RCVD_HFN=HFN(RX_DELIV)+1 (update).
- 1> Else if RCVD_SN> SN(RX_DELIV)+Window_Size
- ■2> RCVD_HFN=HFN(RX_DELIV)−1 (update)
- 1> If the above is not the case (else)
- ■2> RCVD_HFN=HFN(RX_DELIV) (update)
- 1> RCVD_COUNT=[RCVD_HFN, RCVD_SN] (RCVD_COUNT is determined)

After determining the COUNT value of the received PDCP PDU, the receiving PDCP entity may update the window state variables and process the PDCP PDU as follows.
- 1> Perform decryption on the PDCP PDU by using the RCVD_COUNT value, and perform integrity verification.
- ■2> If integrity verification fails
- ◆3> Indicate integrity verification failure to the upper layer, and discard the received PDCP Data PDU (data part of PDCP PDU).
- 1> If RCVD_COUNT<RX_DELIV or if a PDCP PDU having a value of RCVD_COUNT has been previously received (the case that the PUD has been previously received refers to a case where the PDCP reordering timer expires, the period has elapsed, a packet has arrived outside the receive window, or a packet is duplicated.)
- ■2> Discard the received PDCP Data PDU (data part of PDCP PDU).

If the PDCP PDU received above is not discarded, the receiving PDCP entity may operate as follows.
- 1> Store the PDCP SDU processed above in the receive buffer.
- 1> If RCVD_COUNT>=RX_NEXT
- ■2> Update RX_NEXT with RCVD_COUNT+1
- 1> If outOfOrderDelivery is configured (or, if the receiving PDCP entity indicates an out-of-order delivery operation),
- ■2> Transfer the PDCP SDU to a higher layer.
- 1> If RCVD_COUNT is equal to RX_DELIV,
- ■2> If the PDCP SDU has not previously header-decompressed, perform header decompression and transfer it to a higher layer in order of COUNT values.
- ◆3> Transfer all successive PDCP SDUs starting from the value of COUNT=RX_DELIV to the higher layer.
- ■2> Update RX_DELIV with COUNT value greater than or equal to current RX_DELIV and corresponding to the first PDCP SDU not delivered to the higher layer.
- 1> If the PDCP reordering timer (t-Reordering timer) is running and RX_DELIV is greater than or equal to RX_REORD,
- ■2> Stop and reset the PDCP reordering timer (t-Reordering timer).
- 1> If the PDCP reordering timer (t-Reordering timer) is not running (including the case where the t-Reordering timer is stopped) and RX_DELIV is less than RX_NEXT,
- ■2> Update RX_REORD with RX_NEXT.
- ■2> Start the PDCP reordering timer (t-Reordering timer).

When the PDCP reordering timer (t-Reordering timer) expires, the receiving PDCP entity may operate as follows.
- 1> If the PDCP SDU has not previously header-decompressed, perform header decompression and transfer it to a higher layer in order of COUNT values.
- ■2> Transfer all PDCP SDUs with COUNT less than RX_REORD.
- ■2> Transfer all PDCP SDUs with consecutive COUNT values starting from RX_REORD value.
- 1> Update RX_DELIV with COUNT value greater than or equal to RX_REORD and corresponding to the first PDCP SDU not delivered to the higher layer.
- 1> If RX_DELIV is less than RX_NEXT,
- ■2> Update RX_REORD with RX_NEXT.
- ■2> Start the PDCP reordering timer (t-Reordering timer).

A first embodiment of handling integrity verification failure in the operation of the receiving PDCP entity of the disclosure is as follows.
- ■2> If the receiving PDCP entity fails to verify the integrity of received data,
- ◆3> Indicate an integrity verification failure to a higher layer (e.g., RRC entity), and discard the received PDCP Data PDU (data part of PDCP PDU).

The first embodiment for handling integrity verification failure proposed in the disclosure is characterized in that the receiving PDCP entity performs an integrity verification procedure on received data, indicates an integrity verification failure to an higher layer entity (e.g., RRC entity) whenever an integrity verification failure occurs, and discards the data that has failed integrity verification. However, it is characterized in that the UE performs different operations for individual bearers as follows.

The operation of the UE per bearer in response to the integrity verification failure proposed in the first embodiment is as follows.
- 1> If the RRC entity receives an indication of integrity verification failure from a lower layer entity (e.g., PDCP entity),
- ■2> If the lower layer entity (e.g., PDCP entity) is connected to or configured with an SRB (e.g., SRB1, SRB2, or SRB3),
- ◆3> The RRC entity of the UE triggers an RRC connection reestablishment procedure, and reestablishes a connection with the network.
- ■2> If the lower layer entity (e.g., PDCP entity) is connected to or configured with a DRB,
- ◆3> The RRC entity of the UE ignores the indication of the integrity verification failure. Or, the RRC entity of the UE does not perform any operation even when receiving the integrity verification failure.

A second embodiment of the disclosure proposes a more efficient operation of handling integrity verification failures although based on the operation of the transmitting PDCP entity and the operation of the receiving PDCP entity proposed in the first embodiment.

The second embodiment is characterized in that the receiving PDCP entity performs an integrity verification procedure on received data, indicates an integrity verification failure to a higher layer entity (e.g., RRC entity) whenever an integrity verification failure occurs, and discards the data that has failed integrity verification. However, it is characterized in that different UE operations are performs per bearer as follows.

The operation of the UE per bearer in response to the integrity verification failure proposed in the second embodiment is as follows.

1> If the receiving PDCP entity fails to verify the integrity of received data, or the receiving PDCP entity is configured with or connected to an SRB or DRB,
∎2> Indicate an integrity verification failure to a higher layer (e.g., RRC entity), and discard the received PDCP Data PDU (data part of PDCP PDU).
1> If the RRC entity receives an indication of integrity verification failure from a lower layer entity (e.g., PDCP entity),
∎2> If the lower layer entity (e.g., PDCP entity) is connected to or configured with an SRB (e.g., SRB1, SRB2, or SRB3),
♦3> The RRC entity of the UE triggers an RRC connection reestablishment procedure, and reestablishes a connection with the network.
∎2> If the lower layer entity (e.g., PDCP entity) is connected to or configured with a DRB (that is, if the lower layer entity is not connected to an SRB),
♦3> Increment the first COUNT variable, which counts and stores the number of times an integrity verification failure occurs, by 1, and store it (the first COUNT variable may be initialized to an initial value of 0, and the first COUNT variable may be separately defined for each bearer (e.g., DRB bearer identifier) and be used to count the number of integrity verification failures occurring in each bearer).
♦3> If the first COUNT variable value is greater than or equal to the number of integrity verification failures configured through the RRC message in FIG. 5,
●4> The RRC entity of the UE triggers an RRC connection reestablishment procedure, and reestablishes a connection with the network. As another method, the RRC entity of the UE may compose an integrity verification failure report message and transmit it to the base station without triggering an RRC connection reestablishment procedure. The integrity verification failure report message may include information such as an indicator indicating whether an integrity verification failure has occurred, a bearer identifier, or a logical identifier.
●4> Initialize the first COUNT variable to 0.

A third embodiment of the disclosure proposes a more efficient operation of handling integrity verification failures although based on the operation of the transmitting PDCP entity and the operation of the receiving PDCP entity proposed in the first embodiment.

In the third embodiment, the receiving PDCP entity performs an integrity verification procedure on received data, indicates an integrity verification failure to a higher layer entity (e.g., RRC entity) whenever an integrity verification failure occurs in the SRB, and discards the data that has failed integrity verification; but when an integrity verification failure occurs in the DRB, it is characterized in that the integrity verification failure is indicated to a higher layer entity (e.g., RRC entity) only when it occurs more than a preset number of times. Specifically, it is characterized in that different UE operations are performed per bearer as follows. As described above, since the PDCP entity does not repeatedly make an indication to a higher layer entity (e.g., RRC entity) whenever an integrity verification failure occurs in relation to the DRB, the processing burden of the UE can be reduced.

The operation of the UE per bearer in response to the integrity verification failure proposed in the third embodiment is as follows.

1> If the receiving PDCP entity fails to verify the integrity of received data and the receiving PDCP entity is configured with or connected to an SRB,
∎2> Indicate an integrity verification failure to a higher layer (e.g., RRC entity), and discard the received PDCP Data PDU (data part of PDCP PDU).
–1> If the receiving PDCP entity fails to verify the integrity of received data and the receiving PDCP entity is configured with or connected to a DRB (that is, if the receiving PDCP entity is not connected to an SRB),
∎2> Increment the second COUNT variable, which counts and stores the number of times an integrity verification failure occurs, by 1, and store it (the first COUNT variable may be initialized to an initial value of 0, and the first COUNT variable may be separately defined for each bearer (e.g., DRB bearer identifier) and be used to count the number of integrity verification failures occurring in each bearer).
∎2> If the second COUNT variable value is greater than or equal to the number of integrity verification failures configured through the RRC message in FIG. 5,
♦3> Indicate an integrity verification failure to a higher layer (e.g., RRC entity), and discard the received PDCP Data PDU (data part of PDCP PDU).
♦3> Initialize the second COUNT variable to 0.
1> If the RRC entity receives an indication of integrity verification failure from a lower layer entity (e.g., PDCP entity),
∎2> If the lower layer entity (e.g., PDCP entity) is connected to or configured with an SRB (e.g., SRB1, SRB2, or SRB3),
♦3> The RRC entity of the UE triggers an RRC connection reestablishment procedure, and reestablishes a connection with the network.
∎2> If the lower layer entity (e.g., PDCP entity) is connected to or configured with a DRB,
♦3> The RRC entity of the UE triggers an RRC connection reestablishment procedure, and reestablishes a connection with the network. As another method, the RRC entity of the UE may compose an integrity verification failure report message and transmit it to the base station without triggering an RRC connection reestablishment procedure. The integrity verification failure report message may include information such as an indicator indicating whether an integrity verification failure has occurred, a bearer identifier, or a logical identifier.

A fourth embodiment of the disclosure proposes a more efficient operation of handling integrity verification failures although based on the operation of the transmitting PDCP entity and the operation of the receiving PDCP entity proposed in the first embodiment.

In the fourth embodiment, the receiving PDCP entity performs an integrity verification procedure on received data, indicates an integrity verification failure to a higher layer entity (e.g., RRC entity) whenever an integrity verification failure occurs in the SRB, and discards the data that has failed integrity verification; but when an integrity verification failure occurs in the DRB, it is characterized in that the receiving PDCP entity reports an integrity verification failure to the transmitting PDCP entity through an indicator of the PDCP header or PDCP control data (e.g., PDCP status report or new PDCP control data) only when integrity verification failure occurs more than a preset number of times. Specifically, it is characterized in that different UE operations are performed per bearer as follows. As described above, since the PDCP entity does not make an indication to a higher layer entity (e.g., RRC entity) even when an integrity verification failure occurs with respect to the DRB, the processing burden of the UE can be reduced.

The operation of the UE per bearer in response to the integrity verification failure proposed in the fourth embodiment is as follows.

1> If the receiving PDCP entity fails to verify the integrity of received data and the receiving PDCP entity is configured with or connected to an SRB,
 ■2> Indicate an integrity verification failure to a higher layer (e.g., RRC entity), and discard the received PDCP Data PDU (data part of PDCP PDU).
1> If the receiving PDCP entity fails to verify the integrity of received data and the receiving PDCP entity is configured with or connected to a DRB (or, if the receiving PDCP entity is not connected to an SRB),
 ■2> Increment the second COUNT variable, which counts and stores the number of times an integrity verification failure occurs, by 1, and store it (the second COUNT variable may be initialized to an initial value of 0, and the second COUNT variable may be separately defined for each bearer (e.g., DRB bearer identifier) and be used to count the number of integrity verification failures occurring in each bearer).
 ■2> If the second COUNT variable value is greater than or equal to the number of integrity verification failures configured through the RRC message in FIG. 5,
  ◆3> The receiving PDCP entity reports an integrity verification failure to the transmitting PDCP entity through an indicator of the PDCP header or PDCP control data (e.g., PDCP status report or new PDCP control data), and discards the received PDCP Data PDU (data part of PDCP PDU).
  ◆3> Initialize the second COUNT variable to 0.
1> If the RRC entity receives an indication of integrity verification failure from a lower layer entity (e.g., PDCP entity),
 ■2> If the lower layer entity (e.g., PDCP entity) is connected to or configured with an SRB (e.g., SRB1, SRB2, or SRB3),
  ◆3> The RRC entity of the UE triggers an RRC connection reestablishment procedure, and reestablishes a connection with the network.
 ■2> If the lower layer entity (e.g., PDCP entity) is connected to or configured with a DRB,
  ◆3> The RRC entity of the UE ignores the indication of the integrity verification failure, or does not perform any operation even when receiving the integrity verification failure.

A fifth embodiment of the disclosure proposes a more efficient operation of handling integrity verification failures although based on the operation of the transmitting PDCP entity and the operation of the receiving PDCP entity proposed in the first embodiment.

In the fifth embodiment, the receiving PDCP entity performs an integrity verification procedure on received data, indicates an integrity verification failure to a higher layer entity (e.g., RRC entity) whenever an integrity verification failure occurs in the SRB, and discards the data that has failed integrity verification; but when an integrity verification failure occurs in the DRB, it is characterized in that the receiving PDCP entity reports an integrity verification failure to the transmitting PDCP entity through an indicator of the PDCP header or PDCP control data (e.g., PDCP status report or new PDCP control data). Specifically, it is characterized in that different UE operations are performed per bearer as follows. As described above, since the PDCP entity does not make an indication to a higher layer entity (e.g., RRC entity) even when an integrity verification failure occurs in relation to the DRB, the processing burden of the UE can be reduced.

The operation of the UE per bearer in response to the integrity verification failure proposed in the fifth embodiment is as follows.

1> If the receiving PDCP entity fails to verify the integrity of received data and the receiving PDCP entity is configured with or connected to an SRB,
 ■2> Indicate an integrity verification failure to a higher layer (e.g., RRC entity), and discard the received PDCP Data PDU (data part of PDCP PDU).
1> If the receiving PDCP entity fails to verify the integrity of received data and the receiving PDCP entity is configured with or connected to a DRB (that is, if the receiving PDCP entity is not connected to an SRB),
 ■2> The receiving PDCP entity reports an integrity verification failure to the transmitting PDCP entity through an indicator of the PDCP header or PDCP control data (e.g., PDCP status report or new PDCP control data), and discards the received PDCP Data PDU (data part of PDCP PDU).
1> If the RRC entity receives an indication of integrity verification failure from a lower layer entity (e.g., PDCP entity),
 ■2> If the lower layer entity (e.g., PDCP entity) is connected to or configured with an SRB (e.g., SRB1, SRB2, or SRB3),
  ◆3> The RRC entity of the UE triggers an RRC connection reestablishment procedure, and reestablishes a connection with the network.
 ■2> If the lower layer entity (e.g., PDCP entity) is connected to or configured with a DRB,
  ◆3> The RRC entity of the UE ignores the indication of the integrity verification failure, or does not perform any operation even when receiving the integrity verification failure.

By applying the second embodiment, the third embodiment, the fourth embodiment, or the fifth embodiment proposed above in the disclosure for efficiently handling integrity verification failures, when the transmitting PDCP entity (e.g., base station) receives a report that an integrity verification failure has occurred in relation to the DRB through an RRC message or an indicator of the PDCP header or PDCP control data, the base station may remap QoS flows, which are mapped to the bearer corresponding to or connected to the PDCP entity, to another bearer (or, default DRB). That is, when an integrity verification failure occurs in relation to a DRB, as RRC connection reestablishment causes data transmission delay, the base station no longer performs data transmission and reception through the bearer in which an integrity verification failure has occurred, configures the UE with a configuration to map QoS flows (e.g., data services) mapped to the above bearer to another bearer, and performs data transmission and reception for the QoS flows through the other bearer, in which case it is possible to prevent data transmission delay and enhance security. This is because integrity verification failure is caused by a protocol error or a hacker's attack, and it is desirable not to use the bearer having failed integrity verification any more, assuming that it has been exposed to attack.

In addition, as a method of UE implementation in the above embodiments, to reduce the processing burden for the receiving PDCP entity to make an indication to an RRC entity whenever an integrity verification failure occurs, in the case of the DRB, even if an integrity verification failure occurs, the receiving PDCP entity may be implemented so that it does not indicate the integrity verification failure to the RRC entity.

Figure 7:
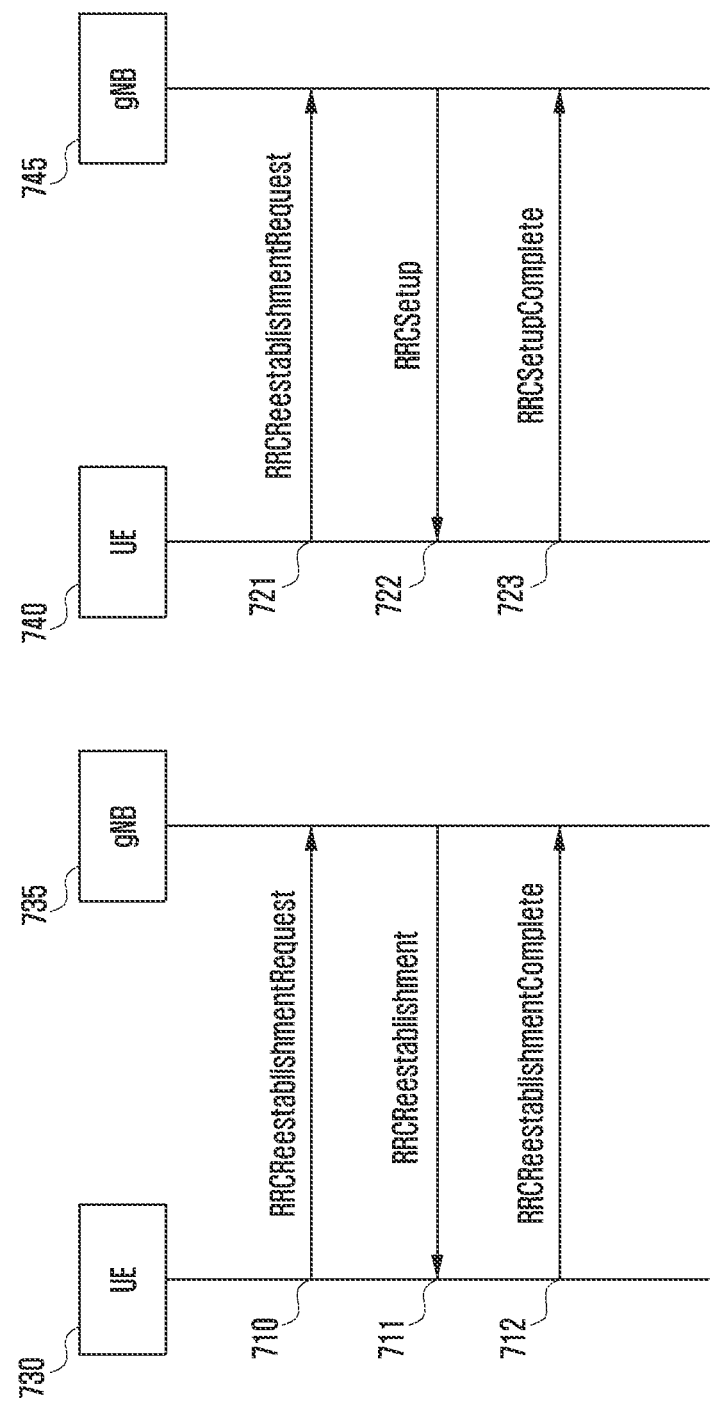
FIG. 7 is a diagram illustrating an RRC reestablishment procedure for the UE according to an embodiment of the disclosure.

FIG. 7 is a diagram illustrating an RRC reestablishment procedure for the UE according to an embodiment of the disclosure.

In FIG. 7, the UE may trigger an RRC connection reestablishment procedure to reestablish a connection with the network when the network connection signal is less than a specific threshold value, an integrity verification failure occurs in the SRB (or DRB), or a specified timer expires. The UE may compose an RRC connection reestablishment message and transmit it to the base station at step 710 or step 721.

And, if the base station receiving the RRC connection reestablishment request message is a base station to which the UE has previously established a connection, the base station may compose an RRC connection reestablishment message and transmit it to the UE (711). Then, the UE may transmit an RRC reestablishment complete message to the base station to thereby reestablish a connection (712).

However, if the base station is not a base station to which the UE has previously established a connection, the base station may transmit an RRCSetup message to establish a new connection with the UE (722). Then, the UE may transmit an RRCSetupComplete message to the base station to thereby establish a new connection (723).

Figure 8:
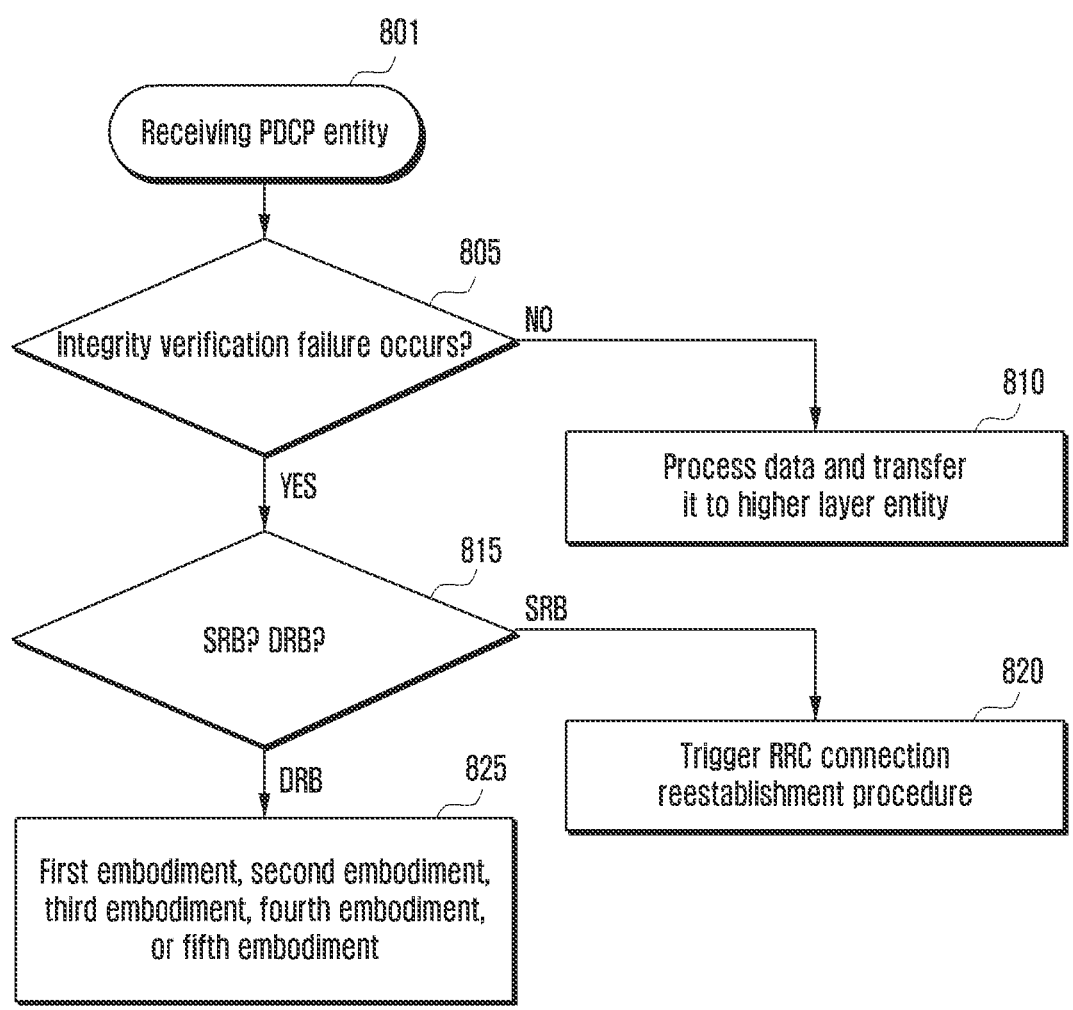
FIG. 8 is a diagram illustrating operations of a receiving PDCP entity according to an embodiment of the disclosure.

FIG. 8 is a diagram illustrating operations of a receiving PDCP entity according to an embodiment of the disclosure.

In FIG. 8, the receiving PDCP entity may perform an integrity verification procedure on received data, and if an integrity verification failure does not occur (805), it may process the data and transfer the data to a higher layer entity (810). On the other hand, if an integrity verification failure has occurred (815), the UE operation for the SRB may be performed according to the first embodiment, the second embodiment, the third embodiment, the fourth embodiment, or the fifth embodiment proposed in the disclosure (820), and the UE operation for the DRB may be performed (825).

Figure 9:
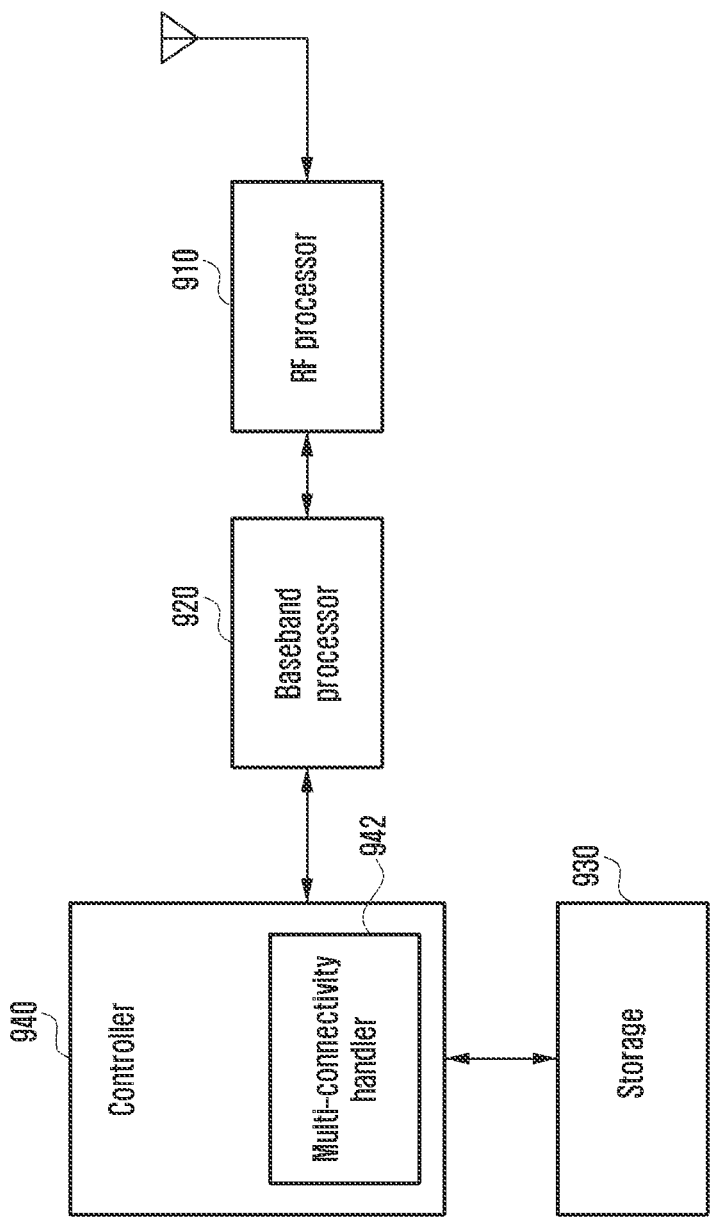
FIG. 9 shows the structure of a UE, to which an embodiment of the disclosure can be applied.

FIG. 9 shows the structure of a UE, to which an embodiment of the disclosure can be applied.

With reference to FIG. 9, the UE includes a radio frequency (RF) processor 910, a baseband processor 920, a storage 930, and a controller 940.

The RF processor 910 performs a function for transmitting and receiving a signal through a radio channel, such as signal band conversion and amplification. That is, the RF processor 910 performs up-conversion of a baseband signal provided from the baseband processor 920 into an RF-band signal and transmits it through an antenna, and performs down-conversion of an RF-band signal received through an antenna into a baseband signal. For example, the RF processor 910 may include a transmission filter, a reception filter, an amplifier, a mixer, an oscillator, a digital-to-analog converter (DAC), and an analog-to-digital converter (ADC). Although only one antenna is illustrated in the drawing, the UE may be provided with a plurality of antennas. Also, the RF processor 910 may include a plurality of RF chains. Further, the RF processor 910 may perform beamforming. For beamforming, the RF processor 910 may adjust phases and magnitudes of signals transmitted and received through the plural antennas or antenna elements. Further, the RF processor 910 may perform MIMO, and may receive several layers during a MIMO operation. The RF processor 910 may perform reception beam sweeping through proper configuration of plural antennas or antenna elements under the control of the controller, or may adjust the direction and width of the reception beam so that the reception beam cooperates with the transmission beam.

The baseband processor 920 performs conversion between a baseband signal and a bit string in accordance with the physical layer specification of the system. For example, during data transmission, the baseband processor 920 generates complex symbols by encoding and modulating a transmission bit string. Further, during data reception, the baseband processor 920 restores a reception bit string by demodulating and decoding a baseband signal provided from the RF processor 910. For example, in the case of utilizing orthogonal frequency division multiplexing (OFDM), for data transmission, the baseband processor 920 generates complex symbols by encoding and modulating a transmission bit string, maps the complex symbols to subcarriers, and composes OFDM symbols through inverse fast Fourier transform (IFFT) operation and cyclic prefix (CP) insertion. Further, for data reception, the baseband processor 920 divides a baseband signal provided from the RF processor 910 in units of OFDM symbols, restores the signals mapped to subcarriers through fast Fourier transform (FFT) operation, and restores the reception bit string through demodulation and decoding.

The baseband processor 920 and the RF processor 910 transmit and receive signals as described above. Hence, the baseband processor 920 and the RF processor 910 may be called a transmitter, a receiver, a transceiver, or a communication unit. Further, to support different radio access technologies, at least one of the baseband processor 920 or the RF processor 910 may include a plurality of communication modules. In addition, to process signals of different frequency bands, at least one of the baseband processor 920 or the RF processor 910 may include different communication modules. For example, the different radio access technologies may include an LTE network and an NR network. Further, the different frequency bands may include a super high frequency (SHF) band (e.g., 2.17 Hz, 17 hz) and a millimeter wave (mmWave) band (e.g., 60 GHz).

The storage 930 stores data such as basic programs, application programs, and configuration information for the operation of the UE. The storage 930 provides stored data in response to a request from the controller 940.

The controller 940 controls the overall operation of the UE. For example, the controller 940 transmits and receives signals through the baseband processor 920 and the RF processor 910. Further, the controller 940 writes or reads data to or from the storage 940. To this end, the controller 940 may include at least one processor. For example, the controller 940 may include a communication processor (CP) for controlling communication and an application processor (AP) for controlling higher layers such as application programs.

Figure 10:
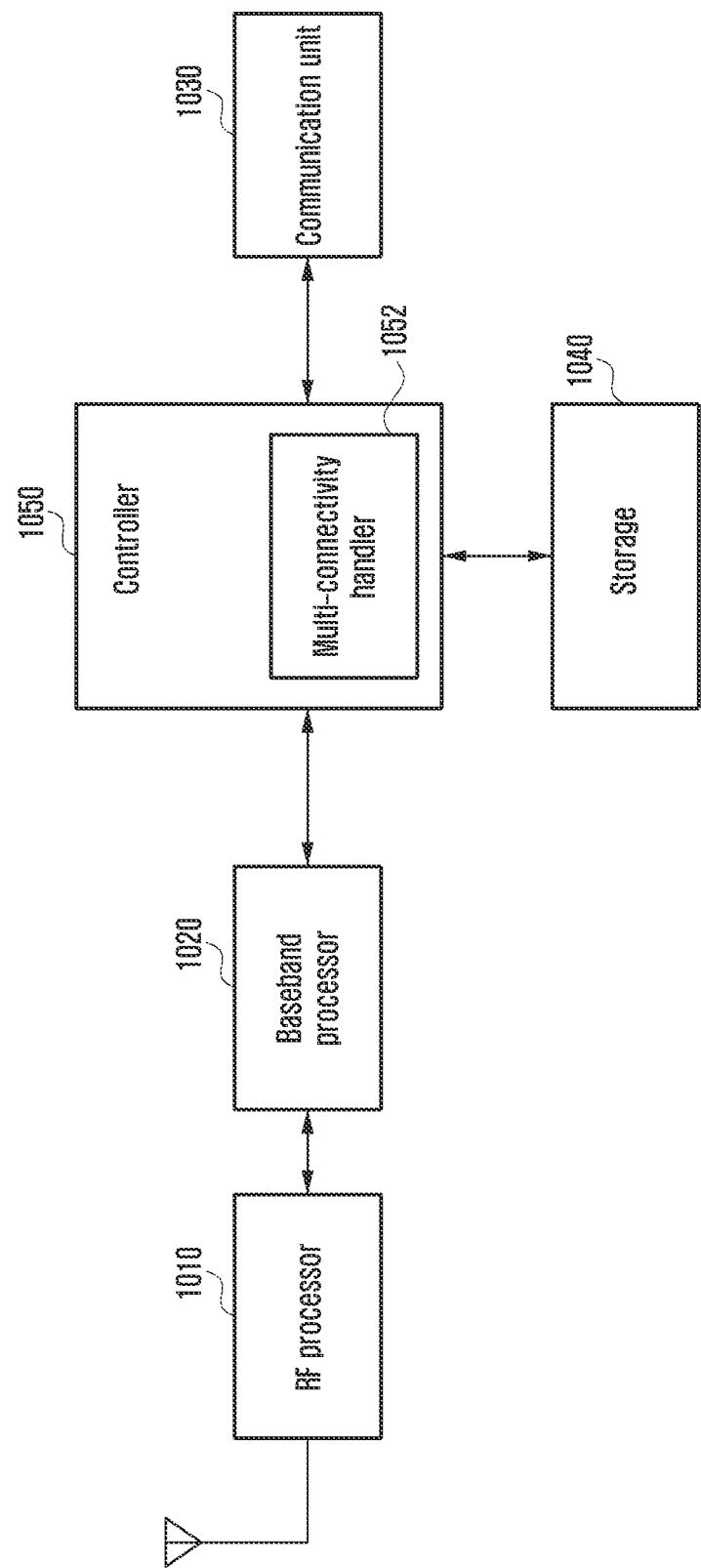
FIG. 10 illustrates a block diagram of a base station in a wireless communication system, to which an embodiment of the disclosure can be applied.

FIG. 10 illustrates a block diagram of a base station in a wireless communication system, to which an embodiment of the disclosure can be applied.

As shown in FIG. 10, the base station includes an RF processor 1010, a baseband processor 1020, a backhaul communication unit 1030, a storage 1040, and a controller 1050.

The RF processor 1010 performs a function for transmitting and receiving a signal through a radio channel, such as signal band conversion and amplification. That is, the RF processor 1010 performs up-conversion of a baseband signal provided from the baseband processor 1020 into an RF-band signal and transmits the converted signal through an antenna, and performs down-conversion of an RF-band signal received through an antenna into a baseband signal. For example, the RF processor 1010 may include a transmission filter, a reception filter, an amplifier, a mixer, an oscillator, a DAC, and an ADC. Although only one antenna is illustrated in the drawing, the base station may be provided with a plurality of antennas. Additionally, the RF processor 1010 may include a plurality of RF chains. Further, the RF processor 1010 may perform beamforming. For beamforming, the RF processor 1010 may adjust phases and amplitudes of signals transmitted and received through plural antennas or antenna elements. The RF processor may perform downlink MIMO operation by transmitting one or more layers.

The baseband processor 1020 performs conversion between a baseband signal and a bit string in accordance with the physical layer specification of a first radio access technology. For example, for data transmission, the baseband processor 1020 generates complex symbols by encoding and modulating a transmission bit string. Further, for data reception, the baseband processor 1020 restores a reception bit string by demodulating and decoding a baseband signal provided from the RF processor 1010. For example, in the case of utilizing OFDM, for data transmission, the baseband processor 1020 generates complex symbols by encoding and modulating a transmission bit string, maps the complex symbols to subcarriers, and composes OFDM symbols through IFFT operation and CP insertion. Further, for data reception, the baseband processor 1020 divides a baseband signal provided from the RF processor 1010 in units of OFDM symbols, restores the signals mapped to the subcarriers through FFT operation, and restores the reception bit string through demodulation and decoding. The baseband processor 1020 and the RF processor 1010 transmit and receive signals as described above. Hence, the baseband processor 1020 and the RF processor 1010 may be called a transmitter, a receiver, a transceiver, a communication unit, or a wireless communication unit.

The backhaul communication unit 1030 provides an interface for communication with other nodes in the network.

The storage 1040 stores data such as basic programs, application programs, and configuration information for the operation of the base station. In particular, the storage 1040 may store information on a bearer allocated to a connected UE and measurement results reported from the connected UE. Further, the storage 1040 may store information used as a criterion for determining whether to provide or suspend multi-connectivity to the UE. In addition, the storage 1040 provides stored data in response to a request from the controller 1050.

The controller 1050 controls the overall operation of the base station. For example, the controller 1050 transmits and receives signals through the baseband processor 1020 and the RF processor 1010 or through the backhaul communication unit 1030. Further, the controller 1050 writes or reads data to or from the storage 1040. To this end, the controller 1050 may include at least one processor.

Figure 11:
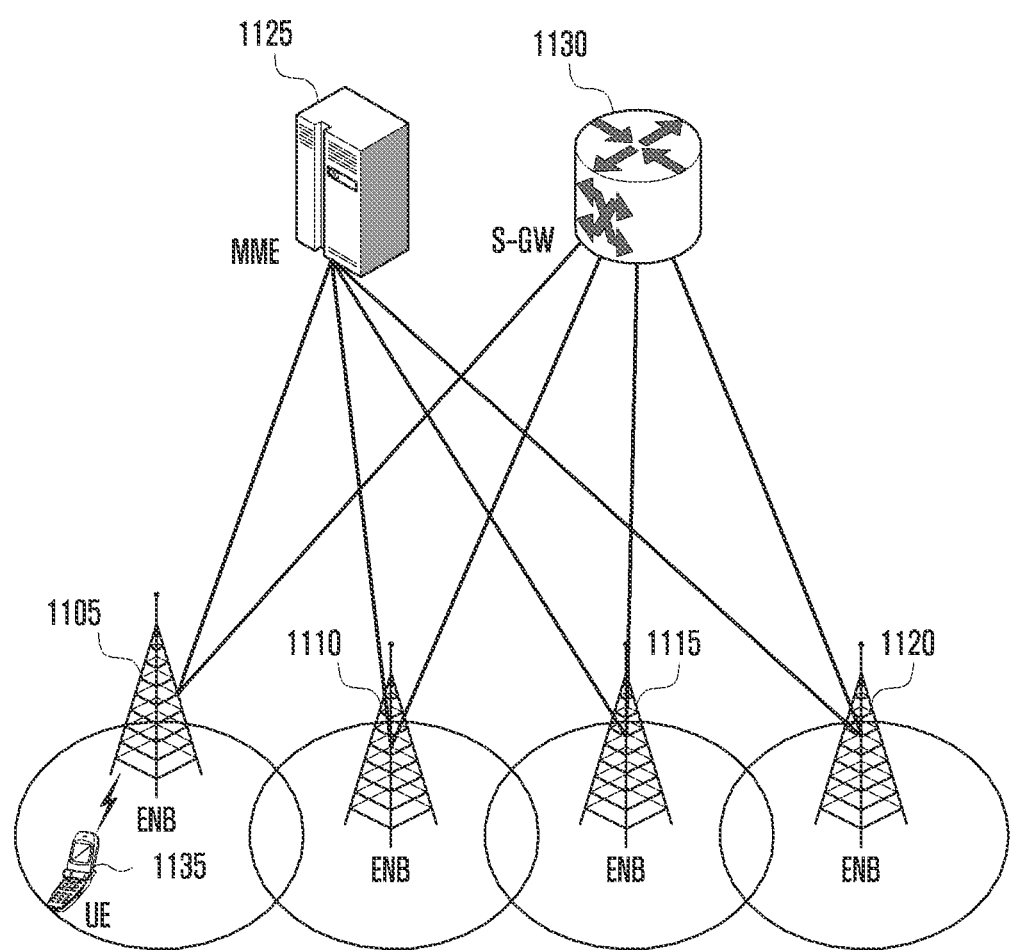
FIG. 11 is a diagram illustrating the architecture of an LTE system according to an embodiment of the disclosure.

FIG. 11 is a diagram illustrating the architecture of an LTE system according to an embodiment of the disclosure.

With reference to FIG. 11, as illustrated, the radio access network of the LTE system is composed of a next-generation base station (evolved node B, ENB, Node B or base station) 1105, 1110, 1115 or 1120, a mobility management entity (MME) 1125, and a serving-gateway (S-GW) 1130. A user equipment (UE or terminal) 1135 may connect to an external network through the ENBs 1105 to 1120 and the S-GW 1130.

In FIG. 11, the ENBs 1105 to 1120 correspond to existing Node Bs of the UMTS system. The ENB is connected to the UE 1135 through a wireless channel, but performs more complex functions in comparison to the existing Node B. In the LTE system, since all user traffic including real-time services like VoIP (Voice over IP) services is served through shared channels, it is necessary to perform scheduling on the basis of collected status information regarding buffers, available transmit powers and channels of the UEs 1135, and each of the ENBs 1105 to 1120 performs this scheduling function. One ENB 1105, 1110, 1115 or 1120 controls multiple cells in a typical situation. To achieve a data rate of, for example, 100 Mbps in a bandwidth of, for example, 20 MHz, the LTE system utilizes orthogonal frequency division multiplexing (OFDM) as radio access technology. Also, it employs adaptive modulation and coding (AMC) to determine the modulation scheme and channel coding rate according to channel states of the UE 1135. The S-GW 1130 is an entity providing data bearers, and creates and removes data bearers under the control of the MME 1125. The MME 1125 is an entity in charge of various control functions including a mobility management function for the UE 1135, and is connected to a plurality of ENBs 1105 to 1120.

Figure 12:
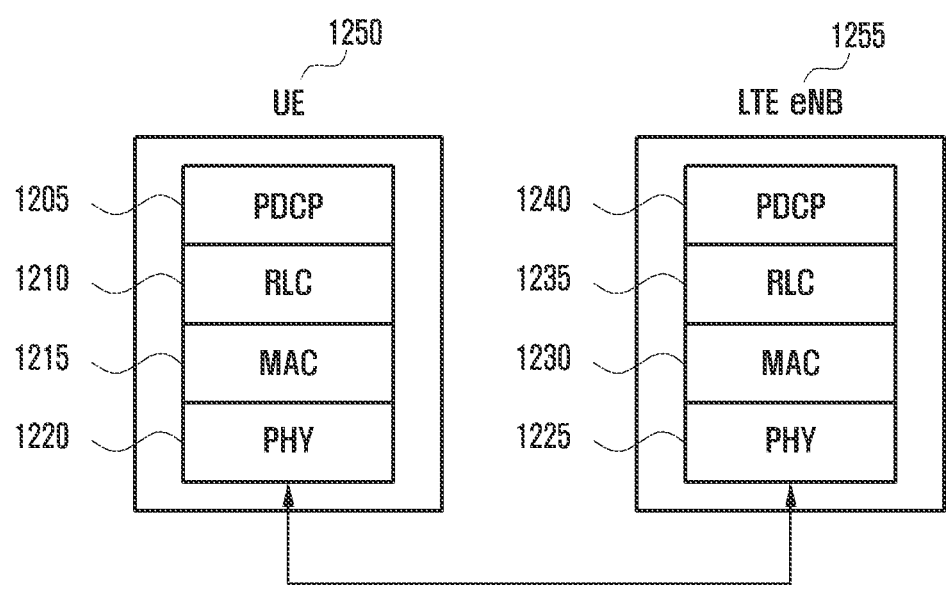
FIG. 12 is a diagram illustrating the structure of radio protocols in the LTE system according to an embodiment of the disclosure.

FIG. 12 is a diagram illustrating the structure of radio protocols in the LTE system according to an embodiment of the disclosure.

With reference to FIG. 12, in a UE or an ENB, the radio protocols of the LTE system is composed of packet data convergence protocol (PDCP) 1205 or 1240, radio link control (RLC) 1210 or 1235, and medium access control (MAC) 1215 or 1230. The PDCP 1205 or 1240 performs compression and decompression of IP headers. The main functions of the PDCP 1205 or 1240 are summarized as follows.

Header compression and decompression function (header compression and decompression: ROHC only)
User data transfer function (transfer of user data)
In-sequence delivery function (in-sequence delivery of upper layer PDUs at PDCP re-establishment procedure for RLC AM)
Reordering function (for split bearers in DC (only support for RLC AM): PDCP PDU routing for transmission and PDCP PDU reordering for reception)
Duplicate detection function (duplicate detection of lower layer SDUs at PDCP re-establishment procedure for RLC AM)
Retransmission function (retransmission of PDCP SDUs at handover and, for split bearers in DC, of PDCP PDUs at PDCP data-recovery procedure, for RLC AM)
Cipher and decipher function (ciphering and deciphering)
Timer-based SDU discard function (timer-based SDU discard in uplink)

The radio link control (RLC) 1210 or 1235 reconfigures PDCP PDUs (packet data unit) to a suitable size and performs an ARQ operation. The main functions of the RLC 1210 or 1235 are summarized as follows.

Data transfer function (transfer of upper layer PDUs)
ARQ function (error correction through ARQ (only for AM data transfer))
Concatenation, segmentation and reassembly function (concatenation, segmentation and reassembly of RLC SDUs (only for UM and AM data transfer))
Re-segmentation function (re-segmentation of RLC data PDUs (only for AM data transfer))
Reordering function (reordering of RLC data PDUs (only for UM and AM data transfer))

Duplicate detection function (duplicate detection (only for UM and AM data transfer))
Error detection function (protocol error detection (only for AM data transfer))
RLC SDU discard function (RLC SDU discard (only for UM and AM data transfer))
RLC re-establishment function (RLC re-establishment)

The MAC 1215 or 1230 is connected with multiple RLC entities in a UE, and it multiplexes RLC PDUs into MAC PDUs and demultiplexes MAC PDUs into RLC PDUs. The main functions of the MAC 1215 or 1230 are summarized as follows.

Mapping function (mapping between logical channels and transport channels)
Multiplexing/demultiplexing function (multiplexing/demultiplexing of MAC SDUs belonging to one or different logical channels into/from transport blocks (TB) delivered to/from the physical layer on transport channels)
Scheduling information reporting function (scheduling information reporting)
HARQ function (error correction through HARQ)
Priority handling function between logical channels (priority handling between logical channels of one UE)
Priority handling function between UEs (priority handling between UEs by means of dynamic scheduling)
MBMS service identification function (MBMS service identification)
Transport format selection function (transport format selection)
Padding function (padding)

The physical (PHY) layer 1220 or 1225 converts higher layer data into OFDM symbols by means of channel coding and modulation and transmits the OFDM symbols through a wireless channel, or it demodulates OFDM symbols received through a wireless channel, performs channel decoding, and forwards the result to a higher layer.

Figure 13:
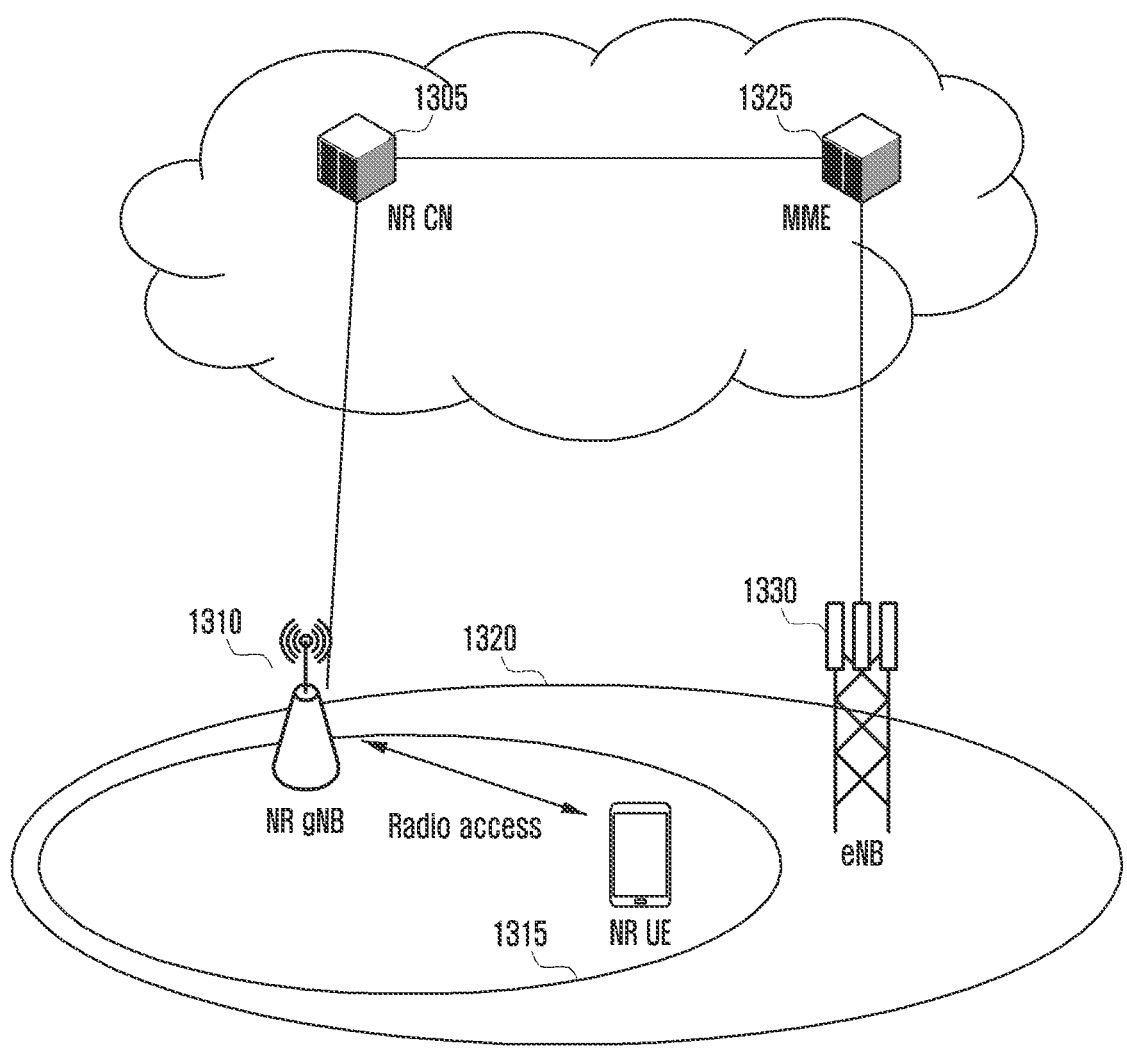
FIG. 13 is a diagram illustrating the architecture of a next-generation mobile communication system according to an embodiment of the disclosure.

FIG. 13 is a diagram illustrating the architecture of a next-generation mobile communication system according to an embodiment of the disclosure.

With reference to FIG. 13, as illustrated, the radio access network of a next-generation mobile communication system (hereinafter, NR or 5G) is composed of a new radio node B (hereinafter, NR gNB or NR base station) 1310 and a new radio core network (NR CN) 1305. A new radio user equipment (hereinafter, NR UE or terminal) 1315 connects to an external network through the NR gNB 1310 and the NR CN 1305.

In FIG. 13, the NR gNB 1310 corresponds to an evolved node B (ENB) of the existing LTE system. The NR gNB 1310 is connected to the NR UE 1315 through a radio channel, and it can provide a more superior service than that of the existing node B. Since all user traffic are serviced through shared channels in the next-generation mobile communication system, there is a need for an entity that performs scheduling by collecting status information, such as buffer states, available transmission power states, and channel states of individual UEs 1315, and the NR NB 1310 takes charge of this. One NR gNB 1310 normally controls a plurality of cells. To implement ultra-high-speed data transmission compared with current LTE, a bandwidth beyond the existing maximum bandwidth may be utilized, and a beamforming technology may be additionally combined with orthogonal frequency division multiplexing (OFDM) serving as a radio access technology. Further, an adaptive modulation and coding (AMC) scheme determining a modulation scheme and channel coding rate to match the channel state of the UE 1315 is adopted. The NR CN 1305 performs functions such as mobility support, bearer configuration, and quality of service (QoS) configuration. The NR CN 1305 is an entity taking charge of not only mobility management but also various control functions for the UE 1315, and is connected to a plurality of base stations 1310. In addition, the next-generation mobile communication system may interwork with the existing LTE system, and the NR CN 1305 is connected to the MME 1325 through a network interface. The MME 1325 is connected to an ENB 1330 being an existing base station.

Figure 14:
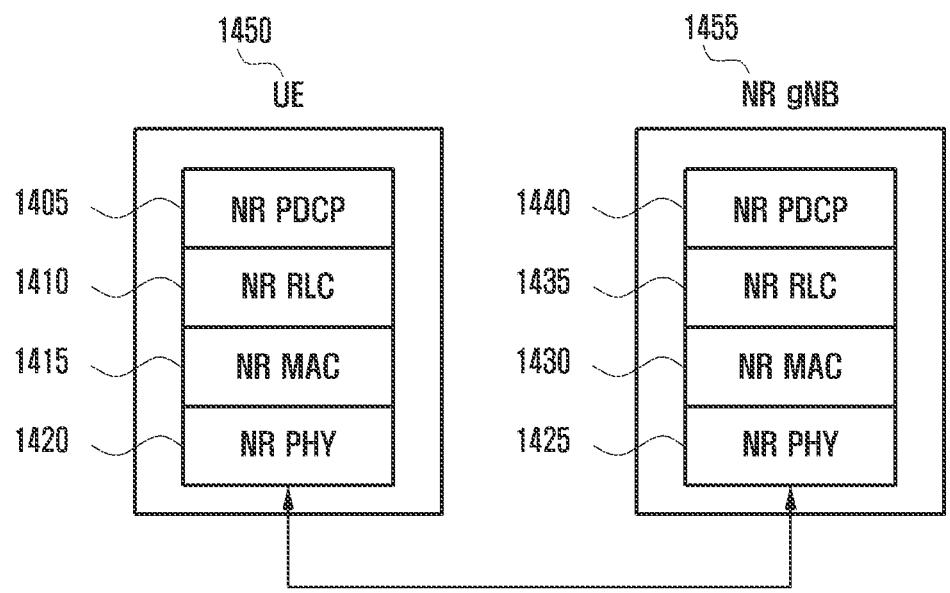
FIG. 14 is a diagram illustrating the structure of radio protocols in the next-generation mobile communication system according to an embodiment of the disclosure.

FIG. 14 is a diagram illustrating the structure of radio protocols in the next-generation mobile communication system according to an embodiment of the disclosure.

With reference to FIG. 14, in a UE or an NR gNB, the radio protocols of the next-generation mobile communication system are composed of NR PDCP 1405 or 1440, NR RLC 1410 or 1435, and NR MAC 1415 or 1430.

The main function of the NR PDCP 1405 or 1440 may include some of the following functions.

Header compression and decompression function (header compression and decompression: ROHC only)
User data transfer function (transfer of user data)
In-sequence delivery function (in-sequence delivery of upper layer PDUs)
Out-of-sequence delivery function (out-of-sequence delivery of upper layer PDUs)
Reordering function (PDCP PDU reordering for reception)
Duplicate detection function (duplicate detection of lower layer SDUs)
Retransmission function (retransmission of PDCP SDUs)
Cipher and decipher function (ciphering and deciphering)
Timer-based SDU discard function (timer-based SDU discard in uplink)

In the above description, the reordering function of the NR PDCP entity 1405 or 1440 may mean reordering of PDCP PDUs received from a lower layer in order based on the PDCP sequence number (SN). In addition, the reordering function may include delivering data to an upper layer in reordered sequence, directly delivering data without considering the order, recording lost PDCP PDUs through reordering, reporting the status of lost PDCP PDUs to the transmitting side, or requesting retransmission of the lost PDCP PDUs.

The main function of the NR RLC 1410 or 1435 may include some of the following functions.

Data transfer function (transfer of upper layer PDUs)
In-sequence delivery function (in-sequence delivery of upper layer PDUs)
Out-of-sequence delivery function (out-of-sequence delivery of upper layer PDUs)
ARQ function (error correction through ARQ)
Concatenation, segmentation and reassembly function (concatenation, segmentation and reassembly of RLC SDUs)
Re-segmentation function (re-segmentation of RLC data PDUs)
Reordering function (reordering of RLC data PDUs)
Duplicate detection function (duplicate detection)
Error detection function (protocol error detection)
RLC SDU discard function (RLC SDU discard)
RLC re-establishment function (RLC re-establishment)

In the above description, in-sequence delivery of the NR RLC entity 1410 or 1435 may mean in-sequence delivery of RLC SDUs received from a lower layer to an upper layer. Also, in-sequence delivery may include reassembly and delivery of RLC SDUs when several RLC SDUs belonging to one original RLC SDU are received after segmentation, and reordering of received RLC PDUs based on the RLC sequence number (SN) or the PDCP SN. In addition, in-sequence delivery may include recording lost RLC PDUs through reordering, reporting the status of the lost RLC PDUs to the transmitting side, and requesting retransmission of the lost RLC PDUs. Further, if there is a lost RLC SDU, in-sequence delivery may include in-sequence delivery of only RLC SDUs before the lost RLC SDU to an upper layer. Further, although there is a lost RLC SDU, if a specified timer has expired, in-sequence delivery may include in-sequence delivery of all the RLC SDUs received before the starting of the timer to an upper layer, or may include in-sequence delivery of all the RLC SDUs received up to now to an upper layer. In addition, the NR RLC entity 1410 or 1435 may process RLC PDUs in the order of reception (in the order of their arrival regardless of the order of the sequence number), and transfer them to the PDCP entity in an out-of-sequence delivery manner, and in the case of a segment, the NR RLC entity 1410 or 1435 may concatenate segments stored in the buffer or received later into one whole RLC PDU, process it, and transfer it to the PDCP entity. The NR RLC layer 1410 or 1435 may not include a concatenation function, and this function may be performed by the NR MAC layer 1415 or 1430 or may be replaced with a multiplexing function of the NR MAC layer.

Out-of-sequence delivery of the NR RLC entity 1410 or 1435 described above means a function of transferring RLC SDUs received from a lower layer directly to a higher layer regardless of their order; if several RLC SDUs belonging to one original RLC SDU are received after segmentation, out-of-sequence delivery may include reassembly and delivery of the RLC SDUs; and out-of-sequence delivery may include storing the RLC SNs or PDCP SNs of received RLC PDUs and ordering them to record lost RLC PDUs.

The NR MAC 1415 or 1430 may be connected to several NR RLC entities configured in one UE, and the main function of the NR MAC 1415 or 1430 may include some of the following functions.

Mapping function (mapping between logical channels and transport channels)
Multiplexing and demultiplexing function (multiplexing/demultiplexing of MAC SDUs)
Scheduling information reporting function (scheduling information reporting)
HARQ function (error correction through HARQ)
Priority handling function between logical channels (priority handling between logical channels of one UE)
Priority handling function between UEs (priority handling between UEs by means of dynamic scheduling)
MBMS service identification function (MBMS service identification)
Transport format selection function (transport format selection)
Padding function (padding)

The NR PHY 1420 or 1425 may compose OFDM symbols from higher layer data through channel coding and modulation and transmit them through a radio channel, or may demodulate and channel-decode OFDM symbols received through a radio channel and forward the result to a higher layer.

The disclosure proposes a procedure in which the UE compresses data when transmitting data in the uplink and the base station decompresses the data in a wireless communication system, and proposes a support method for a data transmission and reception procedure in which the transmitting end compresses data and transmits it, and the receiving end decompresses the data, such as a specific header format and a solution for decompression failure. Further, the method proposed in the disclosure can be applied to a procedure in which the base station compresses data and transmits it when transmitting downlink data to a UE and the UE receives and decompresses the compressed downlink data. As described above, in the disclosure, the transmitting end transmits compressed data, so that more data can be transmitted and the coverage can be improved at the same time.

In the disclosure, the method of performing data compression or decompression may indicate a method of performing uplink data compression or decompression, or a method of performing downlink data compression or decompression, which can be interpreted according to the context.

Figure 15:
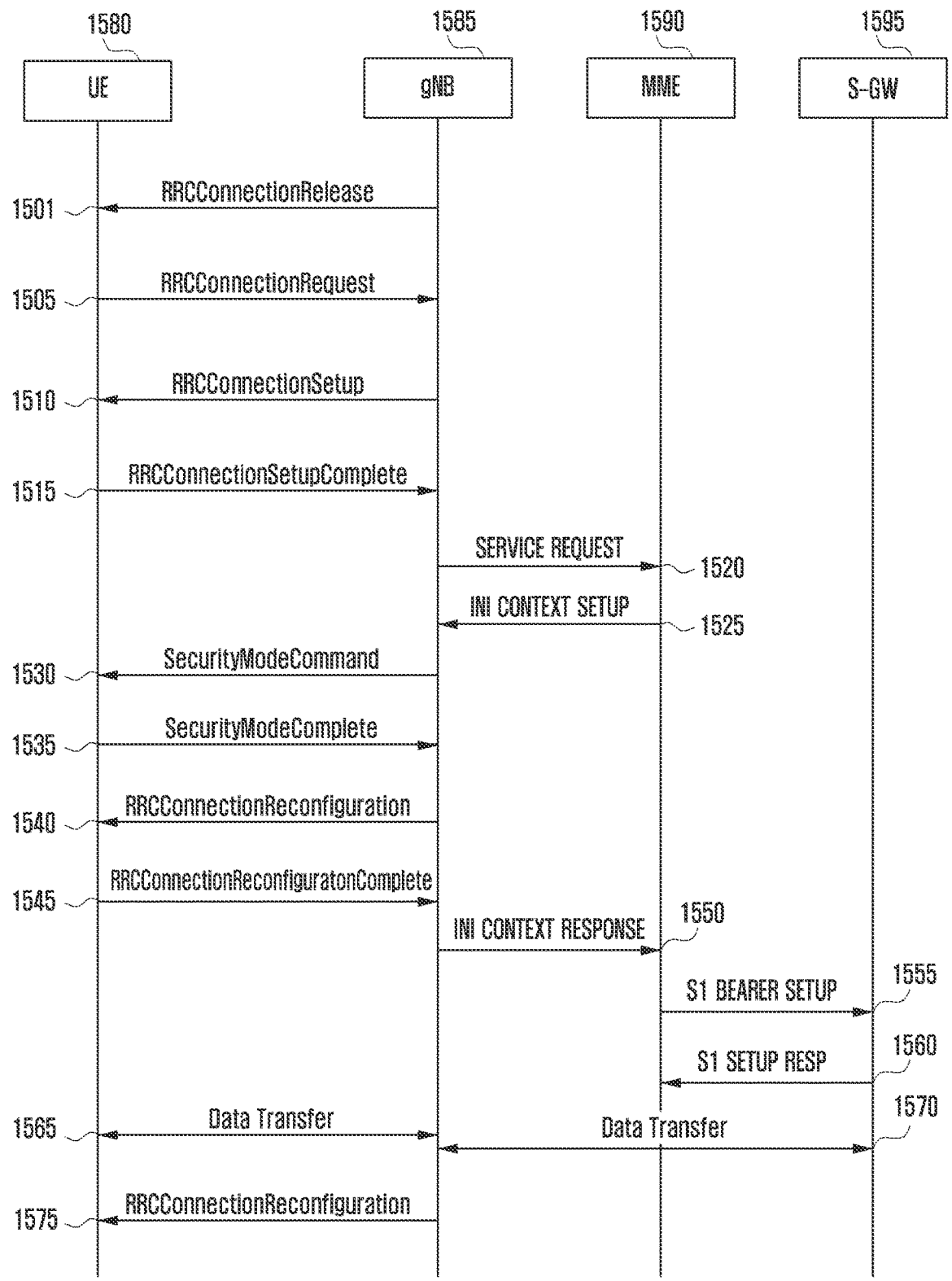
FIG. 15 is a diagram illustrating a procedure for the base station to configure whether to perform uplink data compression when the UE establishes a connection with the network according to an embodiment of the disclosure.

FIG. 15 is a diagram illustrating a procedure for the base station to configure whether to perform uplink data compression when the UE establishes a connection with the network according to an embodiment of the disclosure.

FIG. 15 describes, in the disclosure, a procedure in which the UE transitions from RRC idle mode or RRC inactive mode (or, lightly-connected mode) to RRC connected mode to establish a connection with the network, and describes a procedure for configuring whether to perform uplink data compression (UDC).

In FIG. 15, if the UE having transmitted and received data in RRC connected mode does not transmit or receive data for a specific reason or for a preset time, the base station may transmit an RRCConnectionRelease message to the UE to allow the UE to transition to RRC idle mode (1501). Later, when data to be transmitted is generated, the UE without a currently established connection (hereinafter, idle mode UE 1580) may perform an RRC connection establishment process with the base station 1585. The UE may establish reverse transmission synchronization with the base station through a random access process and transmit an RRCConnectionRequest message to the base station (1505). This message includes an identifier of the UE 1580 and a reason for connection establishment (establishmentCause). The base station may transmit an RRCConnectionSetup message to the UE to allow the UE to establish an RRC connection (1510).

The RRCConnectionSetup message may include an indication of whether to use uplink data compression (UDC) or information indicating whether to use uplink data compression for each logical channel (logicalchannelconfig), for each bearer, or for each PDCP entity (PDCP-config). In addition, the RRCConnectionSetup message may more specifically indicate whether to use uplink data compression (UDC) only for which IP flow or which QoS flow in each logical channel, bearer, or PDCP entity (or SDAP entity). Alternatively, by configuring the SDAP entity with information on the IP flow or QoS flow to which uplink data compression is to be applied or not to be applied, the SDAP entity may indicate to the PDCP entity whether to use or not to use uplink data compression for each QoS flow. Alternatively, the PDCP entity may check each QoS flow by itself and determine whether to apply uplink data compression or not. Further, if the RRCConnectionSetup message indicates usage of uplink data compression, the RRCConnectionSetup message may indicate an identifier of a predefined library or dictionary to be used in the uplink data compression, or a buffer size to be used in the uplink data compression.

In addition, the RRCConnectionSetup message may set the value of a first timer that will be triggered if a sequence number gap occurs when the receiving PDCP entity reorders received data in an ascending order of the PDCP sequence number or COUNT value, and this first timer may be referred to as a PDCP reordering timer.

In addition, the RRCConnectionSetup message may set the value of a new second timer, and the second timer may be configured or applied together when a data compression method (e.g., UDC, uplink data compression) is configured in the bearer or PDCP entity. The second timer value may be set to a value smaller than the first timer value, and it may be triggered or started if a sequence number gap occurs when the receiving PDCP entity reorders received data in an ascending order of the PDCP sequence number or COUNT value. Then, the receiving PDCP entity may stop the second timer when the sequence number gap is filled. When the second timer expires because the sequence number gap is not filled, the receiving PDCP entity may transmit the transmitting PDCP entity an indication of initializing the buffer for the data compression method or information indicating that a data decompression failure has occurred by including it in PDCP control data (PDCP control PDU). Then, the receiving PDCP entity may immediately initialize the buffer for the data compression method, or may initialize the buffer for the data compression method when receiving an indication of having initialized the buffer for the data compression method or an instruction to initialize the buffer from the transmitting PDCP entity. Here, the second timer value may be set in consideration of the retransmission time of the MAC entity or RLC entity or the time taken up to successful delivery confirmation.

In addition, the RRCConnectionSetup message may set a new third timer value (as another method, the maximum number of data), and the third timer may be configured or applied together when a data compression method (e.g., UDC, uplink data compression) is configured in the bearer or PDCP entity. The third timer value may be set to a value smaller than the first timer value. The receiving PDCP entity may start the third timer when the third timer value is set. The third timer may be used by the receiving PDCP entity to periodically transmit an indication of initializing the buffer for the data compression method to the transmitting PDCP entity by including it in PDCP control data (PDCP control PDU). That is, whenever the third timer expires (as another method, whenever the number of data that is compressed or the UDC procedure is applied to and transferred to a lower layer reaches the maximum number of data), the receiving PDCP entity may transmit an indication of initializing the buffer for the data compression method to the transmitting PDCP entity by including it in PDCP control data (PDCP control PDU). Then, the receiving PDCP entity may restart the third timer after transmitting the PDCP control data, immediately after the timer expires, or when receiving an indication of having initialized the buffer for the data compression method or an instruction to initialize the buffer from the transmitting PDCP entity. As another method, the third timer may be applied to the transmitting PDCP entity, and the transmitting PDCP entity may start the third timer to periodically initialize the buffer for the data compression method. That is, whenever the third timer expires, the transmitting PDCP entity may initialize the buffer for the data compression method, and set a 1-bit indicator of the UDC header and transmit it to the receiving PDCP entity, so that it may indicate to the receiving PDCP entity that the buffer has been initialized or has to be initialized. Then, the transmitting PDCP entity may restart the third timer after initializing the buffer as above, immediately after the timer expires, or after setting a 1-bit indicator in the UDC header and transmitting it. Here, the third timer value may be configured in consideration of the retransmission time of the MAC entity or RLC entity or the time taken up to successful delivery confirmation.

In addition, the RRCConnectionSetup message may include configuration information for a predefined library or dictionary to be input to the buffer and used when performing the data compression method. Further, the RRCConnectionSetup message may include information indicating whether to perform the data compression or decompression procedure while updating the buffer with a series of packets during compression after inputting the library or dictionary information to the buffer at the beginning of initiating the data compression or decompression method, or whether to perform the data compression or decompression procedure based on fixed buffer values while keeping the library or dictionary information at a fixed buffer value without updating the buffer with a series of data after inputting the predefined library or dictionary information to the buffer for data compression or decompression.

In addition, the RRCConnectionSetup message may include configuration information about the RLC entity connected to the PDCP entity to which the data compression method is applied. Further, the configuration information for the RLC entity may include an indicator or information indicating whether data received by the receiving operation of the RLC entity is transferred to the PDCP entity in an order based on the RLC sequence number (in-sequence delivery setting), or whether data that is not segmented or is reassembled among the received data is transferred directly to the PDCP entity regardless of the order in the RLC sequence number (out-of-sequence delivery setting).

In addition, the RRCConnectionSetup message may include a command for setting up or releasing uplink decompression. Further, here, when setting usage of an uplink data compression method, it can always be configured with an RLC AM bearer (lossless mode with ARQ and retransmission function), and may be not configured together with the header compression protocol (ROHC). Further, the RRCConnectionSetup message contains RRC connection configuration information and the like. The RRC connection is also called a signaling radio bearer (SRB) and is used for transmitting and receiving RRC messages being control messages between the UE and the base station.

The UE having established an RRC connection may transmit an RRCConnetionSetupComplete message to the base station (1515). If the base station does not know the capability of the UE that is currently establishing a connection or wants to know the UE capability, it may transmit a message inquiring about the UE capability to the UE. Then, the UE may transmit a message reporting its capability to the base station. The message for reporting the UE capability may indicate whether the UE can use an uplink data compression method (UDC) or a downlink data compression method, and may be transmitted by including an indicator or information indicating this.

The RRCConnetionSetupComplete message may include a Service Request control message by which the UE requests the MME to configure a bearer for a specific service. The base station may transmit the Service Request message contained in the RRCConnetionSetupComplete message to the MME (1520), and the MME may determine whether to provide the service requested by the UE. Upon determining to provide the service requested by the UE, the MME may transmit an Initial Context Setup Request message to the base station (1525). The Initial Context Setup Request message may include information, such as QoS information to be applied when configuring a DRB, and security-related information (e.g., security key, security algorithm) to be applied to the DRB. The base station and the UE may exchange a SecurityModeCommand message and a SecurityModeComplete message to establish security (1530, 1535).

When security configuration is completed, the base station may transmit an RRCConnectionReconfiguration message to the UE (1540). The RRCConnectionReconfiguration message may include information indicating whether to use uplink data compression (UDC) or whether to use downlink data compression for each logical channel (logicalchannelconfig), for each bearer, or for each PDCP entity (PDCPconfig). In addition, the RRCConnectionReconfiguration message may more specifically indicate whether to use uplink data compression (UDC) only for which IP flow or which QoS flow in each logical channel, bearer, or PDCP entity (or SDAP entity) (by configuring the SDAP entity with information on the IP flow or QoS flow to which uplink data compression is to be applied or not to be applied, the SDAP entity may indicate to the PDCP entity whether to use or not to use uplink data compression for each QoS flow. Or, the PDCP entity may check each QoS flow by itself and determine whether to apply uplink data compression or not). Further, if the RRCConnectionReconfiguration message indicates usage of uplink data compression, it may indicate an identifier of a predefined library or dictionary to be used in the uplink data compression, or a buffer size to be used in the uplink data compression. In addition, the RRCConnectionReconfiguration message may include a command for setting up or releasing uplink decompression. Further, when setting usage of an uplink data compression method in the RRCConnectionReconfiguration message, it can always be configured with an RLC AM bearer (lossless mode with ARQ and retransmission function), and may be not configured together with the header compression protocol (ROHC).

In addition, the RRCConnectionReconfiguration message may set the value of a first timer that will be triggered if a sequence number gap occurs when the receiving PDCP entity reorders received data in an ascending order of the PDCP sequence number or COUNT value, and this first timer may be referred to as a PDCP reordering timer.

In addition, the RRCConnectionReconfiguration message may set the value of a new second timer, and the second timer may be configured or applied together when a data compression method (e.g., UDC) is configured in the bearer or PDCP entity. The second timer value may be set to a value smaller than the first timer value, and it may be triggered or started if a sequence number gap occurs when the receiving PDCP entity reorders received data in an ascending order of the PDCP sequence number or COUNT value. Then, the receiving PDCP entity may stop the second timer when the sequence number gap is filled. When the second timer expires because the sequence number gap is not filled, the receiving PDCP entity may transmit the transmitting PDCP entity an indication of initializing the buffer for the data compression method or information indicating that a data decompression failure has occurred by including it in PDCP control data (PDCP control PDU). Then, the receiving PDCP entity may immediately initialize the buffer for the data compression method, or may initialize the buffer for the data compression method when receiving an indication of having initialized the buffer for the data compression method or an instruction to initialize the buffer from the transmitting PDCP entity. Here, the second timer value may be configured in consideration of the retransmission time of the MAC entity or RLC entity or the time taken up to successful delivery confirmation.

In addition, the RRCConnectionReconfiguration message may set a new third timer value (as another method, the maximum number of data), and the third timer may be configured or applied together when a data compression method (e.g., UDC) is configured in the bearer or PDCP entity. The third timer value may be set to a value smaller than the first timer value. The receiving PDCP entity may start the third timer when the third timer value is set. The third timer may be used by the receiving PDCP entity to periodically transmit an indication of initializing the buffer for the data compression method to the transmitting PDCP entity by including it in PDCP control data (PDCP control PDU). That is, whenever the third timer expires (as another method, whenever the number of data that is compressed or the UDC procedure is applied to and transferred to a lower layer reaches the maximum number of data), the receiving PDCP entity may transmit an indication of initializing the buffer for the data compression method to the transmitting PDCP entity by including it in PDCP control data (PDCP control PDU). Then, the receiving PDCP entity may restart the third timer after transmitting the PDCP control data, immediately after the timer expires, or when receiving an indication of having initialized the buffer for the data compression method or an instruction to initialize the buffer from the transmitting PDCP entity. As another method, the third timer may be applied to the transmitting PDCP entity, and the transmitting PDCP entity may start the third timer to periodically initialize the buffer for the data compression method. That is, whenever the third timer expires, the transmitting PDCP entity may initialize the buffer for the data compression method, and set a 1-bit indicator of the UDC header and transmit it to the receiving PDCP entity, so that it may indicate to the receiving PDCP entity that the buffer has been initialized or has to be initialized. Then, the transmitting PDCP entity may restart the third timer after initializing the buffer as above, immediately after the timer expires, or after setting a 1-bit indicator in the UDC header and transmitting it. Here, the third timer value may be configured in consideration of the retransmission time of the MAC entity or RLC entity or the time taken up to successful delivery confirmation.

In addition, the RRCConnectionReconfiguration message may include configuration information for a predefined library or dictionary to be input to the buffer and used when performing the data compression method. Further, the RRCConnectionReconfiguration message may include information indicating whether to perform the data compression or decompression procedure while updating the buffer with a series of packets during compression after inputting the library or dictionary information to the buffer at the beginning of initiating the data compression or decompression method, or whether to perform the data compression or decompression procedure based on fixed buffer values while keeping the library or dictionary information at a fixed buffer value without updating the buffer with a series of data after inputting the predefined library or dictionary information to the buffer for data compression or decompression.

In addition, the RRCConnectionReconfiguration message may include configuration information about the RLC entity connected to the PDCP entity to which the data compression method is applied. Further, the configuration information for the RLC entity may include an indicator or information indicating whether data received by the receiving operation of the RLC entity is transferred to the PDCP entity in an order based on the RLC sequence number (in-sequence delivery setting), or whether data that is not segmented or is reassembled among the received data is transferred directly to the PDCP entity regardless of the order in the RLC sequence number (out-of-sequence delivery setting).

In addition, the RRCConnectionReconfiguration message includes configuration information of a DRB in which user data is to be processed, and the UE may configure a DRB by applying this information and transmit an RRCConnectionReconfigurationComplete message to the base station (1545).

The base station having completed DRB setup with the UE may transmit an Initial Context Setup Complete message to the MME (1550); the MME having received this and the S-GW may exchange an S1 Bearer Setup message and an S1 Bearer Setup Response message to establish an S1 bearer (1555, 1560). The S1 bearer is a data transmission connection established between the S-GW and the base station, and corresponds to the DRB in one-to-one manner.

When all of the above processes are completed, the UE may transmit and receive data through the base station and the S-GW (1565, 1570).

As such, a general data transmission process is composed of three stages: RRC connection setup, security setup, and DRB setup. In addition, the base station may transmit an RRCConnectionReconfiguration message to set a new setting in, add a setting to, or change settings of the UE for a specific reason (1575). This message may include information indicating whether to use uplink data compression (UDC) or whether to use downlink data compression for each logical channel (logicalchannelconfig), for each bearer, or for each PDCP entity (PDCP-config). In addition, the RRCConnectionReconfiguration message may more specifically indicate whether to use uplink data compression (UDC) only for which IP flow or which QoS flow in each logical channel, bearer, or PDCP entity (or SDAP entity) (by configuring the SDAP entity with information on the IP flow or QoS flow to which uplink data compression is to be applied or not to be applied, the SDAP entity may indicate to the PDCP entity whether to use or not to use uplink data compression for each QoS flow. Or, the PDCP entity may check each QoS flow by itself and determine whether to apply uplink data compression or not). Further, if the RRCConnectionReconfiguration message indicates usage of uplink data compression, it may indicate an identifier of a predefined library or dictionary to be used in the uplink data compression, or a buffer size to be used in the uplink data compression. In addition, the RRCConnectionReconfiguration message may include a command for setting up or releasing uplink decompression. Further, when setting usage of an uplink data compression method in the RRCConnectionReconfiguration message, it can always be configured with an RLC AM bearer (lossless mode with ARQ and retransmission function), and may be not configured together with the header compression protocol (ROHC).

Figure 16:
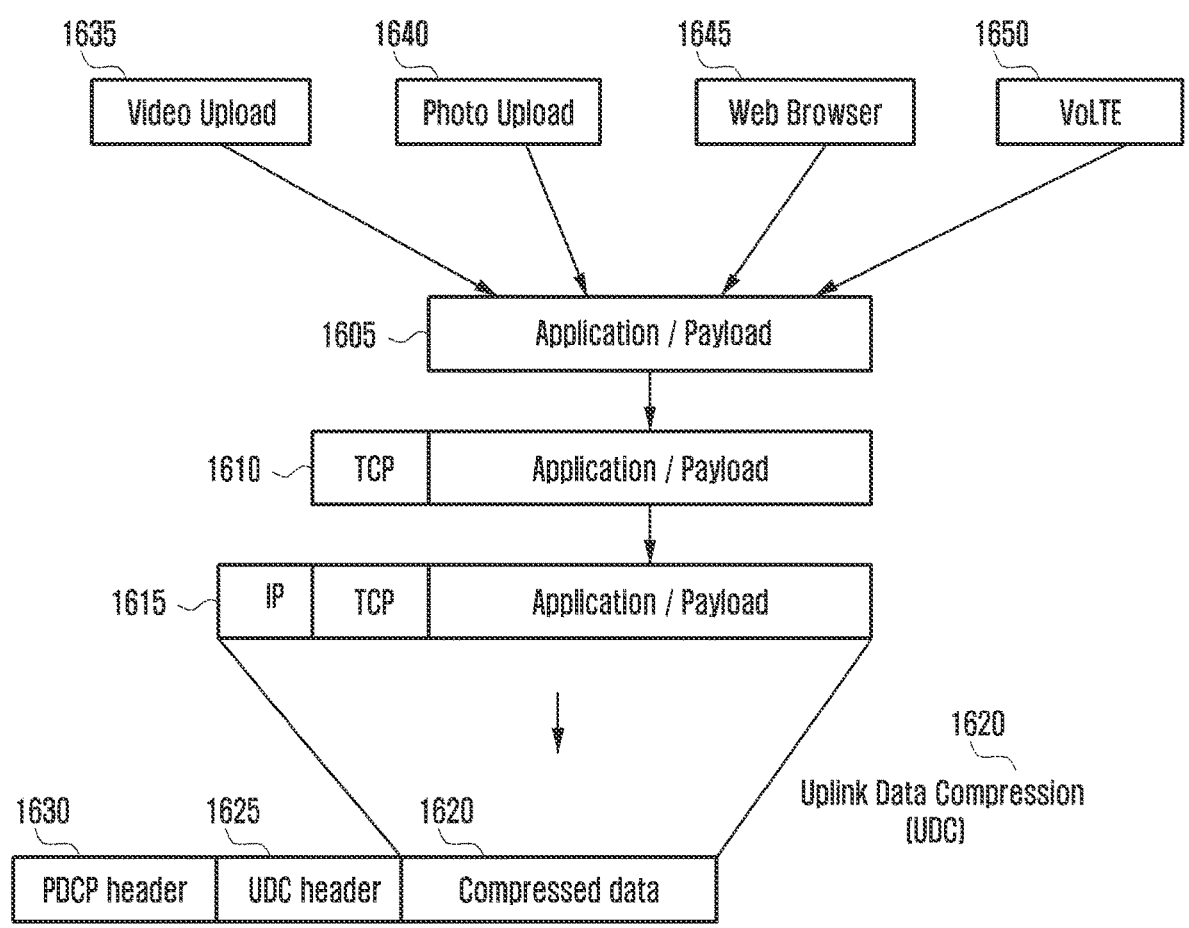
FIG. 16 is a diagram illustrating a procedure and data composition for performing uplink data compression or downlink data compression according to an embodiment of the disclosure.

FIG. 16 is a diagram illustrating a procedure and data composition for performing uplink data compression or downlink data compression according to an embodiment of the disclosure.

In FIG. 16, uplink data 1605 may be generated from data corresponding to services such as video transmission, picture transmission, web search, and VoLTE. The data generated by an application layer entity may be processed through TCP/IP or UDP corresponding to the network data transport layer, and may be transferred to the PDCP layer after the headers 1610 and 1615 are composed. When the PDCP layer receives data (PDCP SDU) from a higher layer, it may perform the following procedure.

If the PDCP layer is configured to use an uplink data compression method or downlink data compression method by an RRC message as indicated by 1510, 1540 or 1575 in FIG. 15, uplink data compression or downlink data compression may be performed on the PDCP SDU to compress uplink data or downlink data as indicated by 1620, and a corresponding UDC header 1625 (header for compressed uplink data) may be composed. Then, a PDCP PDU may be composed by performing integrity protection on and applying an encryption procedure to the compressed data including the UDC header if configured, and composing a PDCP header 1630. Here, the PDCP entity includes a UDC compression/decompression instance, and may determine whether to perform the UDC procedure for each data as configured in the RRC message and utilize the UDC compression/decompression instance. The transmitting end at the transmitting PDCP entity performs data compression by using a UDC compression instance, and the receiving end at the receiving PDCP entity performs data decompression by using a UDC decompression instance.

The procedure of FIG. 16 described above can be applied not only to compression of uplink data of the UE but also to compression of downlink data. Also, the description on the uplink data may be equally applied to the downlink data.

Figure 17:
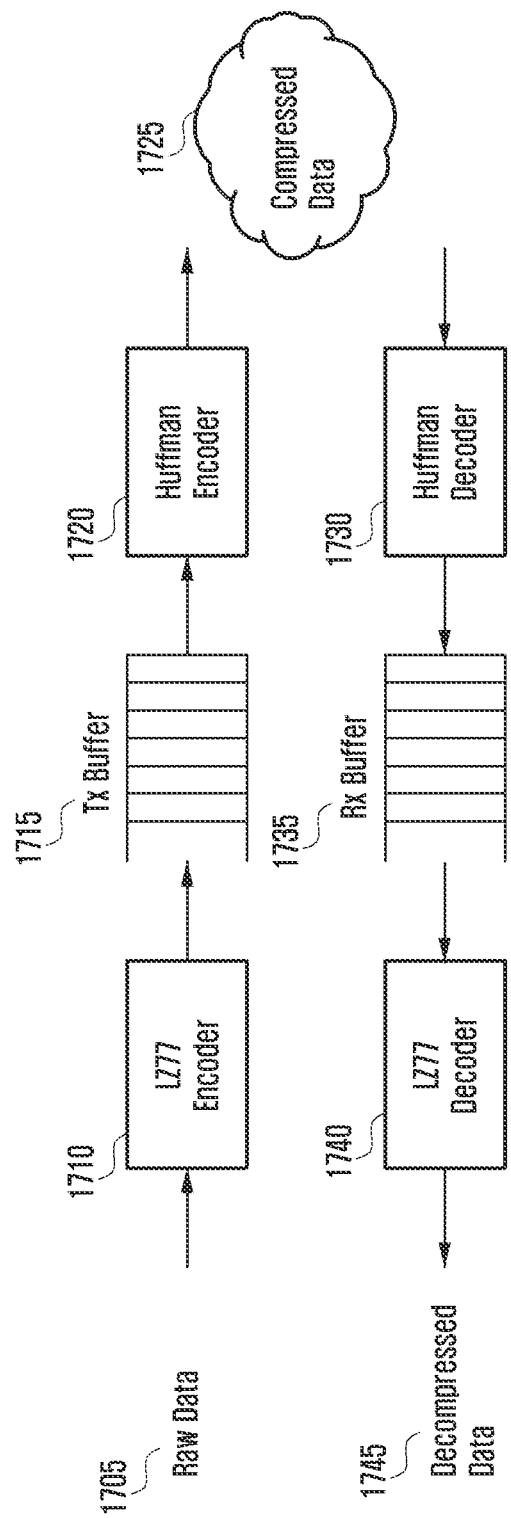
FIG. 17 is a diagram showing an example of a method for uplink or downlink data compression according to an embodiment of the disclosure.

FIG. 17 is a diagram showing an example of a method for uplink or downlink data compression according to an embodiment of the disclosure.

FIG. 17 is a diagram explaining a Deflate-based uplink data compression algorithm, and the Deflate-based uplink data compression algorithm is a lossless compression algorithm. The Deflate-based uplink data compression algorithm basically compresses uplink data by combining the LZ77 algorithm and Huffman coding. The LZ77 algorithm performs an operation to find a duplicate sequence of data; when finding a duplicate sequence, it finds a duplicate sequence within a sliding window, and if there is a duplicate sequence in the sliding window, it performs data compression by representing the position of the duplicate sequence within the sliding window and the degree of duplication as a length. The sliding window is also called a buffer in the uplink data compression method (UDC), and may be set to 8 kilobytes or 32 kilobytes. That is, the sliding window or buffer can perform compression by recording 8192 or 32768 characters, finding a duplicate sequence, and representing it with a position and a length. Since the LZ algorithm is a sliding window method, that is, since previously coded data is updated in the buffer and coding is performed on the immediately following data, there is a correlation between successive data. Hence, the data coded first must be normally decoded if subsequent data is to be normally decoded. Here, the compressed codes (expression of position, length, etc.) represented by position and length through the LZ77 algorithm are compressed once more through Huffman coding. Hoffman coding performs compression once again by using a short notation for a highly duplicate code and a long notation for a rarely duplicate code while searching for duplicate codes. Hoffman coding is a prefix code, and is an optimal coding scheme in which all codes are uniquely decodable.

The transmitting end may perform encoding by applying the LZ77 algorithm described above to the raw data 1705 (1710), update the buffer (1715), and generate checksum bits for contents (or data) of the buffer to compose a UDC header. The checksum bits are used by the receiving end to check whether the buffer state is valid. The codes encoded with the LZ77 algorithm may be compressed once more through Huffman coding and transmitted as uplink data (1725).

The receiving end performs a decompression procedure on the received compressed data in the opposite direction of the transmitting end. That is, Hoffman decoding is performed (1730), the buffer is updated (1735), and the validity of the updated buffer is checked with checksum bits of the UDC header. If it is determined that the checksum bits have no error, decoding is performed by using the LZ77 algorithm to decompress the data (1740), and the original data can be restored and transmitted to the higher layer (1745).

As described above, since the LZ algorithm is a sliding window method, that is, since previously coded data is updated in the buffer and coding is performed on the immediately following data, there is a correlation between successive data. Hence, the data coded first must be normally decoded if subsequent data is be normally decoded. Therefore, the receiving PDCP entity checks the PDCP sequence number of the PDCP header and checks the UDC header (checks an indicator indicating whether data compression is performed) to perform a data decompression procedure on the data to which a data compression procedure has been applied in ascending order of the PDCP sequence number.

The procedure for the base station to configure uplink or downlink data compression (UDC) to the UE and the procedure for the UE to perform uplink data compression (UDC), which are proposed in the disclosure, are as follows.

The base station may use an RRC message as indicated by 1510, 1540 or 1575 in FIG. 15 to allow the UE to configure or deconfigure uplink data compression on the bearer or logical channel in which RLC AM mode or RLC UM mode is set. Also, the above RRC message may be used to reset the UDC instance (or protocol) of the PDCP entity in the UE. Here, resetting the UDC instance (or protocol) means resetting the UDC buffer for uplink data compression of the UE, and this is to achieve synchronization between the UDC buffer in the UE and the UDC buffer for decompressing uplink data in the base station. In the above description, the operation of resetting the buffer of the UDC instance may define a new PDCP control PDU and use it in place of the RRC message, so that the PDCP control PDU may be used to allow the transmitting end (base station) to reset the UDC buffer of the receiving end (UE) and to achieve synchronization between the transmitting and receiving ends for user data compression and decompression. In addition, the above RRC message may be used to determine whether to perform uplink data compression for each bearer, logical channel, or PDCP entity, and to more specifically configure whether to perform uplink data decompression for each IP flow (or QoS flow) in one bearer, logical channel, or PDCP entity.

In addition, the base station may use the above RRC message to set a PDCP discard timer value in the UE. For the PDCP discard timer value, it is possible to separately set a PDCP discard timer value for data on which uplink data compression is not performed and a PDCP discard timer value for data to which uplink data compression is applied.

If the UE is configured with uplink data compression through the above RRC message for a given bearer or logical channel or PDCP entity (or for specific QoS flows of a given bearer or logical channel or PDCP entity), it resets the buffer of the UDC instance in the PDCP entity according to the above configuration and prepares for an uplink data compression procedure. Then, when receiving data (PDCP SDU) from a higher layer, if uplink data compression is configured for the PDCP entity, the UE performs uplink data compression on the received data. If uplink data compression is configured only for specific QoS flows of the PDCP entity, the UE determines whether to perform uplink data compression by checking an indication from the upper SDAP layer or a QoS flow identifier to perform uplink data compression. Then, if uplink data compression (UDC) is performed and the buffer is updated according to the data compression, the UE composes a UDC buffer. In the above description, when uplink data compression (UDC) is performed, a PDCP SDU received from a higher layer can be compressed into UDC compressed data (UDC block) having a smaller size. Then, a UDC header is composed for the UDC compressed data. The UDC header may include an indicator indicating whether uplink data compression is performed or not (for example, a 1-bit indicator in the UDC header is set to 0 if UDC is applied, and set to 1 if UDC is not applied). Here, the case where uplink data compression is not applied may include a case in which data compression cannot be performed by the above-described UDC compression method (Deflate algorithm) because the data structure of a PDCP SDU received from the upper layer does not have a repetitive data structure. In the above description, if uplink data compression (UDC) is performed on data (PDCP SDU) received from a higher layer and the UDC buffer is updated, in order for the receiving end PDCP entity to check the validity of the updated UDC buffer, checksum bits can be calculated and included in the UDC buffer (checksum bits may have a preset length of, for example, 4 bits). In the above description, the transmitting PDCP entity may initialize the transmit UDC buffer and define and set 1 bit in the UDC header 1902 of the first data to which UDC compression is newly applied after initialization of the transmit UDC buffer to thereby instruct the receiving PDCP entity to initialize the receive UDC buffer and to newly perform UDC decompression from the data whose UDC header 1902 is set with the initialized receive UDC buffer. For example, as indicated by 1905 in FIG. 19, it is possible to define a FR field and indicate through it. Further, one bit, for example, a FU field 1910 may be defined in the UDC header 1902 to indicate whether or not the UDC compression procedure is applied to the data received from a higher layer in the transmitting PDCP entity where a UDC compression procedure is configured as above.

In the above description, the UE performs ciphering on the data to which uplink data decompression is applied or not applied, and if configured, performs integrity protection and transfers it to a lower layer.

Figure 18:
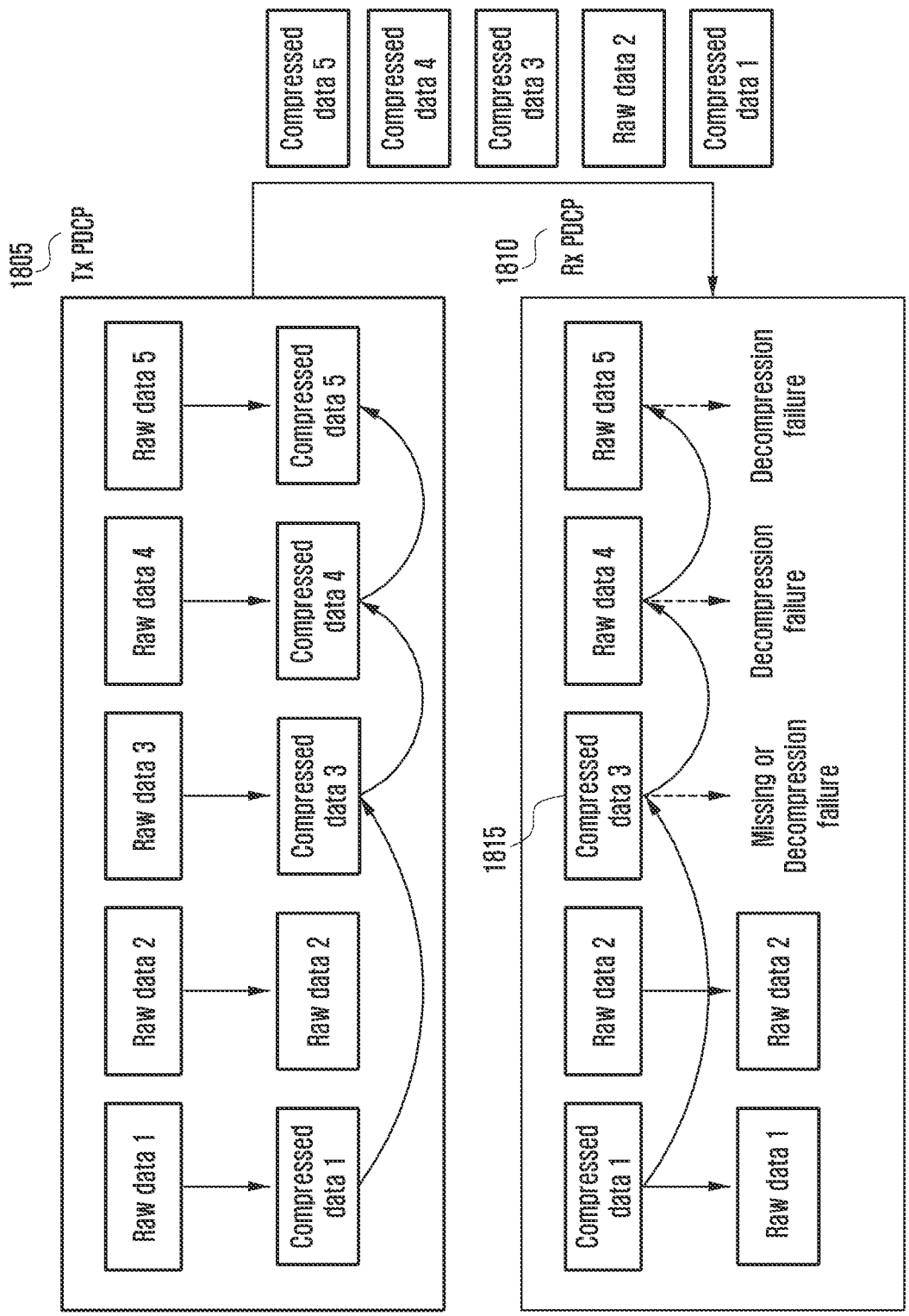
FIG. 18 is a diagram illustrating a problem in which decompression failure occurs in an uplink or downlink data compression method according to an embodiment of the disclosure.

FIG. 18 is a diagram illustrating a problem in which decompression failure occurs in an uplink or downlink data compression method according to an embodiment of the disclosure.

As described above in relation to FIG. 17, in the algorithm for performing uplink or downlink data compression (UDC) (Deflate algorithm (LZ77 algorithm is performed and then Hoffman coding is performed)), when performing data compression, the transmitting end updates the buffer with the previously compressed data, compares it with the data to be compressed next based on the buffer, finds a repetitive structure, and compresses it by position and length. Therefore, when decompression is performed at the receiving end, decompression can be successful only when decompression is performed in the order in which compression was performed at the transmitting end. For example, if the transmitting end performs UDC compression on data of PDCP sequence numbers 1, 3, 4 and 5 and does not perform UDC compression on data of PDCP sequence number 2 (1805), decompression at the receiving end can be successful only when decompression is performed on the received data in order of PDCP sequence numbers 1, 3, 4 and 5 in the PDCP entity. In the above description, when UDC compression is performed at the transmitting end, this is indicated by the UDC header, so that the receiving end can determine whether UDC compression is applied by checking the UDC header. If PDCP sequence number 3 (1815) is lost in the process of performing a series of UDC decompression, all subsequent UDC decompression will fail. That is, UDC decompression cannot be performed on data of PDCP sequence numbers 4 and 5 (1810). Therefore, in the data decompression procedure, there should be no lost data (packet), and the receiving end should perform decompression in the order in which the data was UDC-compressed by the transmitting end. Accordingly, the data compression or decompression procedure proposed in the disclosure can operate without any problem in RLC AM mode without loss and with a retransmission function.

However, the lost data described above may be caused by a PDCP discard timer of the PDCP entity. That is, the PDCP entity runs a timer with a PDCP discard timer value set by the RRC message for each data (packet or PDCP SDU) received from a higher layer. Then, when the timer expires, data corresponding to the timer is discarded. Hence, when the timer for data on which UDC compression has been performed expires, the data may be discarded, so that UDC decompression failure may occur at the receiving end for data on which UDC compression has been performed after the discard.

As described above in relation to FIG. 17 of the disclosure, when the algorithm performing uplink data compression (UDC) (Deflate algorithm (LZ77 algorithm is performed, then Hoffman coding is performed)) performs uplink data compression at the transmitting end, it performs uplink data compression and then generates a checksum with the current buffer contents to configure the UDC buffer. Then, the algorithm updates the buffer with the raw data of the compressed data, compares the buffer with the data to be compressed next to find a repetitive structure, and performs compression by position and length. Here, the checksum bits in the UDC header are to allow the UDC instance (or function) of the PDCP entity at the receiving end to determine the validity of the current buffer state before performing data decompression. That is, the receiving end verifies the validity of the current receive UDC buffer based on the checksum bits of the UDC header before performing data decompression, performs data decompression if there is no checksum error, and, if a checksum failure occurs, should report the checksum failure to the transmitting end without performing data decompression and recover it.

Decompression at the receiving end can be successfully performed only when decompression is performed in the order in which compression is performed at the transmitting end. For example, if the transmitting end performs UDC compression on data of PDCP sequence numbers 1, 3, 4 and 5 and does not perform UDC compression on data of PDCP sequence number 2, the receiving end can perform decompression successfully only when the received data is decompressed at the PDCP entity in order of PDCP sequence numbers 1, 3, 4 and 5. As described above, when the transmitting end performs UDC compression, this is indicated by the UDC header, so that the receiving end can determine whether UDC compression is applied by checking the UDC header. If a checksum failure occurs at PDCP sequence number 3 in the process of performing a series of UDC decompression, all subsequent UDC decompression may fail. That is, UDC decompression cannot be successfully performed on data of PDCP sequence numbers 4 and 5.

Next, the disclosure proposes a checksum failure handling method for solving the checksum failure problem described above.

Figure 19:
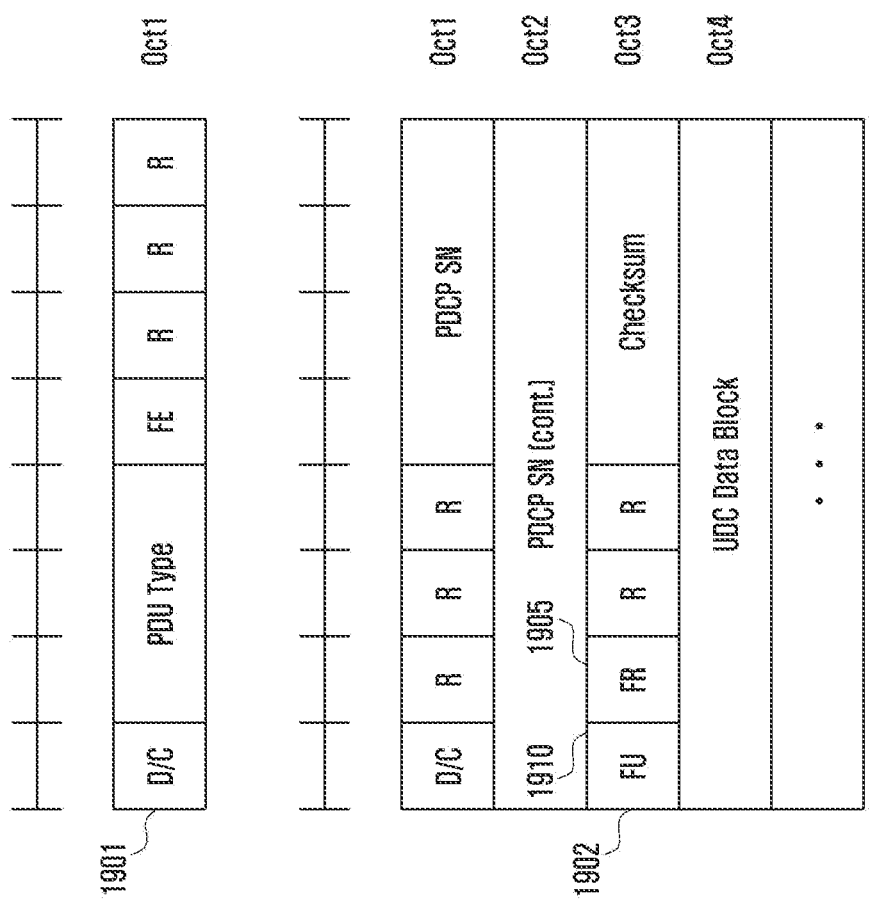
FIG. 19 illustrates a PDCP control PDU format applicable to a checksum failure handling method according to an embodiment of the disclosure.

FIG. 19 illustrates a PDCP control PDU format applicable to a checksum failure handling method according to an embodiment of the disclosure.

With reference to FIG. 19, the D/C field is a field that distinguishes between general data in the PDCP layer and PDCP control information (PDCP control PDU), and the PDU Type field is a field indicating which information among the PDCP control information. In addition, in the PDCP control PDU format for feedback to the checksum failure handling method proposed in the disclosure, a 1-bit indicator (FE field) indicating whether checksum failure has occurred or not may be defined and used as indicated by 1901. When the 1-bit indicator value is 0, this indicates that UDC decompression is performed normally; when the 1-bit indicator value is 1, this indicates that a checksum failure has occurred during UDC decompression and may be an indication to reset the UDC buffer of the transmitting PDCP entity.

To define the format 19-01, a new PDCP control PDU may be defined by assigning reserved values (e.g., reserved value of 011 or between 100 and 111) to the PDU type as shown in Table 1 below, and a PDCP control PDU having a defined PDU type may serve as a feedback for indicating checksum failure.

TABLE 1

| Bit | Description |
| --- | --- |
| 000 | PDCP status report |
| 001 | Interspersed ROHC feedback packet |
| 010 | LWA status report |
| 011 | UDC checksum failure feedback |
| 100-111 | reserved |

In the disclosure, an embodiment of a checksum failure handling method to which the PDCP control PDU proposed in FIG. 19 is applied is as follows.

When the receiving end (base station) detects a checksum failure at the receiving UDC buffer for the data to be UDC-decompressed, it may indicate that a checksum failure has occurred by transmitting a PDCP control PDU to the UE. The PDCP control PDU may be a newly defined PDCP control PDU or may be a modified one by defining and including a new indicator in an existing PDCP control PDU. As another method, instead of a PDCP sequence number, it is possible to define an indicator to reset the UDC buffer due to an occurrence of a checksum failure and indicate this.

Receiving end operation: if checksum failure occurs as described above, the receiving end may initialize the UDC buffer immediately. Then, the receiving end may reorder newly received data according to the PDCP sequence number, and then check the UDC header of each data in an ascending order of the PDCP sequence number. In addition, as being indicated that the UDC buffer at the transmitting end has been reset due to a UDC checksum failure, the receiving end may discard the data that does not include an indication to initialize the receive UDC buffer and includes an indication that UDC compression has been performed, and if all data, whose UDC header does not include an indication that the transmitting UDC buffer is reset due to a UDC checksum failure and includes an indication that UDC compression has not been performed, are received in the order of the PDCP sequence number without a gap in the middle, may process the received data in an ascending order of the PDCP sequence number to transfer them to a higher layer entity. Then, the receiving end may initialize the receive UDC buffer from data whose UDC header includes an indication that the transmitting end UDC buffer has been reset due to a UDC checksum failure and includes an indication to reset the receive UDC buffer, and resume decompression of the UDC-compressed data in ascending order of the PDCP sequence number.

Transmitting end operation: when the transmitting end (UE) receives the above PDCP control PDU, it may reset (initialize) the UDC transmit buffer. Then, the transmitting end may discard data (e.g., PDCP PDU) that is not yet transmitted if any among the data that has been generated through the UDC compression procedure before initialization of the UDC transmit buffer, perform uplink data compression (UDC) again on the raw data (e.g., PDCP SDU) of the data not yet been transmitted based on the initialized transmit UDC buffer, update the UDC buffer, include the checksum bits in the UDC header, perform encryption on the UDC header and data part, generate a PDCP header, compose a PDCP PDU, and transfer it to a lower layer. Further, the transmitting end may include an indication that the transmitting end buffer has been reset or an instruction to initialize the receiving end buffer in the UDC header or PDCP header of the newly composed PDCP PDU and transmit it, and may newly allocate PDCP sequence numbers that have not yet been transmitted in ascending order. (that is, if the data, which has been encrypted with a specific PDCP sequence number or HFN or COUNT value and a security key, is encrypted with the same PDCP COUNT value and security key and transmitted again, the risk of hacking increases, so that for one PDCP COUNT value, the rule of one-time encryption and transmission can be followed.) As another method, when receiving an indication that a checksum failure has occurred, the transmitting end may reset the transmit UDC buffer, and perform UDC compression only on the data that is greater than or equal to the PDCP sequence number corresponding to the data not yet been transferred to the lower layer or on the PDCP PDU to be newly composed, and transfer it to the lower layer. Further, the transmitting end may include an indication that the transmitting end UDC buffer has been reset (or, an instruction to initialize the receiving end UDC buffer) in the UDC header or PDCP header of the newly composed PDCP PDU and transmit it (that is, if the data, which has been encrypted with a specific PDCP COUNT value and a security key, is encrypted with the same PDCP COUNT value and security key and transmitted again, the risk of hacking increases, so that for one PDCP COUNT value, the rule of one-time encryption and transmission can be followed).

However, the checksum failure described above may be caused by a PDCP discard timer of the PDCP entity or loss during data transmission. That is, the PDCP entity runs a timer with the PDCP discard timer value set through the RRC message for each data (packet or PDCP SDU) received from a higher layer. Then, when the timer expires, data corresponding to the timer is discarded. Hence, when the timer for data on which UDC compression has been performed expires, as some of the UDC compressed data may be discarded, UDC decompression failure may occur at the receiving end for data on which UDC compression has been performed after the discard.

Next, the disclosure proposes methods for performing a user data compression procedure that is not sensitive to loss when applying a user data compression procedure to a data service assuming loss or when a user data compression procedure is applied in a PDCP entity connected to or configured with RLC UM mode.

A first method of the disclosure for performing user data compression in consideration of loss is as follows.

The first method may set a new second timer value with an RRC message as in FIG. 15, and the second timer may be set or applied together when a data compression method (e.g., uplink data compression (UDC)) is configured at a bearer or PDCP entity. The second timer value may be set to a value smaller than the first timer value, and it may be triggered or started if a sequence number gap occurs when the receiving PDCP entity reorders received data in an ascending order of the PDCP sequence number or COUNT value. Then, the receiving PDCP entity may stop the second timer when the sequence number gap is filled. When the second timer expires because the sequence number gap is not filled, the receiving PDCP entity may transmit the transmitting PDCP entity an indication of initializing the buffer for the data compression method or information indicating that a data decompression failure has occurred by including it in PDCP control data (PDCP control PDU). Then, the receiving PDCP entity may immediately initialize the buffer for the data compression method, or may initialize the buffer for the data compression method when receiving an indication of having initialized the buffer for the data compression method or an instruction to initialize the buffer from the transmitting PDCP entity. Here, the second timer value may be set in consideration of the retransmission time of the MAC entity or RLC entity or the time taken up to successful delivery confirmation. Further, when the second timer expires, the receiving PDCP entity may discard the data that is received before receiving an indication of having initialized the buffer for the data compression method or an instruction to initialize the buffer from the transmitting PDCP entity without performing a decoding or user data decompression procedure.

A second method of the disclosure for performing user data compression in consideration of loss is as follows.

The second method may set a new third timer value (as another method, the maximum number of data) with an RRC message as in FIG. 15, and the third timer may be set or applied together when a data compression method (e.g., uplink data compression (UDC)) is configured at a bearer or PDCP entity. The third timer value may be set to a value smaller than the first timer value. The receiving PDCP entity may start the third timer when the third timer value is set. The third timer may be used by the receiving PDCP entity to periodically transmit an instruction to initialize the buffer for the data compression method to the transmitting PDCP entity by including it in PDCP control data (PDCP control PDU). That is, whenever the third timer expires (as another method, whenever the number of data that is compressed or the UDC procedure is applied to and transferred to a lower layer reaches the maximum number of data), the receiving PDCP entity may transmit an instruction to initialize the buffer for the data compression method to the transmitting PDCP entity by including it in PDCP control data (PDCP control PDU). Then, the receiving PDCP entity may restart the third timer after transmitting the PDCP control data, immediately after the timer expires, or when receiving an indication of having initialized the buffer for the data compression method or an instruction to initialize the buffer from the transmitting PDCP entity. As another method, the third timer may be applied to the transmitting PDCP entity, and the transmitting PDCP entity may start the third timer to periodically initialize the buffer for the data compression method. That is, whenever the third timer expires, the transmitting PDCP entity may initialize the buffer for the data compression method, and set a 1-bit indicator of the UDC header and transmit it to the receiving PDCP entity, so that it may indicate to the receiving PDCP entity that the buffer has been initialized or has to be initialized. Then, the transmitting PDCP entity may restart the third timer after initializing the buffer as above, immediately after the timer expires, or after setting a 1-bit indicator in the UDC header and transmitting it. Here, the third timer value may be set in consideration of the retransmission time of the MAC entity or RLC entity or the time taken up to successful delivery confirmation. Further, when the third timer expires, the receiving PDCP entity may discard the data that is received before receiving an indication of having initialized the buffer for the data compression method or an instruction to initialize the buffer from the transmitting PDCP entity without performing a decoding or user data decompression procedure.

A third method of the disclosure for performing user data compression in consideration of loss is as follows.

The third method may include configuration information for a predefined library or dictionary to be input to the buffer and used when performing the data compression method. Further, the third method may include information indicating whether to perform the data compression or decompression procedure while updating the buffer with a series of packets during compression after inputting the library or dictionary information to the buffer at the beginning of initiating the data compression or decompression method, or whether to perform the data compression or decompression procedure based on fixed buffer values while keeping the library or dictionary information at a fixed buffer value without updating the buffer with a series of data after inputting the predefined library or dictionary information to the buffer for data compression or decompression. Hence, if an indicator to use fixed buffer values is set as above, the transmitting PDCP entity, unlike the description related to FIG. 17 or FIG. 18, may apply a user data compression procedure to data based on fixed buffer values without continuously updating the buffer with data to which user data compression is applied, and the receiving PDCP entity may also perform a user data decompression procedure by applying fixed buffer values, which are the same as those used by the transmitting PDCP entity, to received data without updating the buffer values each time the user data decompression procedure is performed.

A fourth method of the disclosure for performing user data compression in consideration of loss is as follows.

The fourth method may include configuration information about the RLC entity connected to the PDCP entity to which a data compression method is applied, and the configuration information for the RLC entity may include an indicator or information indicating whether data received by the receiving operation of the RLC entity is transferred to the PDCP entity in an order based on the RLC sequence number (in-sequence delivery setting), or whether data that is not segmented or is reassembled among the received data is transferred directly to the PDCP entity regardless of the order in the RLC sequence number (out-of-sequence delivery setting). Consequently, in case that the RLC entity is configured with an in-sequence delivery function, if a sequence number gap occurs when the received data is reordered in ascending order of the PDCP sequence number or COUNT value, the receiving PDCP entity may trigger and compose PDCP control data indicating that a user data decompression error has occurred and transmit it to the transmitting PDCP entity. That is, the receiving PDCP entity may transmit the transmitting PDCP entity an instruction to initialize the buffer for the data compression method or information indicating that a data decompression failure has occurred by including it in PDCP control data (PDCP control PDU), and the receiving PDCP entity may initialize the buffer for the data compression method immediately or upon receiving an indication of having initialized the buffer for the data compression method or an instruction to initialize the buffer from the transmitting PDCP entity. Further, if there is a gap in the PDCP sequence number or COUNT value, the receiving PDCP entity may discard the data that is received before receiving an indication of having initialized the buffer for the data compression method or an instruction to initialize the buffer from the transmitting PDCP entity without performing a decoding or user data decompression procedure.

Figure 20:
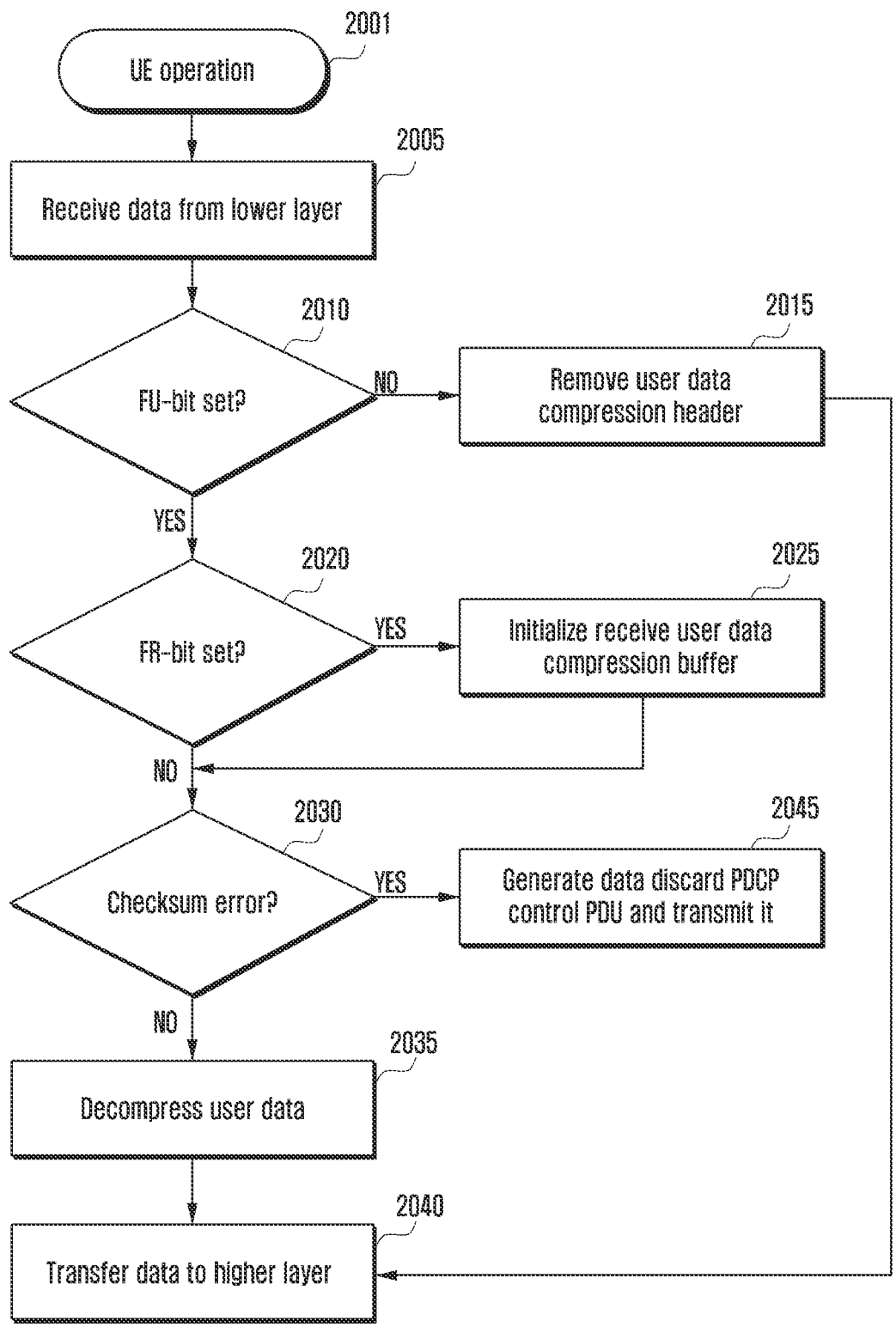
FIG. 20 is a diagram illustrating UE operations of a receiving PDCP entity according to an embodiment of the disclosure.

FIG. 20 is a diagram illustrating UE operations of a receiving PDCP entity according to an embodiment of the disclosure.

In FIG. 20, the receiving PDCP entity of the UE receives data from a lower layer (2005). If a user data compression protocol (UDC/DDC) is configured and user data is compressed (check an indicator of the user data compression header and if it indicates that user data is compressed) (2010), and if the user data compression header indicates initialization of the transmit UDC buffer and the first data to which user data compression is applied (check the FR bit) (2020), the receiving PDCP entity may initialize the receive user data compression protocol buffer (2015). If the checksum field of the user data compression header is identified, a checksum verification procedure is performed, and a checksum error is not detected (2030), the receiving PDCP entity performs decompression on the data (2035). Otherwise, if the checksum field of the user data compression header is identified, a checksum verification procedure is performed, and a checksum error is detected (2030), the receiving PDCP entity discards the data, and generate a PDCP control PDU and transmit it to the transmitting PDCP entity at the transmitting end to indicate that a checksum error has occurred (2045). Then, the receiving PDCP entity may instruct the lower layer entity to discard previously generated data delivered to the lower layer (e.g., PDCP PDU), and the lower layer entity may discard the data not yet transmitted. Further, for data received thereafter, the receiving PDCP entity may prevent unnecessary PDCP control PDU transmission by not additionally generating a PDCP control PDU until receiving data whose 1-bit indicator of the user data compression header is indicative of having initialized the transmit user data compression buffer and being the first data to which user data compression is newly applied. Further, for data received thereafter, the receiving PDCP entity discards all data to which the user data compression procedure is applied among data having a COUNT value or PDCP sequence number smaller than that of the data whose 1-bit indicator of the user data compression header is indicative of having initialized the transmit user data compression buffer and being the first data to which user data compression is newly applied. Otherwise, if the user data compression header is not indicative of having initialized the transmit UDC buffer and being the first data to which user data compression is newly applied (check the FR bit) (2020), and if the checksum field of the user data compression header is identified, a checksum verification procedure is performed, and a checksum error is not detected (2030), the receiving PDCP entity performs decompression on the data (2035). Otherwise, if the checksum field of the user data compression header is identified, a checksum verification procedure is performed, and a checksum error is detected (2030), the receiving PDCP entity discards the data, and generate a PDCP control PDU and transmit it to the transmitting PDCP entity at the transmitting end to indicate that a checksum error has occurred (2045). Then, the receiving PDCP entity may instruct the lower layer entity to discard previously generated data delivered to the lower layer (e.g., PDCP PDU), and the lower layer entity may discard the data not yet transmitted. Further, for data received thereafter, the receiving PDCP entity may prevent unnecessary PDCP control PDU transmission by not additionally generating a PDCP control PDU until receiving data whose 1-bit indicator of the user data compression header is indicative of having initialized the transmit user data compression buffer and being the first data to which user data compression is newly applied. Further, for data received thereafter, the receiving PDCP entity discards all data to which the user data compression procedure is applied among data having a COUNT value or PDCP sequence number smaller than that of the data whose 1-bit indicator of the user data compression header is indicative of having initialized the transmit user data compression buffer and being the first data to which user data compression is newly applied. If a user data compression protocol is configured and user data is not compressed (check an indicator of the user data compression header and if it indicates that user data is not compressed) (2010), the receiving PDCP entity removes the user data compression header without decompressing the data (2015). Then, the data is transferred to a higher layer (2040).

In case of allowing a loss in the transmitting or receiving PDCP entity operation, or in case of being connected to or configured with an RLC entity in RLC UM mode, when applying a user data compression or decompression procedure, the first method, the second method, the third method, or the fourth method proposed above in the disclosure may be applied.

An embodiment of the disclosure proposes operations of a PDCP entity in a UE or base station in which, when a SDAP entity is configured on a bearer, the transmitting or receiving PDCP entity performs different data processing actions (e.g., header compression or data compression procedure) by distinguishing between a case of receiving a SDAP header and higher layer data from a higher layer entity or lower layer entity and a case of receiving SDAP control data.

- 1> When the UE is configured to use a SDAP entity or to use a SDAP header through an RRC message as indicated by 1510, 1540 or 1575 in FIG. 15, and when user data compression (uplink data compression, UDC) is configured,
  - ■2> If data (e.g., PDCP SDU) received from the higher layer entity (SDAP entity) is composed of an SDAP header and higher layer data or is not SDAP control data (when processing data (PDCP SDU) received from the higher layer entity, the transmitting PDCP entity may check first the SDAP header or the 1-bit D/C field of SDAP control data to distinguish it. Further, a 1-bit indicator of the UDC header or a 1-bit indicator of the PDCP header may be indicative of whether being the SDAP header or SDAP control data (or whether being compressed)),
  - ◆3> The transmitting PDCP entity applies the UDC compression procedure except for the SDAP header, performs integrity protection if configured, performs encryption, attaches a PDCP header, and transfers it to the lower layer entity.
  - ■2> If data (e.g., PDCP SDU) received from the higher layer entity (SDAP entity) is not composed of an SDAP header and higher layer data or is SDAP control data (when processing data (PDCP SDU) received from the higher layer entity, the transmitting PDCP entity may check first the SDAP header or the 1-bit D/C field of SDAP control data to distinguish it. Further, a 1-bit indicator of the UDC header or a 1-bit indicator of the PDCP header may be indicative of whether being the SDAP header or SDAP control data (or whether being compressed)),
  - ◆3> The transmitting PDCP entity performs integrity protection if configured on the SDAP control data, does not apply the UDC compression procedure or encryption procedure, attaches a PDCP header, and transfers it to the lower layer entity.
  - ■2> If data (e.g., PDCP PDU) received from the lower layer entity (RLC entity) is composed of an SDAP header and higher layer data or is not SDAP control data (when processing data (PDCP PDU) received from the lower layer entity, the receiving PDCP entity may check first the SDAP header or the 1-bit D/C field of SDAP control data to distinguish it. As another method, a 1-bit indicator of the UDC header or a 1-bit indicator of the PDCP header may be checked to distinguish it. As another method, if the size of the received data except for the PDCP header and the UDC header exceeds 1 byte, it may be determined that the received data is not SDAP control data, and it may be determined that a SDAP header and data are included. However, if the size of the data is 1 byte, it can be determined as SDAP control data.),
  - ◆3> The receiving PDCP entity performs a decryption procedure except for the SDAP header, performs integrity verification if integrity protection is set, performs the UDC decompression procedure if the UDC header has an indication that the UDC compression procedure has been applied, and transfers it to the higher layer entity.
  - ■2> If data (e.g., PDCP PDU) received from the lower layer entity (RLC entity) is not composed of an SDAP header and higher layer data or is SDAP control data (when processing data (PDCP PDU) received from the lower layer entity, the receiving PDCP entity may check first the SDAP header or the 1-bit D/C field of SDAP control data to distinguish it. As another method, a 1-bit indicator of the UDC header or a 1-bit indicator of the PDCP header may be checked to distinguish it. As another method, if the size of the received data except for the PDCP header and the UDC header exceeds 1 byte, it may be determined that the received data is not SDAP control data, and it may be determined that a SDAP header and data are included. However, if the size of the data is 1 byte, it can be determined as SDAP control data.),
  - ◆3> The receiving PDCP entity does not perform a decryption procedure on the SDAP control data, performs integrity verification if integrity protection is set, does not perform a UDC decompression procedure, and transfers it to the higher layer entity.

Further, the operation proposed above can be extended and applied to the case where an existing compression method (e.g., ROHC compression) is configured in the PDCP entity, and when another new header is generated due to the header compression method, embodiments of the disclosure may be extended and applied in consideration of encryption together with the new header or the position of the header. For example, when the ROHC header compression method is applied, it may be extended as follows.

- 1> When a SDAP entity or a SDAP header is configured for usage through an RRC message as indicated by 1510, 1540 or 1575 in FIG. 15, and when a header compression function (robust header compression, ROHC) is configured,
- ■2> If data (e.g., PDCP SDU) received from the higher layer entity (SDAP entity) is composed of an SDAP header and higher layer data or is not SDAP control data (when processing data (PDCP SDU) received from the higher layer entity, the transmitting PDCP entity may check first the SDAP header or the 1-bit D/C field of SDAP control data to distinguish it. Further, a 1-bit indicator of the PDCP header may be indicative of whether being the SDAP header or SDAP control data (or whether being compressed)),
- ◆3> The transmitting PDCP entity applies the ROHC compression procedure except for the SDAP header, performs integrity protection if configured, performs encryption, attaches a PDCP header, and transfers it to the lower layer entity.
- ■2> If data (e.g., PDCP SDU) received from the higher layer entity (SDAP entity) is not composed of an SDAP header and higher layer data or is SDAP control data (when processing data (PDCP SDU) received from the higher layer entity, the transmitting PDCP entity may check first the SDAP header or the 1-bit D/C field of SDAP control data to distinguish it. Further, a 1-bit indicator of the PDCP header may be indicative of whether being the SDAP header or SDAP control data (or whether being compressed)),
- ◆3> The transmitting PDCP entity performs integrity protection if configured on the SDAP control data, does not apply the ROHC compression procedure or encryption procedure, attaches a PDCP header, and transfers it to the lower layer entity.
- ■2> If data (e.g., PDCP PDU) received from the lower layer entity (RLC entity) is composed of an SDAP header and higher layer data or is not SDAP control data (when processing data (PDCP PDU) received from the lower layer entity, the receiving PDCP entity may check first the SDAP header or the 1-bit D/C field of SDAP control data to distinguish it. As another method, a 1-bit indicator of the PDCP header may be checked to distinguish it. As another method, if the size of the received data except for the PDCP header exceeds 1 byte, it may be determined that the received data is not SDAP control data, and it may be determined that a SDAP header and data are included. However, if the size of the data is 1 byte, it can be determined as SDAP control data.),
- ◆3> The receiving PDCP entity performs a decryption procedure except for the SDAP header, performs integrity verification if integrity protection is set, performs the ROHC decompression procedure, and transfers it to the higher layer entity.
- ■2> If data (e.g., PDCP PDU) received from the lower layer entity (RLC entity) is not composed of an SDAP header and higher layer data or is SDAP control data (when processing data (PDCP PDU) received from the lower layer entity, the receiving PDCP entity may check first the SDAP header or the 1-bit D/C field of SDAP control data to distinguish it. As another method, a 1-bit indicator of the PDCP header may be checked to distinguish it. As another method, if the size of the received data except for the PDCP header exceeds 1 byte, it may be determined that the received data is not SDAP control data, and it may be determined that a SDAP header and data are included. However, if the size of the data is 1 byte, it can be determined as SDAP control data.),
- ◆3> The receiving PDCP entity does not perform a decryption procedure on the SDAP control data, performs integrity verification if integrity protection is set, does not perform a ROHC decompression procedure, and transfers it to the higher layer entity.

The SDAP entity may set the 1-bit D/C field of the SDAP header to 1 for SDAP user data (SDAP data PDU) to indicate SDAP user data or a SDAP header, and may set the 1-bit D/C field of the SDAP header to 0 for SDAP control data (SDAP control PDU) to indicate SDAP control data.

Figure 21:
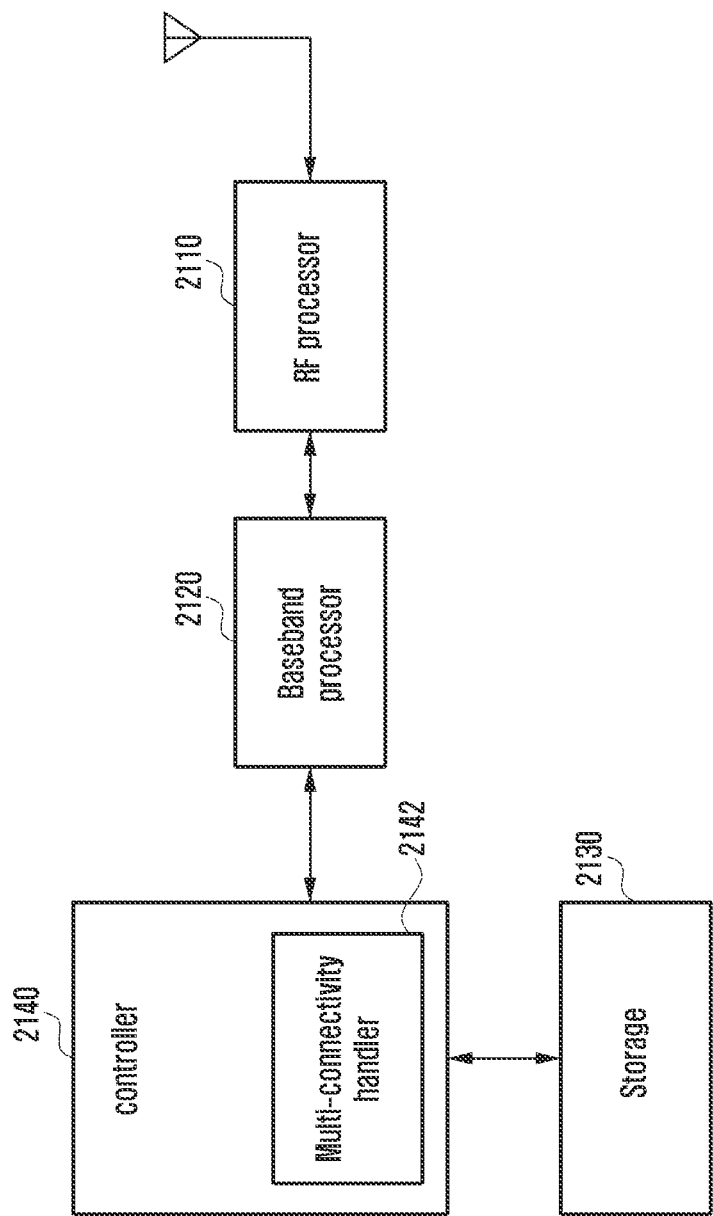
FIG. 21 shows the structure of a UE, to which an embodiment of the disclosure can be applied.

FIG. 21 shows the structure of a UE, to which an embodiment of the disclosure can be applied.

With reference to FIG. 21, the UE includes a radio frequency (RF) processor 2110, a baseband processor 2120, a storage 2130, and a controller 2140.

The RF processor 2110 performs a function for transmitting and receiving a signal through a radio channel, such as signal band conversion and amplification. That is, the RF processor 2110 performs up-conversion of a baseband signal provided from the baseband processor 2120 into an RF-band signal and transmits it through an antenna, and performs down-conversion of an RF-band signal received through an antenna into a baseband signal. For example, the RF processor 2110 may include a transmission filter, a reception filter, an amplifier, a mixer, an oscillator, a digital-to-analog converter (DAC), and an analog-to-digital converter (ADC). Although only one antenna is illustrated in the drawing, the UE may be provided with a plurality of antennas. Also, the RF processor 2110 may include a plurality of RF chains. Further, the RF processor 2110 may perform beamforming. For beamforming, the RF processor 2110 may adjust phases and magnitudes of signals transmitted and received through the plural antennas or antenna elements. Further, the RF processor 2110 may perform MIMO, and may receive several layers during a MIMO operation. The RF processor 2110 may perform reception beam sweeping through proper configuration of plural antennas or antenna elements under the control of the controller, or may adjust the direction and width of the reception beam so that the reception beam cooperates with the transmission beam.

The baseband processor 2120 performs conversion between a baseband signal and a bit string in accordance with the physical layer specification of the system. For example, during data transmission, the baseband processor 2120 generates complex symbols by encoding and modulating a transmission bit string. Further, during data reception, the baseband processor 2120 restores a reception bit string by demodulating and decoding a baseband signal provided from the RF processor 2110. For example, in the case of utilizing orthogonal frequency division multiplexing (OFDM), for data transmission, the baseband processor 2120 generates complex symbols by encoding and modulating a transmission bit string, maps the complex symbols to subcarriers, and composes OFDM symbols through inverse fast Fourier transform (IFFT) operation and cyclic prefix (CP) insertion. Further, for data reception, the baseband processor 2120 divides a baseband signal provided from the RF processor 2110 in units of OFDM symbols, restores the signals mapped to subcarriers through fast Fourier transform (FFT) operation, and restores the reception bit string through demodulation and decoding.

The baseband processor 2120 and the RF processor 2110 transmit and receive signals as described above. Hence, the baseband processor 2120 and the RF processor 2110 may be called a transmitter, a receiver, a transceiver, or a communication unit. Further, to support different radio access technologies, at least one of the baseband processor 2120 or the RF processor 2110 may include a plurality of communication modules. In addition, to process signals of different frequency bands, at least one of the baseband processor 2120 or the RF processor 2110 may include different communication modules. For example, the different radio access technologies may include an LTE network and an NR network. Further, the different frequency bands may include a super high frequency (SHF) band (e.g., 2.5 GHz, 5 GHz) and a millimeter wave (mmWave) band (e.g., 60 GHz).

The storage 2130 stores data such as basic programs, application programs, and configuration information for the operation of the UE. The storage 2130 provides stored data in response to a request from the controller 2140.

The controller 2140 controls the overall operation of the UE. For example, the controller 2140 transmits and receives signals through the baseband processor 2120 and the RF processor 2110. Further, the controller 2140 writes or reads data to or from the storage 2140. To this end, the controller 2140 may include at least one processor. For example, the controller 2140 may include a communication processor (CP) for controlling communication and an application processor (AP) for controlling higher layers such as application programs.

Figure 22:
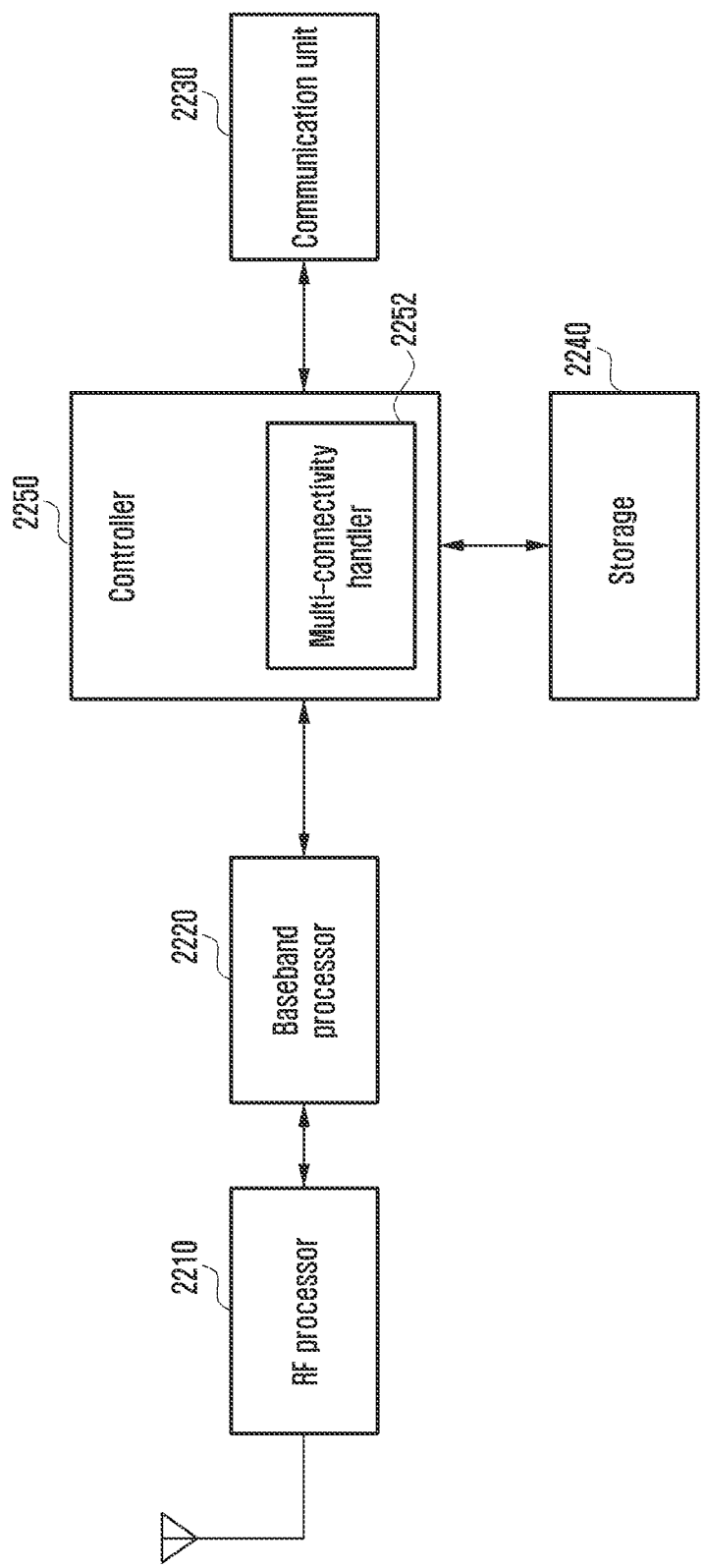
FIG. 22 illustrates a block diagram of a base station in a wireless communication system, to which an embodiment of the disclosure can be applied.

FIG. 22 illustrates a block diagram of a base station in a wireless communication system, to which an embodiment of the disclosure can be applied.

As shown in FIG. 22, the base station includes an RF processor 2210, a baseband processor 2220, a backhaul communication unit 2230, a storage 2240, and a controller 2250.

The RF processor 2210 performs a function for transmitting and receiving a signal through a radio channel, such as signal band conversion and amplification. That is, the RF processor 2210 performs up-conversion of a baseband signal provided from the baseband processor 2220 into an RF-band signal and transmits the converted signal through an antenna, and performs down-conversion of an RF-band signal received through an antenna into a baseband signal. For example, the RF processor 2210 may include a transmission filter, a reception filter, an amplifier, a mixer, an oscillator, a DAC, and an ADC. Although only one antenna is illustrated in the drawing, the base station may be provided with a plurality of antennas. Additionally, the RF processor 2210 may include a plurality of RF chains. Further, the RF processor 2210 may perform beamforming. For beamforming, the RF processor 2210 may adjust phases and amplitudes of signals transmitted and received through plural antennas or antenna elements. The RF processor 2210 may perform downlink MIMO operation by transmitting one or more layers.

The baseband processor 2220 performs conversion between a baseband signal and a bit string in accordance with the physical layer specification of a first radio access technology. For example, for data transmission, the baseband processor 2220 generates complex symbols by encoding and modulating a transmission bit string. Further, for data reception, the baseband processor 2220 restores a reception bit string by demodulating and decoding a baseband signal provided from the RF processor 2210. For example, in the case of utilizing OFDM, for data transmission, the baseband processor 2220 generates complex symbols by encoding and modulating a transmission bit string, maps the complex symbols to subcarriers, and composes OFDM symbols through IFFT operation and CP insertion. Further, for data reception, the baseband processor 2220 divides a baseband signal provided from the RF processor 2210 in units of OFDM symbols, restores the signals mapped to the subcarriers through FFT operation, and restores the reception bit string through demodulation and decoding. The baseband processor 2220 and the RF processor 2210 transmit and receive signals as described above. Hence, the baseband processor 2220 and the RF processor 2210 may be called a transmitter, a receiver, a transceiver, a communication unit, or a wireless communication unit.

The backhaul communication unit 2230 provides an interface for communication with other nodes in the network.

The storage 2240 stores data such as basic programs, application programs, and configuration information for the operation of the base station. In particular, the storage 2240 may store information on a bearer allocated to a connected UE and measurement results reported from the connected UE. Further, the storage 2240 may store information used as a criterion for determining whether to provide or suspend multi-connectivity to the UE. In addition, the storage 2240 provides stored data in response to a request from the controller 2250.

The controller 2250 controls the overall operation of the base station. For example, the controller 2250 transmits and receives signals through the baseband processor 2220 and the RF processor 2210 or through the backhaul communication unit 2230. Further, the controller 2250 writes or reads data to or from the storage 2240. To this end, the controller 2250 may include at least one processor.

The disclosure proposes seamless handover methods capable of minimizing data interruption time due to handover or making it to 0 ms in a next-generation mobile communication system.

Specifically, efficient handover methods proposed in the disclosure may have at least one of the following plural features.

It is characterized in that when a UE, which performs data transmission/reception (uplink or downlink data transmission and reception) with a source base station through each protocol entity (PHY entity, MAC entity, RLC entity, or PDCP entity) of a plurality of first bearers, receives a handover command message (e.g., handover command message or RRC Reconfiguration message) from the source base station, the UE configures protocol entities of new plural second bearers corresponding to (e.g., having the same bearer identifier) the protocol entities of the plural first bearers and performs data transmission and reception (uplink or downlink data transmission and reception) while maintaining data transmission and reception (uplink or downlink data transmission and reception) with the source base station through the plural first bearers without discontinuation.

It is characterized in that the protocol entities (PHY entity, MAC entity, RLC entity, or PDCP entity) of the plural second bearers newly established after the UE receives the handover command message are configured for data transmission and reception with a target base station based on bearer configuration information or protocol entity information included in the handover command message.

It can be characterized in that the above UE performs a random access procedure with the target base station through the protocol entity (e.g., MAC entity) of the plural second bearers while performing data transmission and reception (uplink or downlink data transmission and reception) with the source base station through the protocol entities of the plural first bearers. Here, the random access procedure may include transmission of a preamble, reception of a random access response, or transmission of message 3.

It can be characterized in that the above UE completes the random access procedure with the target base station through the protocol entity (e.g., MAC entity) of the plural second bearers while performing data transmission and reception with the source base station through the protocol entities of the plural first bearers, and transmits a handover completion message to the target base station through the protocol entities of the plural second bearers.

It can be characterized in that if the above UE is allocated an initial uplink transmission resource by the target base station when performing data transmission and reception with the source base station through the protocol entities of the plural first bearers, it receives downlink data but stops transmitting uplink data through the protocol entities of the plural first bearers, switches the uplink data transmission to the protocol entity (e.g., MAC entity) of the plural second bearers to transmit uplink data to the target base station, and also be characterized in that the UE receives downlink data as well from the target base station through the protocol entity (e.g., MAC entity) of the plural second bearers.

Next, the disclosure proposes efficient handover procedures with no data interruption time and low transmission delay based on the above features.

Further, to reduce the processing burden of the UE configured with dual connectivity technology when a handover command message is instructed to the UE, the following methods are proposed for efficient handover proposed in the disclosure.

Method 1: in case that a UE in RRC connected mode is configured with a dual connectivity technology, when the base station instructs the UE on efficient handover proposed in the disclosure by using a handover command message, the base station transmits a configuration for releasing the dual connectivity technology (e.g., SCG release) through the handover command message or an RRC message before the handover command message, so that the dual connectivity technology is released and then efficient handover proposed in the disclosure is applied. This is because efficient handover proposed in the disclosure performs continuous data transmission and reception with the source base station and the target base station during handover, and in the case of a dual connectivity technology UE, continuous data transmission and reception should be performed during handover with two source base stations (e.g., source MCG or source SCG) and two target base stations (e.g., target MCG or target SCG), which may impose an excessive processing load on the UE. Hence, the base station may identify the UE capability and apply method 1 in accordance with the UE capability. Then, the target base station may complete the handover proposed above and configure the dual connectivity technology again to the UE.

Method 2: in case that a UE in RRC connected mode is configured with a dual connectivity technology and is configured with a split bearer (bearer structure in which one PDCP entity for MCG or SCG is connected with two RLC entities and one RLC entity transmits and receives data via the MCG and the other RLC entity transmits and receives data via the SCG), a MCG bearer (single bearer structure for transmitting and receiving data via the MCG), or a SCG bearer (single bearer structure for transmitting and receiving data via the SCG), when the base station instructs the UE on efficient handover proposed in the disclosure by using a handover command message, the base station transmits a configuration for releasing the split bearer, indicating a bearer type change to the MCG bearer, or indicating a bearer type change to the SCG bearer by using the handover command message or an RRC message before the handover command message, so that the split bearer is released and then efficient handover proposed in the disclosure is applied. Because efficient handover proposed in the disclosure continuously transmits and receives data during handover to and from the source base station and the target base station, two protocol entities are required for one bearer. Hence, in the case of a UE configured with both a dual connectivity technology and a split bearer, as four protocol entities are required for one split bearer, an excessive processing load may be placed on the UE. Therefore, the base station may identify the UE capability and apply method 2 in accordance with the UE capability. Then, the target base station may complete the handover proposed above and configure the dual connectivity technology again to the UE.

Method 3: in case that the base station checks the capability of a UE and if the UE capability is supportable, when instructing the UE on efficient handover proposed in the disclosure through a handover command message, the base station may instruct the UE to perform a handover that changes only the MCG but maintains the SCG as it is, or to perform a handover that changes the MCG (including configuration information about the target MCG to perform handover) and a handover that changes the SCG (including configuration information about the target SCG to perform handover) as well.

Figure 23:
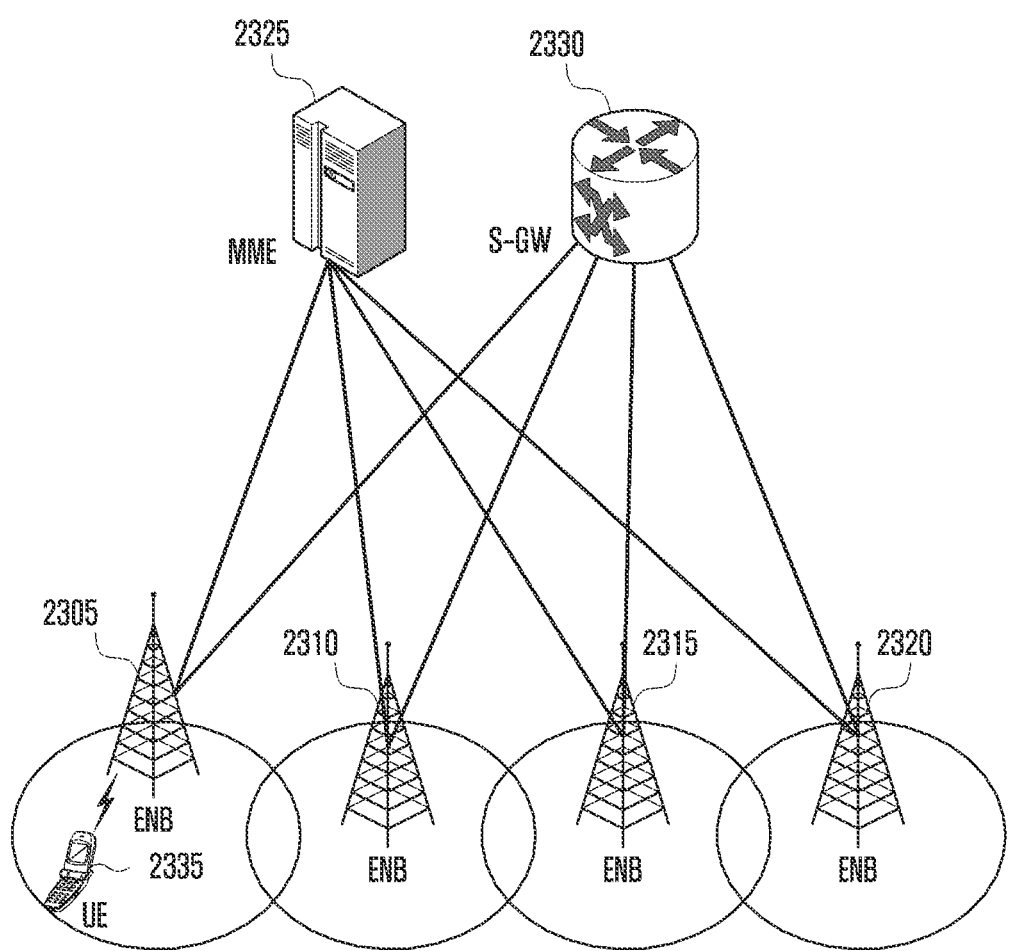
FIG. 23 is a diagram illustrating the architecture of an LTE system according to an embodiment of the disclosure.

FIG. 23 is a diagram illustrating the architecture of an LTE system according to an embodiment of the disclosure.

With reference to FIG. 23, as illustrated, the radio access network of the LTE system is composed of a next-generation base station (evolved node B, ENB, Node B or base station) 2305, 2310, 2315 or 2320, a mobility management entity (MME) 2325, and a serving-gateway (S-GW) 2330. A user equipment (UE or terminal) 2335 may connect to an external network through the ENBs 2305 to 2320 and the S-GW 2330.

In FIG. 23, the ENBs 2305 to 2320 correspond to existing Node Bs of the UMTS system. The ENB is connected to the UE 2335 through a wireless channel, but performs more complex functions in comparison to the existing Node B. In the LTE system, since all user traffic including real-time services like VoIP (Voice over IP) services is served through shared channels, it is necessary to perform scheduling on the basis of collected status information regarding buffers, available transmit powers and channels of the UEs 2335, and each of the ENBs 2305 to 2320 performs this scheduling function. One ENB 2305, 2310, 2315 or 2320 controls multiple cells in a typical situation. To achieve a data rate of, for example, 100 Mbps in a bandwidth of, for example, 20 MHz, the LTE system utilizes orthogonal frequency division multiplexing (OFDM) as radio access technology. Also, it employs adaptive modulation and coding (AMC) to determine the modulation scheme and channel coding rate according to channel states of the UE 2335. The S-GW 2330 is an entity providing data bearers, and creates and removes data bearers under the control of the MME 2325. The MME 2325 is an entity in charge of various control functions including a mobility management function for the UE 2335, and is connected to a plurality of ENBs 2305 to 2320.

Figure 24:
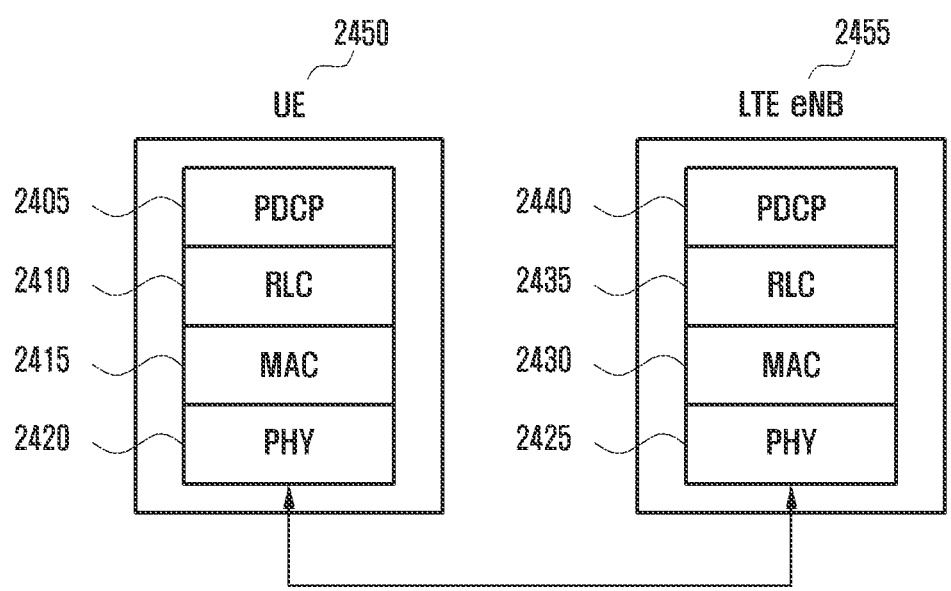
FIG. 24 is a diagram illustrating the structure of radio protocols in the LTE system according to an embodiment of the disclosure.

FIG. 24 is a diagram illustrating the structure of radio protocols in the LTE system according to an embodiment of the disclosure.

With reference to FIG. 24, in a UE or an ENB, the radio protocols of the LTE system is composed of packet data convergence protocol (PDCP) 2405 or 2440, radio link control (RLC) 2410 or 2435, and medium access control (MAC) 2415 or 2430. The PDCP 2405 or 2440 performs compression and decompression of IP headers. The main functions of the PDCP 2405 or 2440 are summarized as follows.

Header compression and decompression function (header compression and decompression: ROHC only)
User data transfer function (transfer of user data)
In-sequence delivery function (in-sequence delivery of upper layer PDUs at PDCP re-establishment procedure for RLC AM)
Reordering function (for split bearers in DC (only support for RLC AM): PDCP PDU routing for transmission and PDCP PDU reordering for reception)
Duplicate detection function (duplicate detection of lower layer SDUs at PDCP re-establishment procedure for RLC AM)
Retransmission function (retransmission of PDCP SDUs at handover and, for split bearers in DC, of PDCP PDUs at PDCP data-recovery procedure, for RLC AM)
Cipher and decipher function (ciphering and deciphering)
Timer-based SDU discard function (timer-based SDU discard in uplink)

The radio link control (RLC) 2410 or 2435 reconfigures PDCP PDUs (packet data unit) to a suitable size and performs an ARQ operation. The main functions of the RLC 2410 or 2435 are summarized as follows.

Data transfer function (transfer of upper layer PDUs)
ARQ function (error correction through ARQ (only for AM data transfer))
Concatenation, segmentation and reassembly function (concatenation, segmentation and reassembly of RLC SDUs (only for UM and AM data transfer))
Re-segmentation function (re-segmentation of RLC data PDUs (only for AM data transfer))
Reordering function (reordering of RLC data PDUs (only for UM and AM data transfer))
Duplicate detection function (duplicate detection (only for UM and AM data transfer))
Error detection function (protocol error detection (only for AM data transfer))
RLC SDU discard function (RLC SDU discard (only for UM and AM data transfer))
RLC re-establishment function (RLC re-establishment)

The MAC 2415 or 2430 is connected with multiple RLC entities in a UE, and it multiplexes RLC PDUs into MAC PDUs and demultiplexes MAC PDUs into RLC PDUs. The main functions of the MAC 2415 or 2430 are summarized as follows.

Mapping function (mapping between logical channels and transport channels)
Multiplexing/demultiplexing function (multiplexing/demultiplexing of MAC SDUs belonging to one or different logical channels into/from transport blocks (TB) delivered to/from the physical layer on transport channels)
Scheduling information reporting function (scheduling information reporting)
HARQ function (error correction through HARQ)
Priority handling function between logical channels (priority handling between logical channels of one UE)
Priority handling function between UEs (priority handling between UEs by means of dynamic scheduling)
MBMS service identification function (MBMS service identification)
Transport format selection function (transport format selection)
Padding function (padding)

The physical (PHY) layer 2420 or 2425 converts higher layer data into OFDM symbols by means of channel coding and modulation and transmits the OFDM symbols through a wireless channel, or it demodulates OFDM symbols received through a wireless channel, performs channel decoding, and forwards the result to a higher layer.

Figure 25:
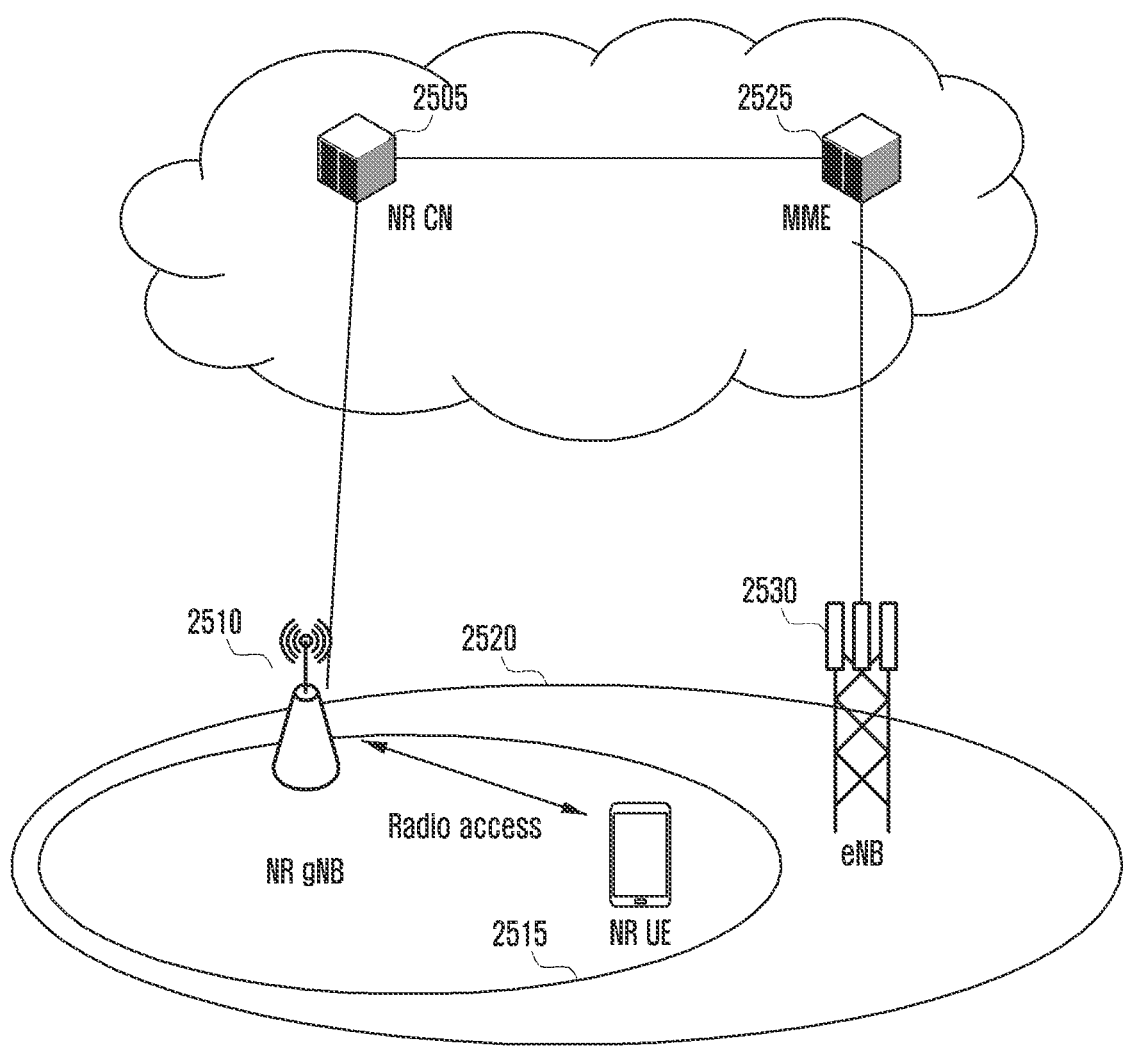
FIG. 25 is a diagram illustrating the architecture of a next-generation mobile communication system according to an embodiment of the disclosure.

FIG. 25 is a diagram illustrating the architecture of a next-generation mobile communication system according to an embodiment of the disclosure.

With reference to FIG. 25, as illustrated, the radio access network of a next-generation mobile communication system (hereinafter, NR or 5G) is composed of a new radio node B (hereinafter, NR gNB or NR base station) 2510 and a new radio core network (NR CN) 2505. A new radio user equipment (hereinafter, NR UE or terminal) 2515 connects to an external network through the NR gNB 2510 and the NR CN 2505.

In FIG. 25, the NR gNB 2510 corresponds to an evolved node B (ENB) of the existing LTE system. The NR gNB 2510 is connected to the NR UE 2515 through a radio channel, and it can provide a more superior service than that of the existing node B. Since all user traffic are serviced through shared channels in the next-generation mobile communication system, there is a need for an entity that performs scheduling by collecting status information, such as buffer states, available transmission power states, and channel states of individual UEs 2515, and the NR NB 2510 takes charge of this. One NR gNB 2510 normally controls a plurality of cells. To implement ultra-high-speed data transmission compared with current LTE, a bandwidth beyond the existing maximum bandwidth may be utilized, and a beamforming technology may be additionally combined with orthogonal frequency division multiplexing (OFDM) serving as a radio access technology. Further, an adaptive modulation and coding (AMC) scheme determining a modulation scheme and channel coding rate to match the channel state of the UE 2515 is adopted. The NR CN 2505 performs functions such as mobility support, bearer configuration, and quality of service (QoS) configuration. The NR CN 2505 is an entity taking charge of not only mobility management but also various control functions for the UE 2515, and is connected to a plurality of base stations 2510. In addition, the next-generation mobile communication system may interwork with the existing LTE system, and the NR CN 2505 is connected to the MME 2525 through a network interface. The MME 2525 is connected to an ENB 2530 being an existing base station.

Figure 26:
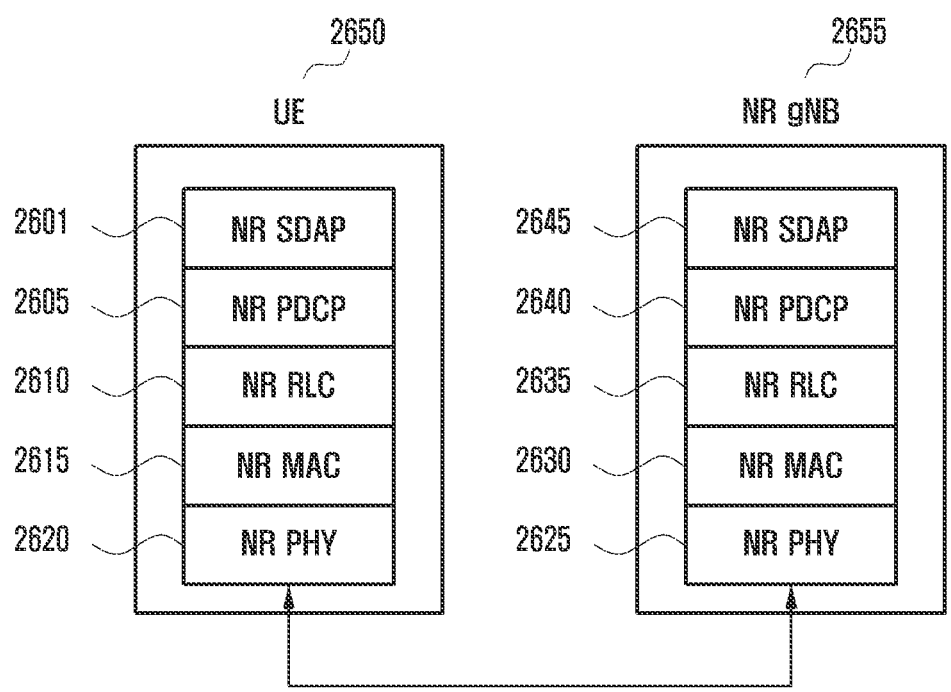
FIG. 26 is a diagram illustrating the structure of radio protocols in the next-generation mobile communication system according to an embodiment of the disclosure.

FIG. 26 is a diagram illustrating the structure of radio protocols in the next-generation mobile communication system according to an embodiment of the disclosure.

With reference to FIG. 26, in a UE or an NR gNB, the radio protocols of the next-generation mobile communication system are composed of NR SDAP 2601 or 2645, NR PDCP 2605 or 2640, NR RLC 2610 or 2635, and NR MAC 2615 or 2630.

The main functions of the NR SDAP 2601 or 2645 may include some of the following functions.
- User data transfer function (transfer of user plane data)
- Mapping function between QoS flow and data bearer for uplink and downlink (mapping between a QoS flow and a DRB for both DL and UL)
- QoS flow ID marking function for uplink and downlink (marking QoS flow ID in both DL packets and UL packets)
- Function of mapping reflective QoS flow to data bearer for uplink SDAP PDUs (reflective QoS flow to DRB mapping for the UL SDAP PDUs)

With respect to the SDAP entity 2601 or 2645, the UE may be configured with, through an RRC message, whether to use a header of the SDAP entity or whether to use a function of the SDAP entity for each PDCP entity, bearer, or logical channel. Also, if a SDAP header is configured, the SDAP entity 2601 or 2645 may use a NAS reflective QoS 1-bit indication and AS reflective QoS 1-bit indication of the SDAP header to instruct the UE to update or reconfigure the mapping information between QoS flows and data bearers for the uplink and downlink. The SDAP header may include QoS flow ID information indicating the QoS. The QoS information may be used as data processing priority and scheduling information for supporting smooth services.

The main function of the NR PDCP 2605 or 2640 may include some of the following functions.
- Header compression and decompression function (header compression and decompression: ROHC only)
- User data transfer function (transfer of user data)
- In-sequence delivery function (in-sequence delivery of upper layer PDUs)
- Out-of-sequence delivery function (out-of-sequence delivery of upper layer PDUs)
- Reordering function (PDCP PDU reordering for reception)
- Duplicate detection function (duplicate detection of lower layer SDUs)
- Retransmission function (retransmission of PDCP SDUs)
- Cipher and decipher function (ciphering and deciphering)
- Timer-based SDU discard function (timer-based SDU discard in uplink)

In the above description, the reordering function of the NR PDCP entity 2605 or 2640 may mean reordering of PDCP PDUs received from a lower layer in order based on the PDCP sequence number (SN). In addition, the reordering function may include delivering data to a higher layer in reordered sequence, directly delivering data without considering the order, recording lost PDCP PDUs through reordering, reporting the status of lost PDCP PDUs to the transmitting side, or requesting retransmission of the lost PDCP PDUs.

The main function of the NR RLC 2610 or 2635 may include some of the following functions.
- Data transfer function (transfer of upper layer PDUs)
- In-sequence delivery function (in-sequence delivery of upper layer PDUs)
- Out-of-sequence delivery function (out-of-sequence delivery of upper layer PDUs)
- ARQ function (error correction through ARQ)
- Concatenation, segmentation and reassembly function (concatenation, segmentation and reassembly of RLC SDUs)
- Re-segmentation function (re-segmentation of RLC data PDUs)
- Reordering function (reordering of RLC data PDUs)
- Duplicate detection function (duplicate detection)
- Error detection function (protocol error detection)
- RLC SDU discard function (RLC SDU discard)
- RLC re-establishment function (RLC re-establishment)

In the above description, in-sequence delivery of the NR RLC entity 2610 or 2635 may mean in-sequence delivery of RLC SDUs received from a lower layer to an upper layer. Also, in-sequence delivery may include reassembly and delivery of RLC SDUs when several RLC SDUs belonging to one original RLC SDU are received after segmentation, and reordering of received RLC PDUs based on the RLC sequence number (SN) or the PDCP SN. In addition, in-sequence delivery may include recording lost RLC PDUs through reordering, reporting the status of the lost RLC PDUs to the transmitting side, and requesting retransmission of the lost RLC PDUs. Further, if there is a lost RLC SDU, in-sequence delivery may include in-sequence delivery of only RLC SDUs before the lost RLC SDU to an upper layer. Further, although there is a lost RLC SDU, if a specified timer has expired, in-sequence delivery may include in-sequence delivery of all the RLC SDUs received before the starting of the timer to an upper layer, or may include in-sequence delivery of all the RLC SDUs received up to now to an upper layer. In addition, the NR RLC entity 2610 or 2635 may process RLC PDUs in the order of reception (in the order of their arrival regardless of the order of the sequence number), and transfer them to the PDCP entity in an out-of-sequence delivery manner, and in the case of a segment, the NR RLC entity 2610 or 2635 may re-compose segments stored in the buffer or received later into one whole RLC PDU, process it, and transfer it to the PDCP entity. The NR RLC layer 2610 or 2635 may not include a concatenation function, and this function may be performed by the NR MAC layer 2615 or 2630 or may be replaced with a multiplexing function of the NR MAC layer.

Out-of-sequence delivery of the NR RLC entity 2610 or 2635 described above means a function of transferring RLC SDUs received from a lower layer directly to a higher layer regardless of their order; if several RLC SDUs belonging to one original RLC SDU are received after segmentation, out-of-sequence delivery may include reassembly and delivery of the RLC SDUs; and out-of-sequence delivery may include storing the RLC SNs or PDCP SNs of received RLC PDUs and ordering them to record lost RLC PDUs.

The NR MAC 2615 or 2630 may be connected to several NR RLC entities configured in one UE, and the main function of the NR MAC 2615 or 2630 may include some of the following functions.
- Mapping function (mapping between logical channels and transport channels)
- Multiplexing and demultiplexing function (multiplexing/demultiplexing of MAC SDUs)
- Scheduling information reporting function (scheduling information reporting)
- HARQ function (error correction through HARQ)
- Priority handling function between logical channels (priority handling between logical channels of one UE)

Priority handling function between UEs (priority handling between UEs by means of dynamic scheduling)

MBMS service identification function (MBMS service identification)

Transport format selection function (transport format selection)

Padding function (padding)

The NR PHY 2620 or 2625 may compose OFDM symbols from higher layer data through channel coding and modulation and transmit them through a radio channel, or may demodulate and channel-decode OFDM symbols received through a radio channel and forward the result to a higher layer.

Figure 27:
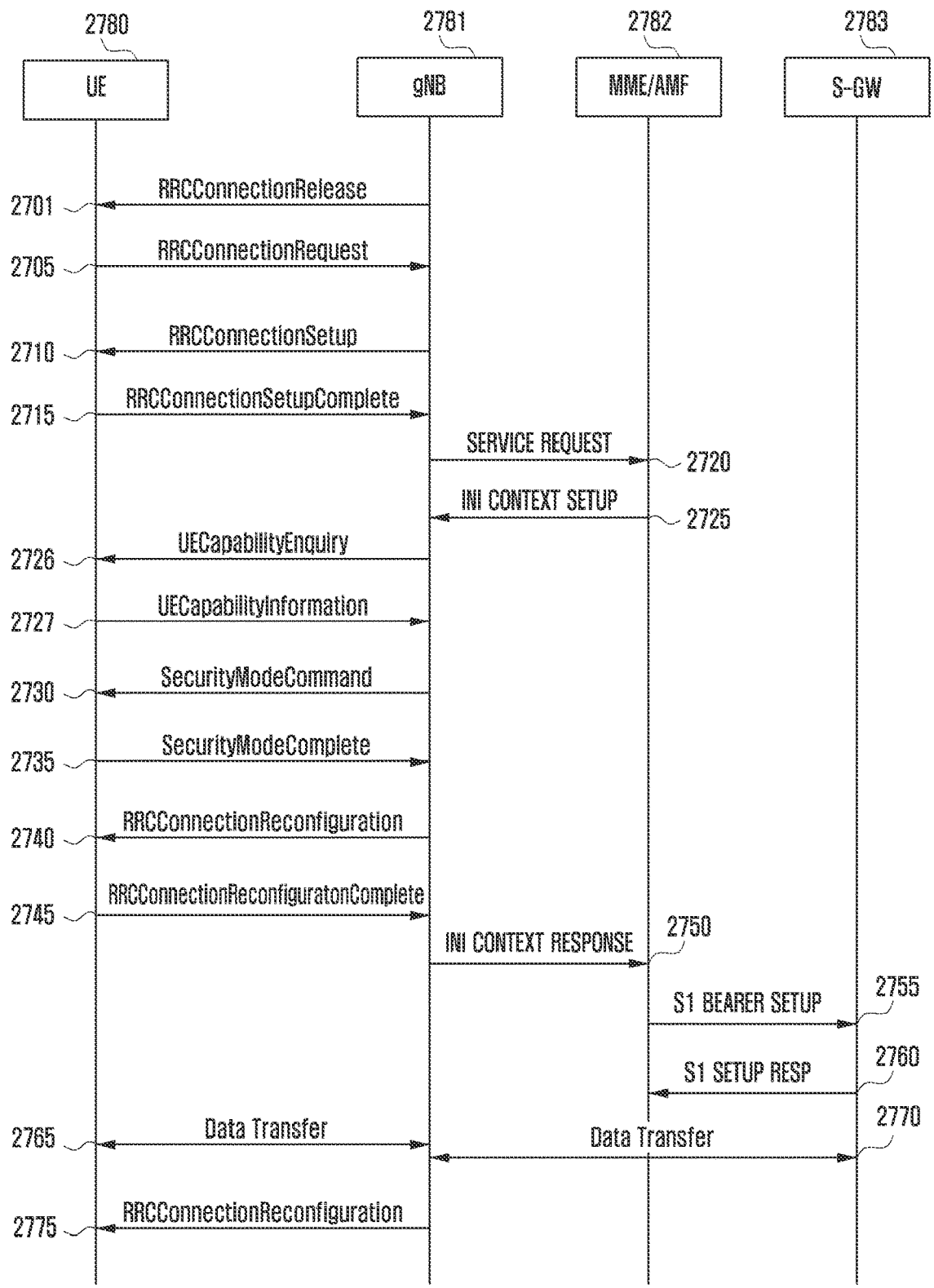
FIG. 27 is a diagram describing a procedure in which the UE transitions from RRC idle mode to RRC connected mode to establish a connection with the network according to an embodiment of the disclosure.

FIG. 27 is a diagram describing a procedure in which the UE transitions from RRC idle mode to RRC connected mode to establish a connection with the network according to an embodiment of the disclosure.

In FIG. 27, if the UE having transmitted and received data in RRC connected mode does not transmit or receive data for a specific reason or for a preset time, the base station may transmit an RRCConnectionRelease message to the UE to allow the UE to transition to RRC idle mode (2701). Later, when data to be transmitted is generated, the UE without a currently established connection (hereinafter, idle mode UE) may perform an RRC connection establishment process with the base station.

The UE may establish reverse transmission synchronization with the base station through a random access process and transmit an RRCConnectionRequest message to the base station (2705). The RRCConnectionRequest message may include an identifier of the UE and a reason for connection establishment (establishmentCause). The base station may transmit an RRCConnectionSetup message to allow the UE to establish an RRC connection (2710).

The RRCConnectionSetup message includes configuration information for each service, bearer, RLC entity, logical channel, or bearer, and whether to use ROHC for each bearer or logical channel, ROHC configuration information (e.g., ROHC version, initial information), statusReportRequired information (information by which the base station instructs the UE to report the PDCP status), and drb-ContinueROHC information (configuration information to keep the ROHC configuration information and use it as it is) may be included in PDCP entity configuration information (pdcp-config) and transmitted. In addition, the RRCConnectionSetup message includes RRC connection configuration information and the like. The bearer for RRC connection is also called a signaling radio bearer (SRB), and is used for transmitting and receiving RRC messages being a control message between the UE and the base station.

The UE having established an RRC connection may transmit an RRCConnectionSetupComplete message to the base station (2715). The RRCConnetionSetupComplete message may include a control message called Service Request by which the UE requests the MME to configure a bearer for a specific service. The base station may transmit the Service Request message contained in the RRCConnetionSetupComplete message to the MME or the AMF (2720), and the MME or AMF may determine whether to provide the service requested by the UE.

Upon determining to provide the service requested by the UE, the MME or AMF may transmit an Initial Context Setup Request message to the base station (2725). The Initial Context Setup Request message may include quality of service (QoS) information to be applied when configuring a data radio bearer (DRB), and security-related information to be applied to the DRB (e.g., security key, security algorithm).

In addition, if UE capability information is not received from the MME or AMF, the base station may transmit a UE capability information request message to the UE to identify the capability information of the UE (2726). Upon receiving the UE capability information request message, the UE may compose and generate a UE capability information message and report it to the base station (2727). The UE capability information message may include kinds of handover methods supported by the UE. For example, an indicator may be defined for each handover method in the UE capability information report message, and whether each handover method is supported may be reported to the base station by using an indicator indicating the handover method supported by the UE. Upon confirming the UE capability information, when instructing the UE on handover, the base station may configure a handover method to the UE in consideration of the reported UE capability by using the indicators defined for individual handover methods in a handover command message (e.g., RRCReconfiguration message). The UE may perform a handover procedure to the target base station according to the handover method indicated by the handover command message.

The base station and the UE may exchange a SecurityModeCommand message and a SecurityModeComplete message to establish security (2730, 2735). When security configuration is completed, the base station may transmit an RRCConnectionReconfiguration message to the UE (2740).

The RRCConnectionReconfiguration message includes configuration information for each service, bearer, RLC entity, logical channel, or bearer, and whether to use ROHC for each bearer or logical channel, ROHC configuration information (e.g., ROHC version, initial information), statusReportRequired information (information by which the base station instructs the UE to report the PDCP status), and drb-ContinueROHC information (configuration information to keep the ROHC configuration information and use it as it is) may be included in PDCP entity configuration information (pdcp-config) and transmitted. In addition, the RRCConnectionReconfiguration message includes RRC connection configuration information and the like. The bearer for RRC connection is also called a signaling radio bearer (SRB), and is used for transmitting and receiving RRC messages being a control message between the UE and the base station.

Further, the RRCConnectionReconfiguration message includes configuration information of a DRB in which user data is to be processed, and the UE may configure a DRB by applying this information and transmit an RRCConnectionReconfigurationComplete message to the base station (2745). The base station having completed DRB setup with the UE may transmit an Initial Context Setup Complete message to the MME or AMF (2750). Then, the MME or AMF having received this and the S-GW may exchange an S1 Bearer Setup message and an S1 Bearer Setup Response message to establish an S1 bearer (2755, 2760). The S1 bearer is a data transmission connection established between the S-GW and the base station, and corresponds to the DRB in one-to-one manner.

When all of the above processes are completed, the UE may transmit and receive data through the base station and the S-GW (2765, 2770). As such, a general data transmission process is composed of three stages: RRC connection setup, security setup, and DRB setup.

In addition, the base station may transmit an RRCConnectionReconfiguration message to the UE to set a new setting in, add a setting to, or change settings of the UE for a specific reason (2775).

In the disclosure, the bearer may have a meaning including an SRB and a DRB, and the SRB means a signaling radio bearer and the DRB means a data radio bearer. The SRB is mainly used to transmit and receive RRC messages of the RRC entity, and the DRB is mainly used to transmit and receive user layer data. Further, UM DRB means a DRB using an RLC entity operating in unacknowledged mode (UM), and AM DRB means a DRB using an RLC entity operating in acknowledged mode (AM).

Figure 28:
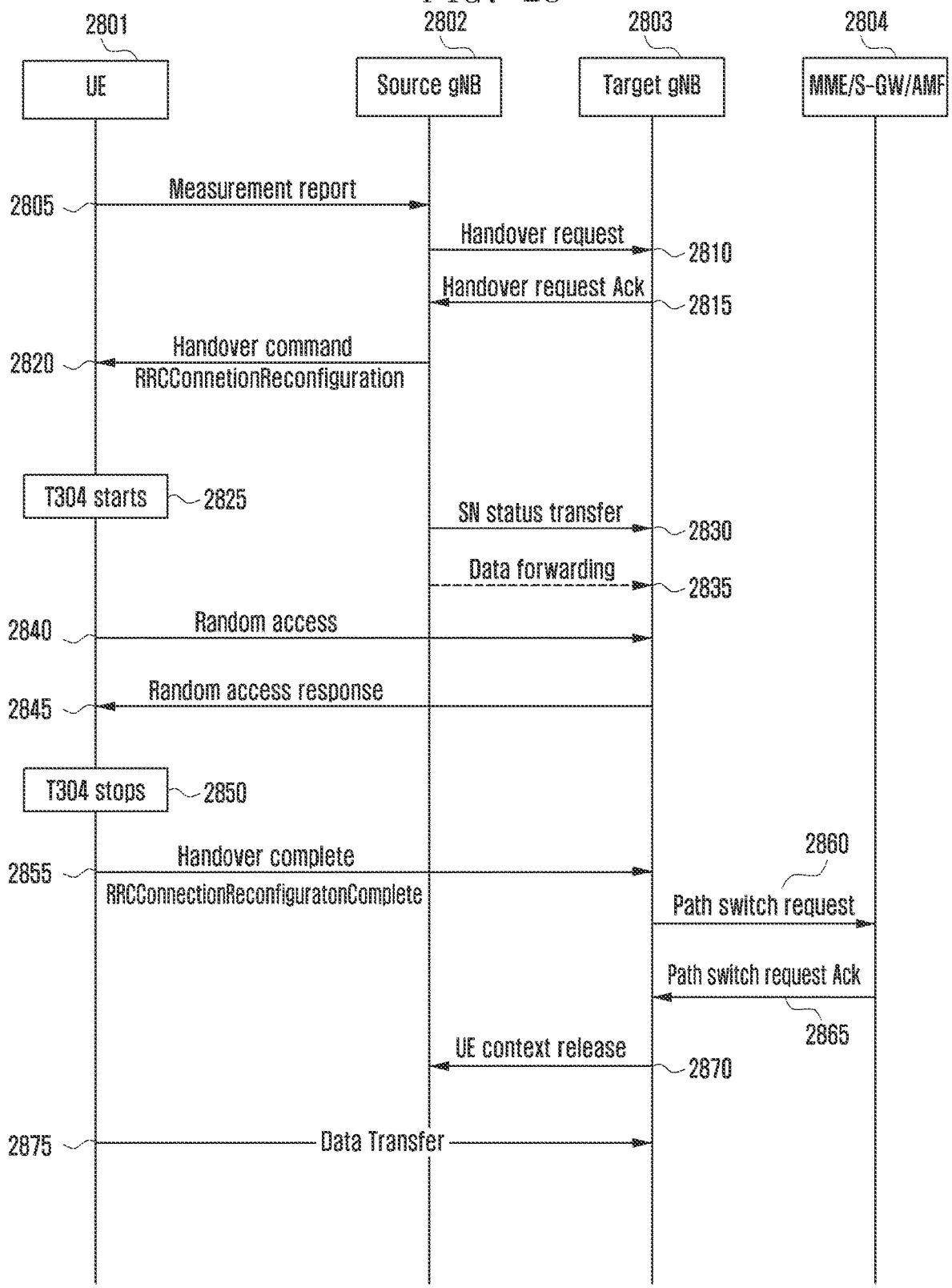
FIG. 28 is a diagram illustrating signaling procedures for performing handover in a next-generation mobile communication system according to an embodiment of the disclosure.

FIG. 28 is a diagram illustrating signaling procedures for performing handover in a next-generation mobile communication system according to an embodiment of the disclosure.

With reference to FIG. 28, the UE 2801 in RRC connected mode may report cell measurement information (measurement report) to the current source base station (source eNB) 2802 when a periodic or specific event is satisfied (2805). The source base station 2802 may determine whether the UE 2801 performs handover to a neighboring cell based on the measurement information. The handover is a technique for changing the source base station 2802 that provides a service to the terminal 2801 in connected mode state to another base station (or, another cell of the same base station). Upon determining handover, the source base station 2802 may request a handover by transmitting a handover (HO) request message to a new base station that will provide a service to the UE 2801, that is, the target base station (target eNB) 2803 (2810).

The handover request message may include a handover method supported or preferred by the source base station 2802 or a plurality of handover methods, and may include, in another way, an indicator for requesting a handover method preferred by the target base station 2803.

If the target base station 2803 accepts the handover request, it may transmit a handover request acceptance (HO request Ack) message to the source base station 2802 (2815).

The handover request acceptance message may include a handover method supported (or, preferred or indicated) by the target base station 2803 among the handover method or plural handover methods included by the source base station 2802 in the handover request message. Then, the source base station 2802 may instruct the UE 2801 on the handover method indicated by the target base station 2803 in the handover request acceptance message. In another way, the target base station 2803 may configure a setting so that the source base station 2802 and the UE 2801 perform the handover method indicated by an indicator indicating the handover method supported by the target base station 2803 in the handover request acceptance message.

Upon receiving the message, the source base station 2802 may transmit a handover command message (HO command message) to the UE 2801 (2820). The handover command (HO command) message may be transmitted from the source base station 2802 to the UE 2801 by using an RRC Connection Reconfiguration message (2820).

By using an indicator defined for each handover method in the handover command message (e.g., RRCReconfiguration message), the base station 2802 may configure the terminal 2801 with a specific handover method in consideration of the UE capability. The UE 2801 may perform a handover procedure to the target base station 2803 according to the handover method indicated in the handover command message.

Upon receiving the handover command message, the UE 2801 may stop data transmission and reception with the source base station 2802 and start the T304 timer. If the UE 2801 does not succeed in handover to the target base station 2803 for a preset period of time, T304 allows the UE 2801 to return to the original configuration and transition to RRC idle state. The source base station 2802 transmits a sequence number (SN) status for uplink and downlink data, and it forwards downlink data if any to the target base station 2803 (2830, 2835). The UE 2801 attempts random access to the target cell indicated by the source base station 2802 (2840). This random access is for notifying the target cell 2803 that the UE 2801 is moving through handover and for achieving uplink synchronization at the same time. For the random access, the UE 2801 transmits the target cell 2803 a preamble corresponding to a preamble ID provided from the source base station 2802 or randomly selected preamble ID. When a specific number of subframes have elapsed after transmission of the preamble, the UE 2801 monitors whether a random access response (RAR) message is transmitted from the target cell 2803. The monitoring time interval is referred to as a random access response window (RAR window).

When a random access response (RAR) is received within the specific time (2845), the UE 2801 may transmit a handover complete (HO complete) message to the target base station 2803 as an RRC Reconfiguration Complete message (2855). Upon successfully receiving the random access response from the target base station 2803 as described above, the UE 2801 may stop the T304 timer (2850). The target base station 2803 may request path switching from the MME/S-GW/AMF 2804 to modify the paths of bearers that have been set to the source base station 2802 (2860, 2865). Then, the target base station 2803 may notify the source base station 2802 to delete the UE context of the UE 2801 (2870). Therefore, the UE 2801 attempts to receive data from the target base station 2803 from the start of the RAR window, and starts to transmit and receive data to and from the target base station 2803 by transmitting an RRC Reconfiguration Complete message after receiving the RAR.

The disclosure proposes seamless handover methods that can minimize data interruption time due to handover or make it to 0 ms in a next-generation mobile communication system, and proposes a method for duplicating downlink or uplink packets (e.g., PDCP SDU) to minimize transmission delay that may occur during handover.

The UE may establish a plurality of first bearers with the source base station and perform data transmission and reception (uplink or downlink data transmission and reception) through the protocol entities (PHY entity, MAC entity, RLC entity, or PDCP entity) of each bearer, and may establish a plurality of second bearers with the target base station and perform data transmission and reception (uplink or downlink data transmission and reception) through the protocol entities (PHY entity, MAC entity, RLC entity, or PDCP entity) of each bearer. However, in the following description of the disclosure, for convenience of description, the UE is depicted and described as having one bearer in the drawings and description.

Figure 29:
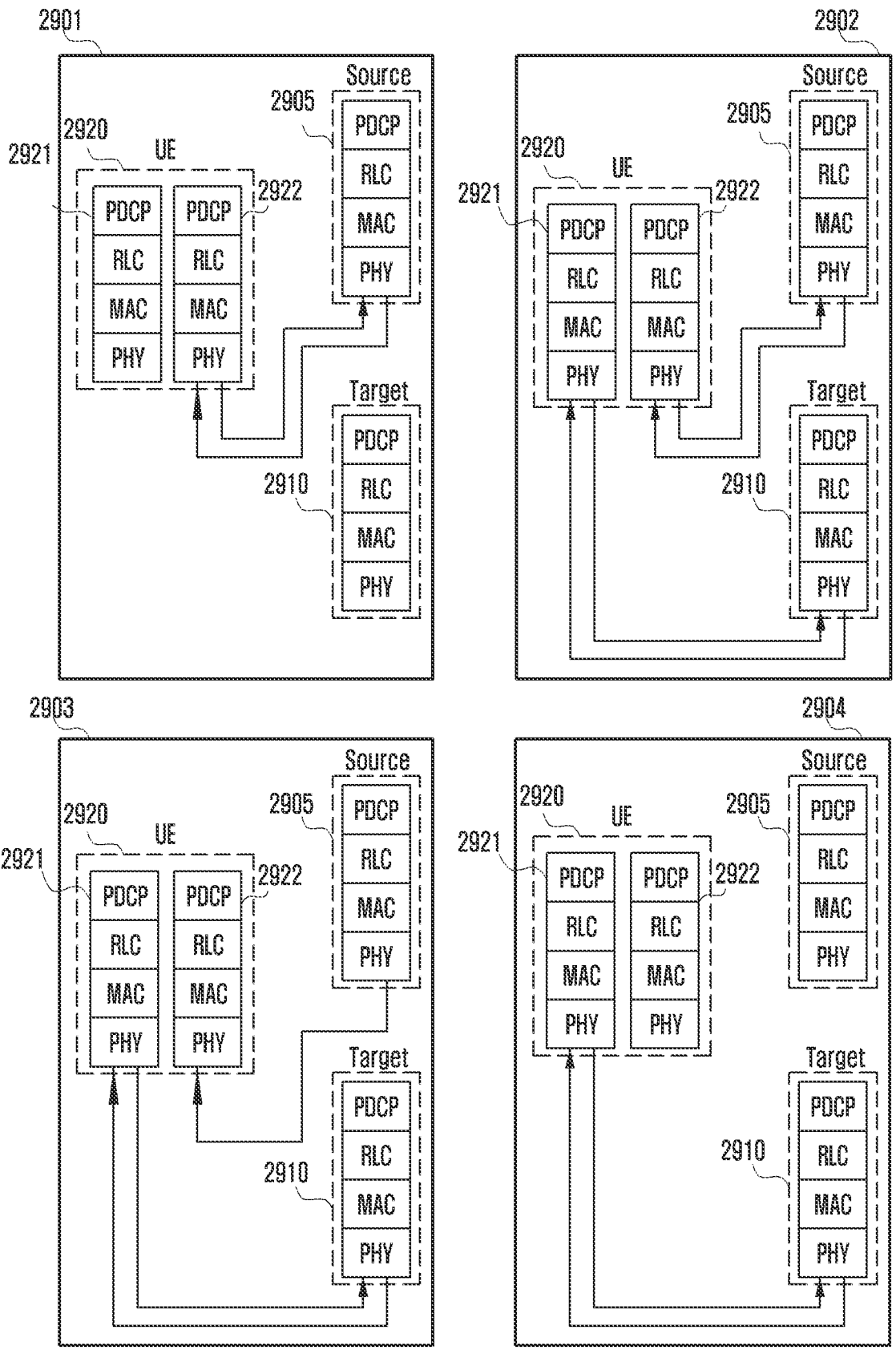
FIG. 29 illustrates detailed steps of a first embodiment of an efficient handover method for minimizing the data interruption time due to handover according to an embodiment of the disclosure.

FIG. 29 illustrates detailed steps of a first embodiment of an efficient handover method for minimizing the data interruption time due to handover according to an embodiment of the disclosure.

In FIG. 29, when identifying an indicator indicating an improved handover method or an indicator indicating the handover method of the first embodiment proposed by the disclosure in the handover command message, the UE may apply the following method of the first embodiment of the disclosure.

In the first embodiment of the efficient handover method of FIG. 29, it can be characterized in that although the UE 2920 receives a handover command message from the source base station 2905 while transmitting and receiving data to and from the source base station 2905 at first stage 2901, to minimize the data interruption time occurring during handover, the UE 2920 may continue to transmit and receive data to and from the source base station 2905 through the protocol entities 2922 of the first bearer. When identifying an indicator indicating an improved handover method or an indicator indicating the handover method of the first embodiment proposed by the disclosure in the handover command message, it is possible to apply the following method of the first embodiment of the disclosure.

Further, it can be characterized in that the UE 2920 may configure or establish in advance the protocol entities (PHY entity, MAC entity, RLC entity, or PDCP entity 2921) of the second bearer for the target base station 2910 according to settings included in the handover command message received above. It can also be characterized in that, to avoid the data interruption time for each bearer, the second bearer may be configured and established to have the same bearer identifier or logical channel identifier as that of the first bearer. Also, in the first embodiment, it may be characterized in that the PDCP entity of the first bearer and the PDCP entity of the second bearer operate logically as a single PDCP entity, and a more detailed operation method will be described with reference to FIG. 30. It may be characterized in that the above single PDCP entity performs an encryption or decryption procedure with different security keys for uplink data and downlink data and performs compression or decompression with different compression protocol contexts by distinguishing between the layer entities (or, first RLC entity) of the first bearer and the layer entities (or, second RLC entity) of the second bearer in consideration of being connected to different MAC entities, having different logical channel identifiers, being different RLC entities connected to different MAC entities, or utilizing different encryption keys.

Further, if the UE 2920 is allowed to transmit uplink data to both the source base station 2905 and the target base station 2910, to prevent a problem of reduced coverage due to insufficient transmission power of the UE 2920 or a problem of determining, when transmitting uplink data, the base station to which a transmission resource request is to be transmitted and to which uplink data is to be transmitted (link selection), it may be characterized in that uplink data can be transmitted to only one of the source base station 2905 and the target base station 2910 in the first embodiment. That is, in the first embodiment of the improved handover method proposed in the disclosure, it may be characterized in that uplink data is not transmitted to different base stations at the same time; the UE 2920 performs uplink data transmission to the source base station 2905, switches from the source base station 2905 to the target base station 2910 when a first condition is satisfied, and performs uplink data transmission to the target base station 2910. Hence, it may be characterized in that the UE 2920 can make a scheduling request to only one base station among the source base station 2905 and the target base station 2910, transmit a report on the size of data to be transmitted by the PDCP entity (e.g., buffer status report transmission) to only one of the source base station 2905 and the target base station 2910 to receive uplink transmission resources, and transmit uplink data to only one base station. In addition, it may be characterized in that even if the UE 2920 receives a handover command message from the source base station 2905, it continues to transmit and receive data for HARQ retransmission, and does not initialize the MAC entity of the first bearer to prevent data loss.

In the first embodiment of the efficient handover method of FIG. 29, it may be characterized in that even when the UE 2920 at second stage 2902 performs a random access procedure through the protocol entities of the second bearer to the target base station 2910 indicated in the handover command message, the UE 2920 can continue data transmission and reception (uplink data transmission and downlink data reception) with the source base station 2905 through the protocol entities of the first bearer.

In the first embodiment of the efficient handover method of FIG. 29, it is characterized in that if a first condition is satisfied at third stage 2903, the terminal 2920 discontinues uplink data transmission to the source base station 2905 through the protocol entities 2922 of the first bearer and transmits uplink data to the target base station 2910 through the protocol entities 2921 of the second bearer. Further, it is characterized in that the UE 2920 may continue to receive downlink data from the source base station 2905 and the target base station 2910 through the protocol entities of the first bearer and the second bearer. In addition, the PDCP entity 2921 of the second bearer in the UE 2920 may continuously perform data transmission and reception with the target base station 2910 and receive and process downlink data from the source base station 2905 by utilizing information stored in the PDCP entity 2922 of the first bearer such as transmission and reception data, sequence number information, header compression and decompression contexts, or security keys.

The first condition in which the UE 2920 switches uplink data transmission from the source base station 2905 to the target base station 2910 at third stage 2903 is as follows.

When the UE 2920 is allocated an uplink transmission resource from the target base station 2910 for the first time or when an uplink transmission resource is indicated for the first time after performing a random access procedure to the target base station 2910 through the layer entities of the second bearer, receiving a random access response, and composing and transmitting a handover completion message to the target base station 2910

In the above description, when it is characterized in that the UE 2920 can continue to receive downlink data from the source base station 2905 and the target base station 2910 through the protocol entities of the first bearer and the second bearer, it is characterized in that in order for the UE 2920 to smoothly receive downlink data from the source base station 2905 (or the target base station 2910), or for the source base station 2905 (or the target base station 2910) to smoothly transmit downlink data, AM bearers are allowed to continuously transmit an RLC status report other than data to the source base station 2905 (or the target base station 2910) in the uplink through the protocol entities of the first bearer (or second bearer). This is because in the case of AM bearers, after transmitting data to the transmitting end, if successful delivery is not indicated by an RLC status report (i.e., if an RLC status report is not received), data cannot be continuously transmitted thereafter.

In the first embodiment of the efficient handover method of FIG. 29, it is characterized in that if a second condition is satisfied at fourth stage 2904, the UE 2920 discontinues receiving downlink data from the source base station 2905 through the protocol entities 2922 of the first bearer. Here, the second condition may be one of the following conditions.

- When the UE 2920 performs a random access procedure to the target base station 2910 through the layer entities 2921 of the second bearer and receives a random access response
- When the UE 2920 performs a random access procedure to the target base station 2910 through the layer entities 2921 of the second bearer, receives a random access response, and composes and transmits a handover completion message to the target base station 2910
- When the UE 2920 completes a random access procedure to the target base station 2910 through the layer entities of the second bearer and transmits data via a PUCCH or PUSCH uplink transmission resource for the first time
- When the base station configures a separate timer to the UE 2920 via an RRC message and the timer expires
- ■ The above timer may be started when the UE 2920 receives a handover command message from the source base station 2905, when the UE 2920 starts random access to the target base station 2910 (when a preamble is transmitted), when the UE 2920 receives a random access response from the target base station 2910, when the UE 2920 transmits a handover completion message to the target base station 2910, or when the UE 2920 transmits data using a PUCCH or PUSCH uplink transmission resource for the first time.
- When, after the UE 2920 performs a random access procedure to the target base station 2910 through the layer entities of the second bearer, receives a random access response, composes and transmits a handover completion message to the target base station 2910, successful delivery of the handover completion message is confirmed at the MAC entity (HARQ ACK) or the RLC entity (RLC ACK)
- When, after performing a random access procedure to the target base station 2910 through the layer entities of the second bearer, receiving a random access response, composing and transmitting a handover completion message to the target base station 2910, the UE 2920 is allocated an uplink transmission resource from the target base station 2910 for the first time, or an uplink transmission resource is indicated for the first time
- When, after performing a random access procedure to the target base station 2910 through the layer entities of the second bearer, receiving a random access response, composing and transmitting a handover completion message to the target base station 2910, the UE 2920 is allocated an uplink transmission resource from the target base station 2910 for the first time and transmits data using the uplink transmission resource, or confirms successful delivery of the transmitted data In the above description, if the source base station 2905 transmits downlink data to the terminal 2920 and the UE 2920 does not indicate HARQ ACK or NACK information for the downlink data, it may confirm that the UE 2920 has discontinued receiving downlink data from the source base station 2905. In another way, the UE 2920 may transmit newly defined MAC control information, RLC control information, or PDCP control information or an RRC message to the source base station 2905 in the uplink to indicate that it will no longer receive downlink data from the source base station 2905 or will release the connection to the source base station 2905.

Further, the PDCP entity 2921 of the second bearer may continuously perform data transmission and reception with the target base station 2910 without interruption by utilizing information stored in the PDCP entity 2922 of the first bearer such as transmission and reception data, sequence number information, header compression and decompression contexts, or security keys.

In the first embodiment of the efficient handover method of the disclosure for minimizing the data interruption time due to handover, it is difficult for the source base station to know exactly when the UE discontinues receiving downlink data. Hence, when the possibility of loss of downlink data transmitted from the source base station to the UE increases, a lot of data may be lost. In the case of RLC AM mode, the data lost as described above can be recovered through retransmission of the PDCP entity (e.g., PDCP reestablishment procedure or PDCP data recovery procedure) during handover, but may cause transmission delay. Additionally, in the case of RLC UM mode, there is no way to recover the data lost as described above.

Accordingly, the disclosure proposes a data duplicate transmission method applicable to a source base station and a target base station to prevent transmission delay or data loss that may occur during handover as described above.

When the first embodiment of the efficient handover method proposed in the disclosure is applied, a first method for performing a duplicate detection procedure at the receiving PDCP entity (UE or base station) is as follows.

Figure 30:
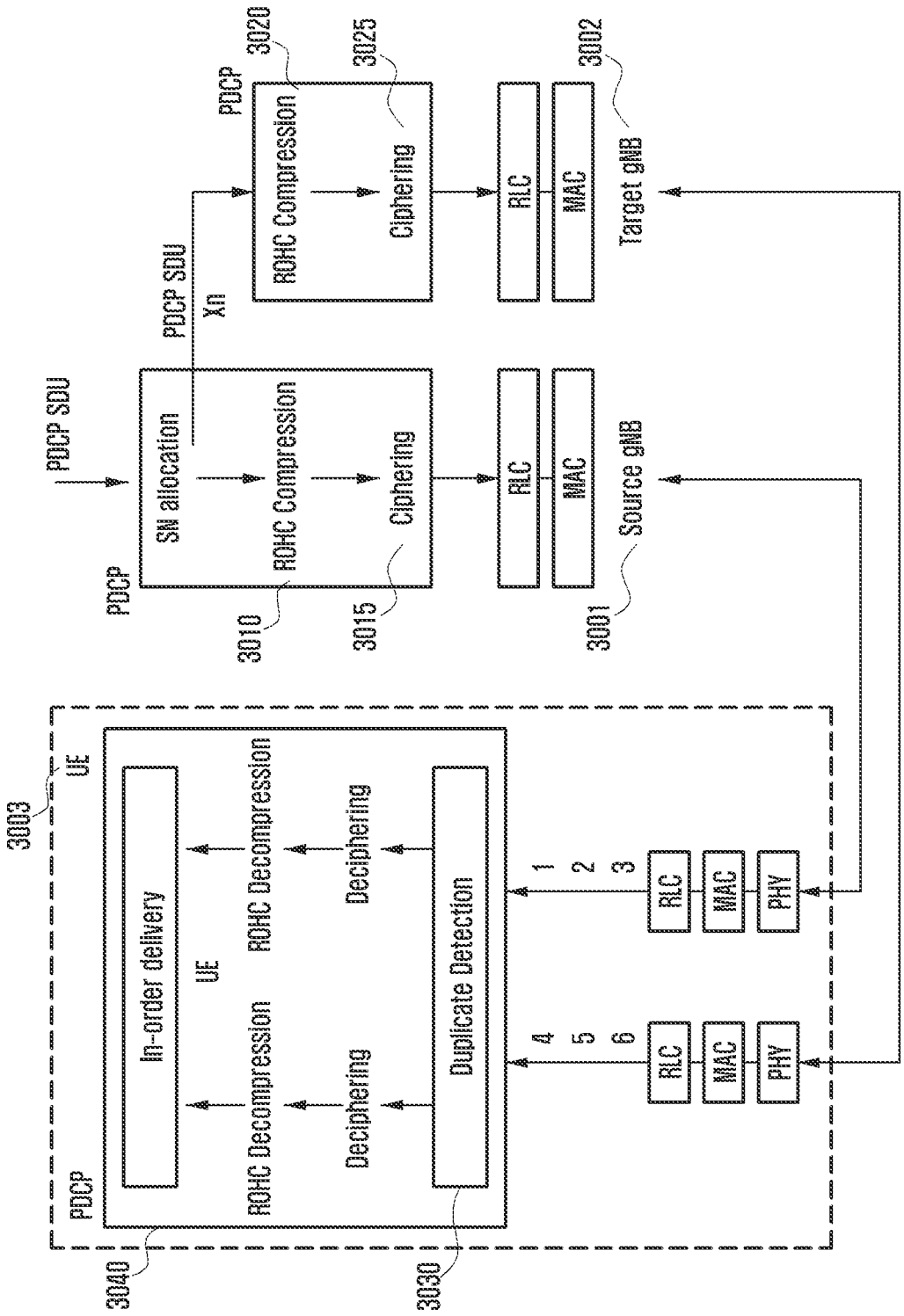
FIG. 30 is a diagram illustrating an operation and duplicate detection procedure of a receiving PDCP entity in the UE when an original data-based data duplicate transmission method is not applied in the first embodiment of the efficient handover method according to an embodiment of the disclosure.

FIG. 30 is a diagram illustrating an operation and duplicate detection procedure of a receiving PDCP entity in the UE when an original data-based data duplicate transmission method is not applied in the first embodiment of the efficient handover method according to an embodiment of the disclosure.

In FIG. 30, the UE 3003 may simultaneously receive downlink data from the source base station 3001 and the target base station 3002 at one PDCP entity 3040, and may perform decryption, integrity verification, or header decompression procedures on downlink data from the source base station 3001 by using security keys or header compression contexts for the source base station 3001. And, the UE 3003 may perform decryption, integrity verification, or header decompression procedures on downlink data from the target base station 3002 by using security keys or header compression contexts for the target base station 3003. Further, the UE 3003 may sort the PDCP SDUs for which processing has been completed in the above procedures in ascending order of the COUNT value or PDCP sequence number and transfer the PDCP SDUs in sequence to a higher layer.

The first method 3030 of the duplicate detection procedure proposed above in the disclosure may be characterized in that it does not distinguish whether the data received by the receiving PDCP entity is transmitted from the source base station 3001 or from the target base station 3002, and performs the duplicate detection procedure based on the PDCP sequence number or COUNT value by discarding the received data having a PDCP sequence number or COUNT value that has been previously received.

In the first method for performing the above duplicate detection procedure, detailed operations of the receiving PDCP entity are as follows.

Specifically, it may be characterized in that if the receiving PDCP entity has previously received a COUNT value corresponding to currently received data in the duplicate detection procedure and has previously successfully received the data corresponding to the COUNT value, it performs duplicate detection by determining that a duplication has occurred and discarding the received data. Successful reception of data in the above description may indicate that the data corresponding to the COUNT value has been processed and stored in the buffer, has been received, processed and forwarded to a higher layer entity, or has been transferred to a higher layer entity and discarded, or indicate that integrity verification has been successfully performed on the data corresponding to the COUNT value if an integrity protection and verification procedure is set. That is, since it can be determined that data is not successfully received when received data fails integrity verification due to an attack by a hacker, normal data may be not discarded in the duplicate detection procedure.

In the first method for performing the duplicate detection procedure of the disclosure, detailed operations of the receiving PDCP entity are as follows.

When receiving a PDCP PDU from a lower layer, the receiving PDCP entity may determine the COUNT value of the received PDCP PDU as follows.

1> If received RCVD_SN<=SN(RX_DELIV)−Window_Size
■2> RCVD_HFN=HFN(RX_DELIV)+1 (update)
1> Else if RCVD_SN> SN(RX_DELIV)+Window_Size
■2> RCVD_HFN=HFN(RX_DELIV)−1 (update)
1> If the above is not the case (else)
■2> RCVD_HFN=HFN(RX_DELIV) (update)
1> RCVD_COUNT=[RCVD_HFN, RCVD_SN] (RCVD_COUNT is determined)

After determining the COUNT value of the received PDCP PDU, the receiving PDCP entity may update the window state variables and process the PDCP PDU as follows.

1> Perform decryption on the PDCP PDU by using the RCVD_COUNT value, and perform integrity verification
■2> If integrity verification fails
■2> Indicate integrity verification failure to the upper layer, and discard the received PDCP Data PDU (data part of PDCP PDU).
1> If RCVD_COUNT<RX_DELIV,
1> Or, if a PDCP PDU having a value of RCVD_COUNT has been successfully received previously,
■2> Discard the received PDCP Data PDU (data part of PDCP PDU).

If the PDCP PDU received above is not discarded, the receiving PDCP entity may operate as follows.

1> Store the PDCP SDU processed above in the receive buffer.
1> If RCVD_COUNT>=RX_NEXT,
■2> Update RX_NEXT with RCVD_COUNT+1
1> If outOfOrderDelivery is set (if out-of-order delivery is indicated),
■2> Transfer the PDCP SDU to a higher layer.
1> If RCVD_COUNT is equal to RX_DELIV,
■2> Transfer the above data to a higher layer in order of COUNT values.
◆3> Transfer all successive PDCP SDUs starting from the value of COUNT=RX_DELIV to a higher layer.
■2> Update RX_DELIV with COUNT value greater than or equal to current RX_DELIV and corresponding to the first PDCP SDU not delivered to the higher layer.
1> If the PDCP reordering timer (t-Reordering timer) is running and RX_DELIV is greater than or equal to RX_REORD,
■2> Stop and reset the PDCP reordering timer (t-Reordering timer).
1> If the PDCP reordering timer (t-Reordering timer) is not running (including the case where the t-Reordering timer is stopped) and RX_DELIV is less than RX_NEXT,
■2> Update RX_REORD with RX_NEXT.
■2> Start the PDCP reordering timer (t-Reordering timer).

In the first method for performing the duplicate detection procedure, other detailed operations of the receiving PDCP entity are as follows.

Specifically, if the receiving PDCP entity has previously received a COUNT value corresponding to currently received data in the duplicate detection procedure and has previously successfully received the data corresponding to the COUNT value (in case that an integrity protection and verification procedure is set, if it has previously received the data corresponding to the COUNT value and has successfully performed integrity verification thereon), it determines that a duplication has occurred and discards the received data to thereby improve the duplicate detection procedure, preventing hacker's attacks. Further, in case that an integrity protection and verification procedure is not set, if the receiving PDCP entity has previously received a COUNT value corresponding to the currently received data, it may immediately discard the received data. Successful reception of data in the above description may indicate that the data corresponding to the COUNT value has been processed and stored in the buffer, has been received, processed and forwarded to a higher layer entity, or has been transferred to a higher layer entity and discarded, or indicate that integrity verification has been successfully performed on the data corresponding to the COUNT value if an integrity protection and verification procedure is set. That is, since it can be determined that data is not successfully received when received data fails integrity verification due to an attack by a hacker, normal data may be not discarded in the duplicate detection procedure. A detailed procedure of the receiving PDCP entity proposed in the disclosure is as follows.

When receiving a PDCP PDU from a lower layer, the receiving PDCP entity may determine the COUNT value of the received PDCP PDU as follows.

1> If received RCVD_SN<=SN(RX_DELIV)−Window_Size
■2> RCVD_HFN=HFN(RX_DELIV)+1 (update)
1> Else if RCVD_SN> SN(RX_DELIV)+Window_Size,
■2> RCVD_HFN=HFN(RX_DELIV)−1 (update)
1> If the above is not the case (else),
■2> RCVD_HFN=HFN(RX_DELIV) (update)
1> RCVD_COUNT=[RCVD_HFN, RCVD_SN] (RCVD_COUNT is determined)

After determining the COUNT value of the received PDCP PDU, the receiving PDCP entity may update the window state variables and process the PDCP PDU as follows.

1> Perform decryption on the PDCP PDU by using the RCVD_COUNT value, and perform integrity verification
■2> If integrity verification fails,
■2> Indicate integrity verification failure to the upper layer, and discard the received PDCP Data PDU (data part of PDCP PDU).
1> If RCVD_COUNT<RX_DELIV,
1> Or, if a PDCP PDU having a value of RCVD_COUNT has been successfully received previously, and if integrity verification has been successfully performed previously on the PDCP PDU corresponding to the RCVD_COUNT value when an integrity protection and verification procedure is set,
1> Or, if a PDCP PDU having a value of RCVD_COUNT has been successfully received previously, and if an integrity protection and verification procedure is not set,
■ Discard the received PDCP Data PDU (data part of PDCP PDU).

If the PDCP PDU received above is not discarded, the receiving PDCP entity may operate as follows.
1> Store the PDCP SDU processed above in the receive buffer.
1> If RCVD_COUNT>=RX_NEXT,
■2> Update RX_NEXT with RCVD_COUNT+1
1> If outOfOrderDelivery is set (if out-of-order delivery is indicated),
■2> Transfer the PDCP SDU to a higher layer.
1> If RCVD_COUNT is equal to RX_DELIV,
■2> If currently stored PDCP SDUs are not header-decompressed, perform a header decompression procedure (when a header compression procedure is set), and transfer them to a higher layer in order of COUNT values.
◆3> Transfer all successive PDCP SDUs starting from the value of COUNT=RX_DELIV to the higher layer.
■2> Update RX_DELIV with COUNT value greater than or equal to current RX_DELIV and corresponding to the first PDCP SDU not delivered to the higher layer.
1> If the PDCP reordering timer (t-Reordering timer) is running and RX_DELIV is greater than or equal to RX_REORD,
■2> Stop and reset the PDCP reordering timer (t-Reordering timer).
1> If the PDCP reordering timer (t-Reordering timer) is not running (including the case of being stopped) and RX_DELIV is less than RX_NEXT,
■2> Update RX_REORD with RX_NEXT.
■2> Start the PDCP reordering timer (t-Reordering timer).

When the PDCP reordering timer (t-Reordering timer) expires, the receiving PDCP entity may operate as follows.
1> If currently stored PDCP SDUs are not header-decompressed, perform a header decompression procedure (when a header compression procedure is set), and transfer them to a higher layer in order of COUNT values.
■2> Transfer all PDCP SDUs with COUNT value less than RX_REORD.
■2> Transfer all PDCP SDUs with consecutive COUNT values starting from RX_REORD value.
1> Update RX_DELIV with COUNT value greater than or equal to RX_REORD and corresponding to the first PDCP SDU not delivered to the higher layer.
1> If RX_DELIV is less than RX_NEXT,
■2> Update RX_REORD with RX_NEXT.
■2> Start the PDCP reordering timer (t-Reordering timer).

When the PDCP reordering timer (t-Reordering timer) expires, the receiving PDCP entity may operate as follows.
1> If the header decompression procedure has not been applied before (i.e., if data processing has not yet been done for the higher layer header), perform a header decompression procedure on the stored data, and transfer the data to the higher layer in order of COUNT values.
■2> Transfer all PDCP SDUs with COUNT value less than RX_REORD.
■2> Transfer all PDCP SDUs with consecutive COUNT values starting from RX_REORD value.
1> Update RX_DELIV with COUNT value greater than or equal to RX_REORD and corresponding to the first PDCP SDU not delivered to the higher layer.
1> If RX_DELIV is less than RX_NEXT,
■2> Update RX_REORD with RX_NEXT.
■2> Start the PDCP reordering timer (t-Reordering timer).

In FIG. 28 of the disclosure, when the base station 2802 transmits a handover command message 2820 to the UE 2801, the base station 2802 may define indicators to the embodiments proposed in the disclosure in the handover command message (e.g., RRCReconfiguration message) and may instruct the UE 2801 on which embodiment of a handover procedure to be triggered; the UE 2801 may perform a handover procedure according to the handover method indicated in the handover command message and perform handover to the target base station 2803 while minimizing the data interruption time.

In addition, to reduce the processing burden of the UE when efficient handover proposed in the disclosure is instructed through a handover command message to the UE configured with a dual connectivity technology, the following methods are proposed.

Method 1: in case that a UE in RRC connected mode is configured with a dual connectivity technology, when the base station instructs the UE on efficient handover proposed in the disclosure by using a handover command message, the base station transmits a configuration for releasing the dual connectivity technology (e.g., SCG release) through the handover command message or an RRC message before the handover command message, so that the dual connectivity technology is released and then efficient handover proposed in the disclosure is applied. This is because efficient handover proposed in the disclosure performs continuous data transmission and reception with the source base station and the target base station during handover, and in the case of a dual connectivity technology UE, continuous data transmission and reception should be performed during handover with two source base stations (e.g., source MCG or source SCG) and two target base stations (e.g., target MCG or target SCG), which may impose an excessive processing load on the UE. Hence, the base station may identify the UE capability and apply method 1 in accordance with the UE capability. Then, the target base station may complete the handover proposed above and configure the dual connectivity technology again to the UE.

Method 2: in case that a UE in RRC connected mode is configured with a dual connectivity technology and is configured with a split bearer (bearer structure in which one PDCP entity for MCG or SCG is connected with two RLC entities and one RLC entity transmits and receives data via the MCG and the other RLC entity transmits and receives data via the SCG), a MCG bearer (single bearer structure for transmitting and receiving data via the MCG), or a SCG bearer (single bearer structure for transmitting and receiving data via the SCG), when the base station instructs the UE on efficient handover proposed in the disclosure by using a handover command message, the base station transmits a configuration for releasing the split bearer, indicating a bearer type change to the MCG bearer, or indicating a bearer type change to the SCG bearer by using the handover command message or an RRC message before the handover command message, so that the split bearer is released and then efficient handover proposed in the disclosure is applied. Because efficient handover proposed in the disclosure continuously transmits and receives data during handover to and from the source base station and the target base station, two protocol entities are required for one bearer. Hence, in the case of a UE configured with both a dual connectivity technology and a split bearer, as four protocol entities are required for one split bearer, an excessive processing load may be placed on the UE. Therefore, the base station may identify the UE capability and apply method 2 in accordance with the UE capability. Then, the target base station may complete the handover proposed above and configure the dual connectivity technology again to the UE.

Method 3: in case that the base station checks the capability of a UE and if the UE capability is supportable, when instructing the UE on efficient handover proposed in the disclosure through a handover command message, the base station may instruct the UE to perform a handover that changes only the MCG but maintains the SCG as it is, or to perform a handover that changes the MCG (including configuration information about the target MCG to perform handover) and a handover that changes the SCG (including configuration information about the target SCG to perform handover) as well.

In the above embodiments of the disclosure, when the UE performs data transmission and reception with the source base station through protocol entities of the first bearer and performs data transmission and reception with the target base station through protocol entities of the second bearer, the MAC entity of the first bearer and the MAC entity of the second bearer may operate different discontinuous reception (DRX) periodicities to thereby reduce battery consumption of the UE. That is, the UE can continue to apply the DRX cycle of the MAC entity, which has been applied when transmitting and receiving data through the protocol entities of the first bearer, even after receiving a handover command message, and it may stop DRX according to the first condition or the second condition of the disclosure. In addition, the UE may separately operate the application of the DRX cycle to the MAC entity of the second bearer according to the instruction of the target base station.

Further, in the disclosure, the meaning of "the UE discontinues uplink transmission to the source base station and discontinues downlink transmission from the source base station through protocol entities of the first bearer" is that the UE reestablishes, initializes, or releases the protocol entities (PHY entity, MAC entity, RLC entity, or PDCP entity) of the first bearer.

In the above embodiments of the disclosure, for convenience of explanation, it has been described that the UE is configured with a first bearer for a source base station or a second bearer for a target base station, and this can be readily extended and equally applied to the case in which the UE is configured with a plurality of first bearers for a source base station or a plurality of second bearers for a target base station.

FIG. 30 is a diagram illustrating the structure of an efficient PDCP entity applicable to embodiments of the disclosure.

The disclosure proposes the structure of an efficient PDCP entity as shown in FIGS. 30 and 29. The structure of the PDCP entity may be applied to the first or second embodiment of the efficient handover method for minimizing the data interruption time proposed in the disclosure.

In FIG. 30, the UE 3003 may perform data transmission and reception with the source base station 3001 through the protocol entities of the first bearer, and perform data transmission and reception with the target base station 3002 through the protocol entities of the second bearer at the same time.

Although the PDCP entity of the first bearer and the PDCP entity of the second bearer may be separately configured in the UE 3003, they can logically operate as a single PDCP entity as shown in FIG. 30. Specifically, the single PDCP entity may be implemented, through division of functions of the PDCP entity, with an upper PDCP entity and two lower PDCP entities for a source base station 3001 and a target base station 3002.

In the above description, the transmitting upper PDCP entity may play a role of assigning PDCP sequence numbers to data received from a higher layer entity. And, it may perform header compression. Further, the two transmitting lower PDCP entities for a source base station 3001 and a target base station 3002 may perform, when integrity protection is configured by using separate security keys set respectively with the source base station 3001 and the target base station 3002, transmission by applying an integrity protection procedure to the PDCP header and data (PDCP SDU), applying an encryption procedure, and transferring it respectively to the transmitting RLC entity of the first bearer and the transmitting RLC entity of the second bearer. Here, it may be characterized in that the two transmitting lower PDCP entities can apply parallel processing to accelerate data processing speed by performing header compression, integrity protection, or encryption procedures in parallel, and the two transmitting lower PDCP entities perform the integrity protection or encryption procedure by using different security keys. Further, it may be characterized in that, in the logically one transmitting PDCP entity, integrity protection or encryption procedures are performed on different data by applying different security keys or security algorithms.

In the above description, the receiving upper PDCP entity may perform a duplicate detection function on data received from lower layer entities based on the PDCP sequence number, or may play a role of arranging the order of received data in ascending order of the PDCP sequence number and transferring it in sequence to a higher layer. And, header decompression can be performed. Further, the two receiving lower PDCP entities for a source base station 3001 and a target base station 3002 may perform, when integrity protection is configured by using separate security keys set respectively with the source base station 3001 and the target base station 3002, data processing by applying an integrity verification procedure to the PDCP header and data (PDCP SDU), applying a decryption procedure, and transferring it to the receiving upper PDCP entity. To reduce unnecessary integrity verification or decryption procedures, the two receiving lower PDCP entities may operate a window based on the PDCP sequence number to discard data outside the window and discard duplicate data first, and may perform the integrity verification or decryption procedures only on valid data within the window. It may be characterized in that, the two receiving lower PDCP entities each based on the PDCP sequence numbers, the two transmitting lower PDCP entities can apply parallel processing to accelerate data processing speed by performing header compression, integrity protection, or encryption procedures in parallel, and the two transmitting lower PDCP entities perform the integrity protection or encryption procedure by using different security keys. Further, it may be characterized in that, in the logically one transmitting PDCP entity, integrity protection or encryption procedures are performed on different data by applying different security keys or security algorithms. Further, it is characterized in that the receiving lower PDCP entities can perform out-of-sequence deciphering or integrity verification procedures on each received data regardless of the order of PDCP sequence numbers.

The embodiments of the PDCP entity procedure proposed above in the disclosure can be extended and applied to a structure in which, in the PDCP entity structure as shown in FIG. 30, the upper PDCP entity performs a header compression procedure on data to be transmitted by using common header compression protocol contexts (e.g., ROHC context), and the lower PDCP entities 2921 and 2922 separately perform their encryption procedures by using different security keys.

In another way, to process in parallel an encryption or decryption procedure for data to be processed with different security keys, two devices or processors may separately perform encryption or decryption procedures on pieces of data with different security keys.

In another way, to uniformly process an encryption or decryption procedure for data to be processed with different security keys, a single device or processor may perform an encryption or decryption procedure on pieces of data having different security keys while changing the security key for each data.

In another way, to process in parallel a header compression or header decompression procedure on data to be processed with different header compression contexts, two devices or processors may separately perform header compression or header decompression procedures on pieces of data to be processed with different header compression contexts.

In another way, to uniformly process a header compression or header decompression procedure for data to be processed with different header compression contexts, a single device or processor may process pieces of data to be processed with different header compression contexts while changing the header compression context for each data.

In addition, the embodiments of the PDCP entity procedure proposed above in the disclosure can be extended and applied to a structure in which, in the PDCP entity structure as shown in FIG. 29, the lower PDCP entities 2921 and 2922 separately perform their decryption procedures on received data by using different security keys, and the upper PDCP entity performs a header decompression procedure by using common header compression protocol contexts (e.g., ROHC context).

Figure 31:
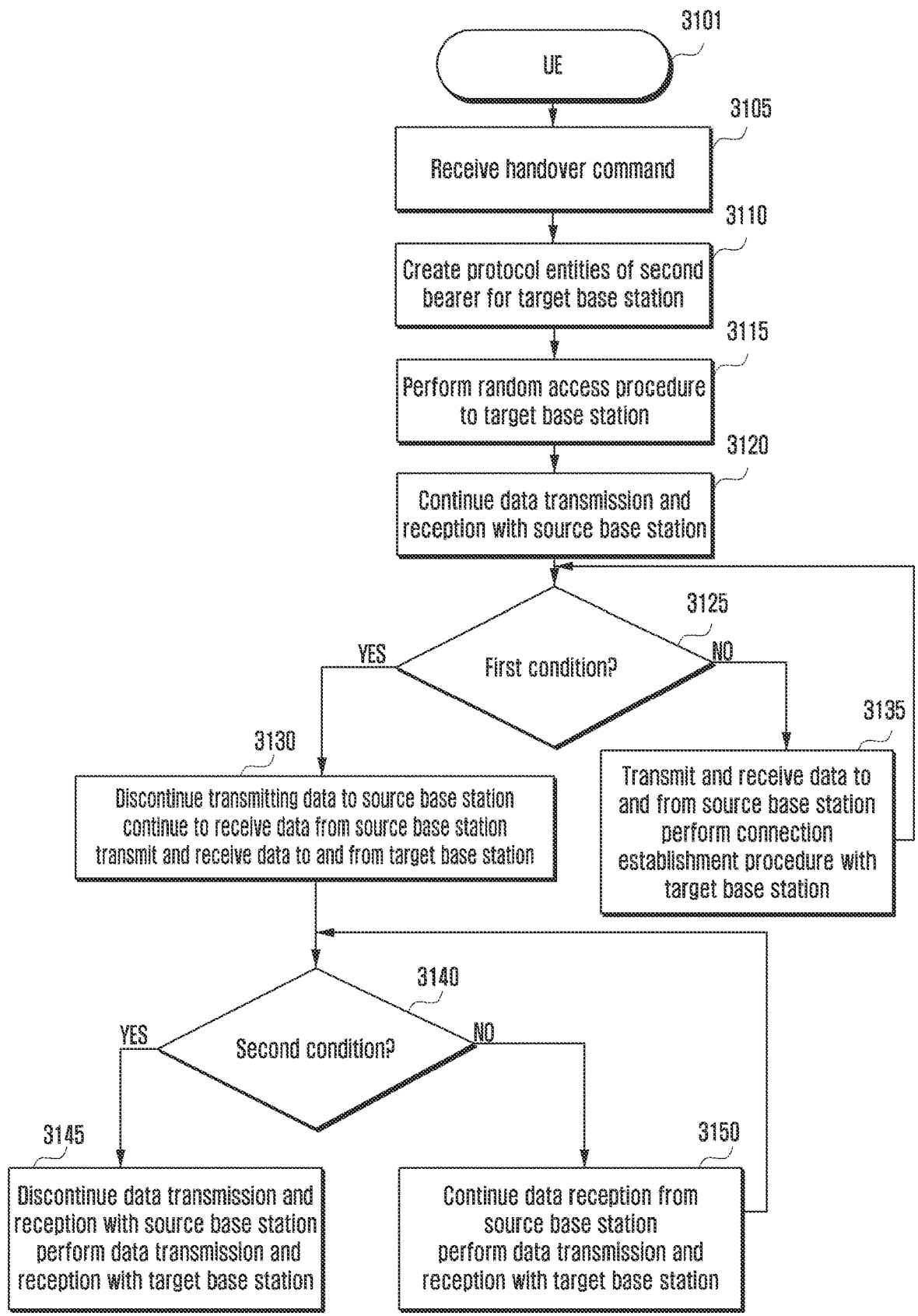
FIG. 31 is a diagram illustrating an example of UE operations applicable to the embodiments proposed in the disclosure.

FIG. 31 is a diagram illustrating an example of UE operations applicable to the embodiments proposed in the disclosure.

In FIG. 31, when the UE 3101 receives a handover command message (3105), if the message includes an indicator indicating the first embodiment of the efficient handover method, the UE may configure and establish protocol entities of the second bearer for the indicated target base station (3110). Then, even when the UE performs a random access procedure to the target base station through the established protocol entities (3115), the UE may continue data transmission and reception (uplink data transmission and downlink data reception) with the source base station through the protocol entities of the first bearer (3120). Further, if an indicator indicating the original data-based duplicate data transmission method is set for the downlink in the above message, the receiving PDCP entity of the UE applies the second method of performing a duplicate detection procedure on received data. However, if an indicator indicating the original data-based duplicate data transmission method is not set for the downlink in the handover command message, the receiving PDCP entity of the UE may apply the first method of performing a duplicate detection procedure on received data.

If the first condition is satisfied (3125), the UE may, as a characteristic operation, discontinue transmitting uplink data to the source base station through the protocol entities of the first bearer, transmit uplink data to the target base station through the protocol entities 2921 of the second bearer, and continue to receive downlink data from the source base station and the target base station through the protocol entities of the first bearer and the second bearer, as a characteristic operation (3130).

If the first condition is not satisfied above, the UE can continuously check the first condition while performing existing procedures (3135).

Further, if the second condition is satisfied, the UE may, as a characteristic operation, discontinue receiving downlink data through the protocol entities of the first bearer from the source base station 2905 (3145). In addition, the PDCP entity 2921 of the second bearer may continuously perform data transmission and reception with the target base station without interruption by utilizing information stored in the PDCP entity 2922 of the first bearer such as transmission and reception data, sequence number information, and header compression and decompression contexts.

If the second condition is not satisfied above, the UE can continuously check the second condition while performing existing procedures.

The operations of the UE or base station according to the above embodiment of the disclosure are as follows.

If the received handover command message includes an indicator indicating the first embodiment of the efficient handover method,
- ■ The source base station and the target base station perform operations according to the first embodiment of the handover method
- ■ The UE performs operations according to the first embodiment of the efficient handover method
- ■ The receiving PDCP entity of the UE applies the first method of performing the duplicate detection procedure If the received handover command message includes an indicator indicating the second embodiment of the efficient handover method or includes an indicator indicating the first embodiment of the efficient handover method and an indicator indicating the downlink original data-based duplicate data transmission method,
- ■ The source base station and the target base station perform operations according to the second embodiment of the efficient handover method
- ■ The source base station and the target base station apply the original data-based duplicate data transmission method
- ■ The UE performs operations according to the second embodiment of the efficient handover method
- ■ The receiving PDCP entity of the UE applies the second method of performing the duplicate detection procedure In addition, when receiving the above handover command message, the UE configured with a dual connectivity technology may operate as follows according to each method.

Method 1: in case that a UE in RRC connected mode is configured with a dual connectivity technology, when the base station instructs the UE on efficient handover proposed in the disclosure by using a handover command message, the base station transmits a configuration for releasing the dual connectivity technology (e.g., SCG release) through the handover command message or an RRC message before the handover command message, so that the dual connectivity technology is released and then efficient handover proposed in the disclosure is applied. This is because efficient handover proposed in the disclosure performs continuous data transmission and reception with the source base station and the target base station during handover, and in the case of a dual connectivity technology UE, continuous data transmission and reception should be performed during handover with two source base stations (e.g., source MCG or source SCG) and two target base stations (e.g., target MCG or target SCG), which may impose an excessive processing load on the UE. Hence, the base station may identify the UE capability and apply method 1 in accordance with the UE capability. Then, the target base station may complete the handover proposed above and configure the dual connectivity technology again to the UE. In method 1, the UE releases the dual connectivity technology and performs a handover procedure according to the setting of the handover command message.

Method 2: in case that a UE in RRC connected mode is configured with a dual connectivity technology and is configured with a split bearer (bearer structure in which one PDCP entity for MCG or SCG is connected with two RLC entities and one RLC entity transmits and receives data via the MCG and the other RLC entity transmits and receives data via the SCG), a MCG bearer (single bearer structure for transmitting and receiving data via the MCG), or a SCG bearer (single bearer structure for transmitting and receiving data via the SCG), when the base station instructs the UE on efficient handover proposed in the disclosure by using a handover command message, the base station transmits a configuration for releasing the split bearer, indicating a bearer type change to the MCG bearer, or indicating a bearer type change to the SCG bearer by using the handover command message or an RRC message before the handover command message, so that the split bearer is released and then efficient handover proposed in the disclosure is applied. Because efficient handover proposed in the disclosure continuously transmits and receives data during handover to and from the source base station and the target base station, two protocol entities are required for one bearer. Hence, in the case of a UE configured with both a dual connectivity technology and a split bearer, as four protocol entities are required for one split bearer, an excessive processing load may be placed on the UE. Therefore, the base station may identify the UE capability and apply method 2 in accordance with the UE capability. Then, the target base station may complete the handover proposed above and configure the dual connectivity technology again to the UE. In method 2, the UE makes a bearer type change for a split bearer to an MCG bearer or an SCG bearer, and performs a handover procedure according to the setting of the handover command message.

Method 3: in case that the base station checks the capability of a UE and if the UE capability is supportable, when instructing the UE on efficient handover proposed in the disclosure through a handover command message, the base station may instruct the UE to perform a handover that changes only the MCG but maintains the SCG as it is, or to perform a handover that changes the MCG (including configuration information about the target MCG to perform handover) and a handover that changes the SCG (including configuration information about the target SCG to perform handover) as well. In method 3, the UE performs a handover procedure of the MCG or SCG indicated by the RRC message while maintaining the dual connectivity technology.

Figure 32:
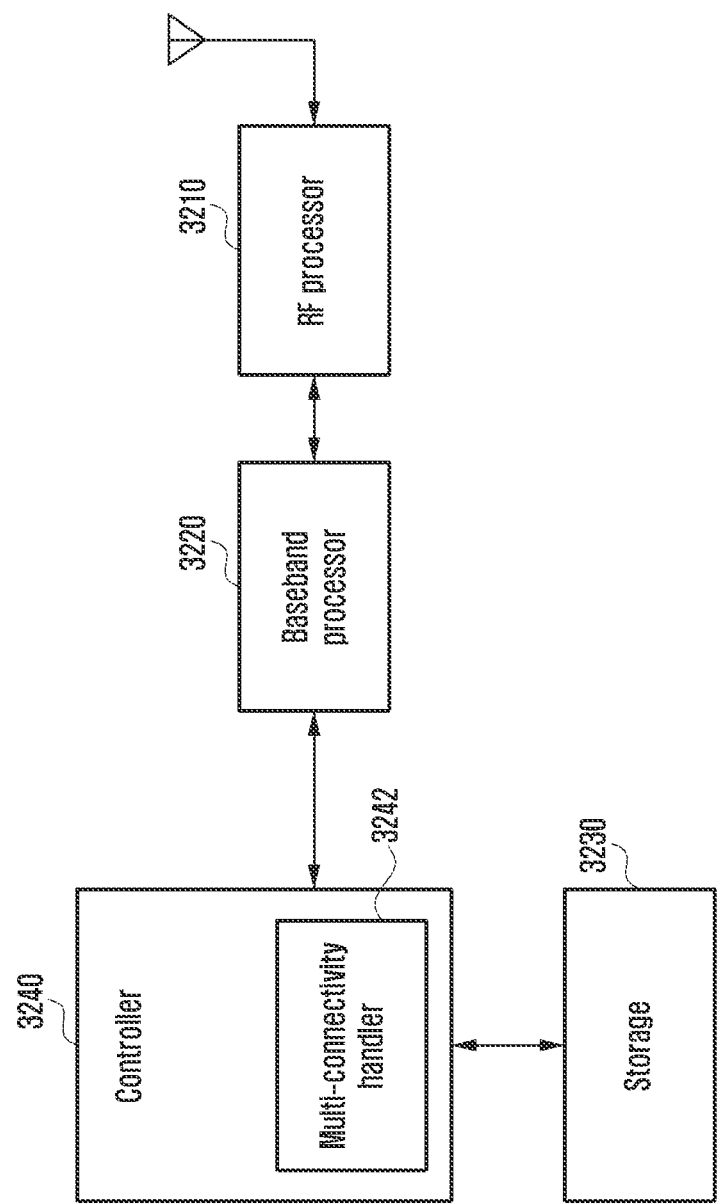
FIG. 32 shows the structure of a UE, to which an embodiment of the disclosure can be applied.

FIG. 32 shows the structure of a UE, to which an embodiment of the disclosure can be applied.

With reference to FIG. 32, the UE includes a radio frequency (RF) processor 3210, a baseband processor 3220, a storage 3230, and a controller 3240.

The RF processor 3210 performs a function for transmitting and receiving a signal through a radio channel, such as signal band conversion and amplification. That is, the RF processor 3210 performs up-conversion of a baseband signal provided from the baseband processor 3220 into an RF-band signal and transmits it through an antenna, and performs down-conversion of an RF-band signal received through an antenna into a baseband signal. For example, the RF processor 3210 may include a transmission filter, a reception filter, an amplifier, a mixer, an oscillator, a digital-to-analog converter (DAC), and an analog-to-digital converter (ADC). Although only one antenna is illustrated in the drawing, the UE may be provided with a plurality of antennas. Also, the RF processor 3210 may include a plurality of RF chains. Further, the RF processor 3210 may perform beamforming. For beamforming, the RF processor 3210 may adjust phases and magnitudes of signals transmitted and received through the plural antennas or antenna elements. Further, the RF processor 3210 may perform MIMO, and may receive several layers during a MIMO operation. The RF processor 3210 may perform reception beam sweeping through proper configuration of plural antennas or antenna elements under the control of the controller 3240, or may adjust the direction and width of the reception beam so that the reception beam cooperates with the transmission beam.

The baseband processor 3220 performs conversion between a baseband signal and a bit string in accordance with the physical layer specification of the system. For example, during data transmission, the baseband processor 3220 generates complex symbols by encoding and modulating a transmission bit string. Further, during data reception, the baseband processor 3220 restores a reception bit string by demodulating and decoding a baseband signal provided from the RF processor 3210. For example, in the case of utilizing orthogonal frequency division multiplexing (OFDM), for data transmission, the baseband processor 3220 generates complex symbols by encoding and modulating a transmission bit string, maps the complex symbols to subcarriers, and composes OFDM symbols through inverse fast Fourier transform (IFFT) operation and cyclic prefix (CP) insertion. Further, for data reception, the baseband processor 3220 divides a baseband signal provided from the RF processor 3210 in units of OFDM symbols, restores the signals mapped to subcarriers through fast Fourier transform (FFT) operation, and restores the reception bit string through demodulation and decoding.

The baseband processor 3220 and the RF processor 3210 transmit and receive signals as described above. Hence, the baseband processor 3220 and the RF processor 3210 may be called a transmitter, a receiver, a transceiver, or a communication unit. Further, to support different radio access technologies, at least one of the baseband processor 3220 or the RF processor 3210 may include a plurality of communication modules. In addition, to process signals of different frequency bands, at least one of the baseband processor 3220 or the RF processor 3210 may include different communication modules. For example, the different radio access technologies may include an LTE network and an NR network. Further, the different frequency bands may include a super high frequency (SHF) band (e.g., 2.5 GHz, 5 GHz) and a millimeter wave (mmWave) band (e.g., 60 GHz).

The storage 3230 stores data such as basic programs, application programs, and configuration information for the operation of the UE. The storage 3230 provides stored data in response to a request from the controller 3240.

The controller 3240 controls the overall operation of the UE. For example, the controller 3240 transmits and receives signals through the baseband processor 3220 and the RF processor 3210. Further, the controller 3240 writes or reads data to or from the storage 3240. To this end, the controller 3240 may include at least one processor. For example, the controller 3240 may include a communication processor (CP) for controlling communication and an application processor (AP) for controlling higher layers such as application programs.

Figure 33:
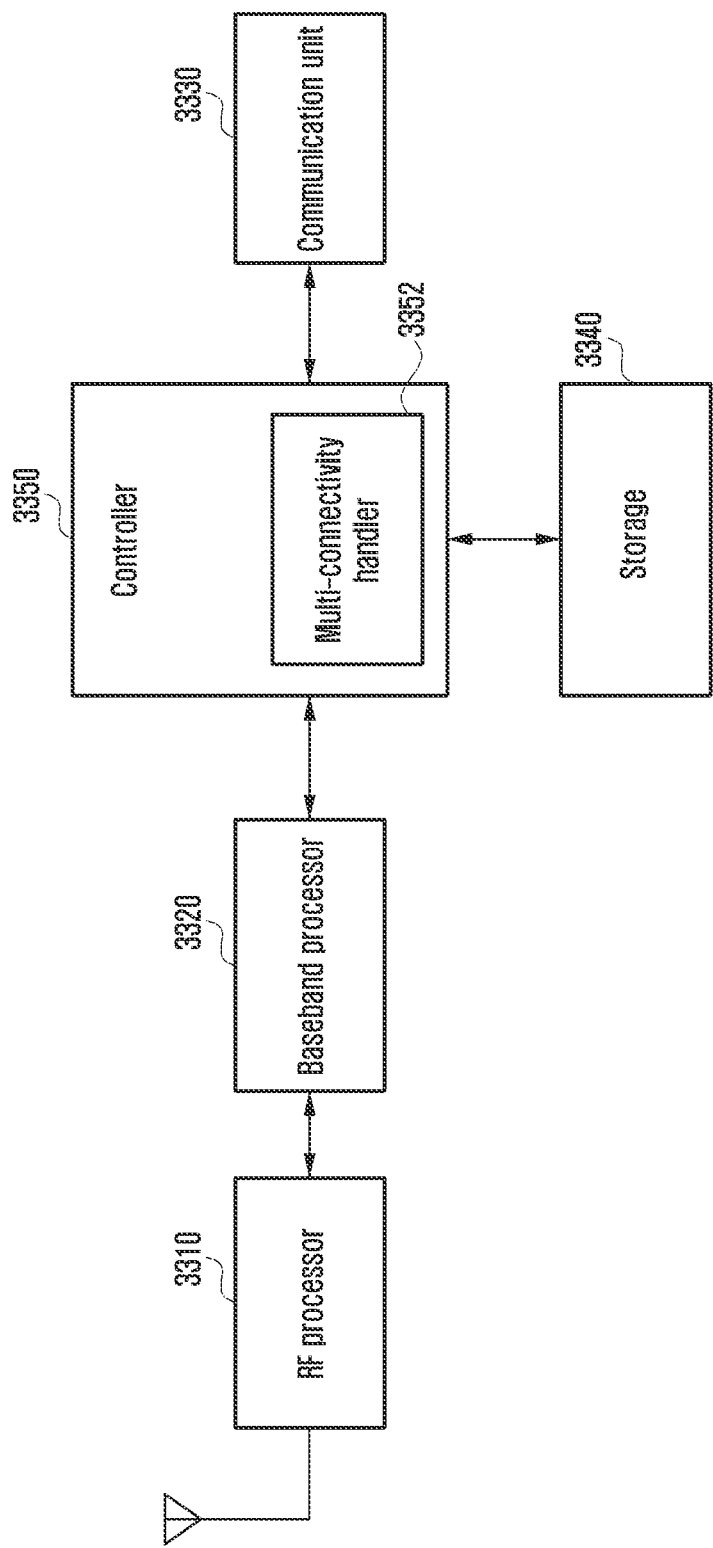
FIG. 33 illustrates a block diagram of a base station in a wireless communication system, to which an embodiment of the disclosure can be applied.

FIG. 33 illustrates a block diagram of a base station in a wireless communication system, to which an embodiment of the disclosure can be applied.

As shown in the figure, the base station includes an RF processor 3310, a baseband processor 3320, a backhaul communication unit 3330, a storage 3340, and a controller 3350.

The RF processor 3310 performs a function for transmitting and receiving a signal through a radio channel, such as signal band conversion and amplification. That is, the RF processor 3310 performs up-conversion of a baseband signal provided from the baseband processor 3320 into an RF-band signal and transmits the converted signal through an antenna, and performs down-conversion of an RF-band signal received through an antenna into a baseband signal. For example, the RF processor 3310 may include a transmission filter, a reception filter, an amplifier, a mixer, an oscillator, a DAC, and an ADC. Although only one antenna is illustrated in the drawing, the base station may be provided with a plurality of antennas. Additionally, the RF processor 3310 may include a plurality of RF chains. Further, the RF processor 3310 may perform beamforming. For beamforming, the RF processor 3310 may adjust phases and amplitudes of signals transmitted and received through plural antennas or antenna elements. The RF processor 3310 may perform downlink MIMO operation by transmitting one or more layers.

The baseband processor 3320 performs conversion between a baseband signal and a bit string in accordance with the physical layer specification of a first radio access technology. For example, for data transmission, the baseband processor 3320 generates complex symbols by encoding and modulating a transmission bit string. Further, for data reception, the baseband processor 3320 restores a reception bit string by demodulating and decoding a baseband signal provided from the RF processor 3310. For example, in the case of utilizing OFDM, for data transmission, the baseband processor 3320 generates complex symbols by encoding and modulating a transmission bit string, maps the complex symbols to subcarriers, and composes OFDM symbols through IFFT operation and CP insertion. Further, for data reception, the baseband processor 3320 divides a baseband signal provided from the RF processor 3310 in units of OFDM symbols, restores the signals mapped to the subcarriers through FFT operation, and restores the reception bit string through demodulation and decoding. The baseband processor 3320 and the RF processor 3310 transmit and receive signals as described above. Hence, the baseband processor 3320 and the RF processor 3310 may be called a transmitter, a receiver, a transceiver, a communication unit, or a wireless communication unit.

The backhaul communication unit 3330 provides an interface for communication with other nodes in the network.

The storage 3340 stores data such as basic programs, application programs, and configuration information for the operation of the base station. In particular, the storage 3340 may store information on a bearer allocated to a connected UE and measurement results reported from the connected UE. Further, the storage 3340 may store information used as a criterion for determining whether to provide or suspend multi-connectivity to the UE. In addition, the storage 3340 provides stored data in response to a request from the controller 3350.

The controller 3350 controls the overall operation of the base station. For example, the controller 3350 transmits and receives signals through the baseband processor 3320 and the RF processor 3310 or through the backhaul communication unit 3330. Further, the controller 3350 writes or reads data to or from the storage 3340. To this end, the controller 3350 may include at least one processor.

Meanwhile, although specific embodiments have been described in the detailed description of the disclosure, various modifications are possible without departing from the scope of the disclosure. Therefore, the scope of the disclosure should not be limited to the described embodiments and should be defined by the appended claims and their equivalents.

The invention claimed is:

1. A method performed by a terminal in a wireless communication system, the method comprising:
receiving, from a first base station, a first message for releasing dual connectivity;
receiving, from the first base station, a second message for a handover from the first base station to a second base station;
configuring a dual active protocol entity for the second base station based on the second message for the handover;
performing a random access procedure with the second base station;
transmitting, to the first base station, uplink data until a first condition is satisfied, and in case that the first condition is satisfied, switching uplink data transmission to the second base station, wherein the first condition is related to a completion of the random access procedure with the second base station; and
receiving, from the first base station, downlink data until a second condition is satisfied, wherein the second condition is related to a releasing a connection with the first base station.

2. The method of claim 1, further comprising:
receiving, from the first base station, configuration information on a dual connectivity after a completion of the handover from the first base station to the second base station.

3. The method of claim 1, wherein during the handover, the terminal performs data transmission and reception with the first base station via a protocol entity for the first base station.

4. The method of claim 1, wherein the dual active protocol entity is set for each bearer between the terminal and the first base station.

5. The method of claim 1, wherein during the handover, the terminal performs data transmission and reception with the second base station via the dual active protocol entity for the second base station.

6. The method of claim 1, wherein the dual active protocol entity for the second base station includes at least one of a physical layer entity, a medium access control (MAC) entity, or a radio link control (RLC) entity.

7. A method performed by a first base station in a wireless communication system, the method comprising:
   transmitting, to a terminal, a first message for releasing dual connectivity;
   transmitting, to the terminal, a second message for a handover from the first base station to a second base station, wherein the second message instructs the terminal to configure a dual active protocol entity for the second base station based on the second message for the handover;
   receiving, from the terminal, uplink data until a first condition is satisfied, wherein the first condition is related to a completion of a random access procedure of the terminal with the second base station; and
   transmitting, to the terminal, downlink data until a second condition is satisfied, wherein the second condition is related to a releasing a connection between the terminal and the first base station.

8. The method of claim 7, wherein the dual active protocol entity is set for each bearer between the terminal and the first base station.

9. The method of claim 7, wherein the dual active protocol entity for the second base station includes at least one of a physical layer entity, a medium access control (MAC) entity, or a radio link control (RLC) entity.

10. The method of claim 7, wherein during the handover, the first base station performs data transmission and reception with the terminal via a protocol entity for the first base station of the terminal.

11. A terminal in a wireless communication system, the terminal comprising:
   a transceiver;
   memory, comprising one or more storage media, storing instructions; and
   one or more processors communicatively coupled to the transceiver and the memory,
   wherein the instructions, when executed by the one or more processors individually or collectively, cause the terminal to:
      receive, from a first base station via the transceiver, a first message for releasing dual connectivity,
      receive, from the first base station via the transceiver, a second message for a handover from the first base station to a second base station,
      configure a dual active protocol entity for the second base station based on the second message for the handover,
      perform a random access procedure with the second base station,
      transmit, to the first base station via the transceiver, uplink data until a first condition is satisfied, and in case that the first condition is satisfied, switch uplink data transmission to the second base station, wherein the first condition is related to a completion of the random access procedure with the second base station, and
      receive, from the first base station via the transceiver, downlink data until a second condition is satisfied, wherein the second condition is related to a releasing a connection with the first base station.

12. The terminal of claim 11, wherein the instructions that, when executed by the one or more processors individually or collectively, further cause the terminal to:
   receive, from the first base station via the transceiver, configuration information on a dual connectivity after a completion of the handover from the first base station to the second base station.

13. The terminal of claim 12, wherein, during the handover, the instructions that, when executed by the one or more processors individually or collectively, further cause the terminal to perform data transmission and reception with the first base station via a protocol entity for the first base station.

14. A first base station in a wireless communication system, the first base station comprising:
   a transceiver;
   memory, comprising one or more storage media, storing instructions; and
   one or more processors communicatively coupled to the transceiver and the memory,
   wherein the instructions, when executed by the one or more processors individually or collectively, cause the first base station to:
      transmit, to a terminal via the transceiver, a first message for releasing dual connectivity,
      transmit, to the terminal via the transceiver, a second message for a handover from the first base station to a second base station, wherein the second message instructs the terminal to configure a dual active protocol entity for the second base station based on the second message for the handover,
      receive, from the terminal via the transceiver, uplink data until a first condition is satisfied, wherein the first condition is related to a completion of a random access procedure of the terminal with the second base station, and
      transmit, to the terminal via the transceiver, downlink data until a second condition is satisfied, wherein the second condition is related to a releasing a connection between the terminal and the first base station.

15. The first base station of claim 14, wherein the dual active protocol entity is set for each bearer between the terminal and the first base station.

16. The terminal of claim 12, wherein the dual active protocol entity is set for each bearer between the terminal and the first base station.

17. The terminal of claim 12, wherein, during the handover, the instructions that, when executed by the one or more processors individually or collectively, further cause the first base station to perform data transmission and reception with the second base station via the dual active protocol entity for the second base station.

18. The terminal of claim 12, wherein the dual active protocol entity for the second base station includes at least one of a physical layer entity, a medium access control (MAC) entity, or a radio link control (RLC) entity.

19. The first base station of claim 14, wherein, during the handover, the instructions that, when executed by the one or more processors individually or collectively, further cause the first base station to perform data transmission and reception with the terminal via a protocol entity for the first base station of the terminal.

20. The first base station of claim 14, wherein the dual active protocol entity for the second base station includes at least one of a physical layer entity, a medium access control (MAC) entity, or a radio link control (RLC) entity.

* * * * *